Jan. 18, 1949.　　　　　G. A. DUNN　　　　　2,459,368
PEAR PEELING, CORING, AND SPLITTING
METHOD AND APPARATUS

Filed Sept. 9, 1940　　　　　　　　　　　　34 Sheets—Sheet 1

Inventor
Guy A. Dunn
By Lyon & Lyon
Attorneys

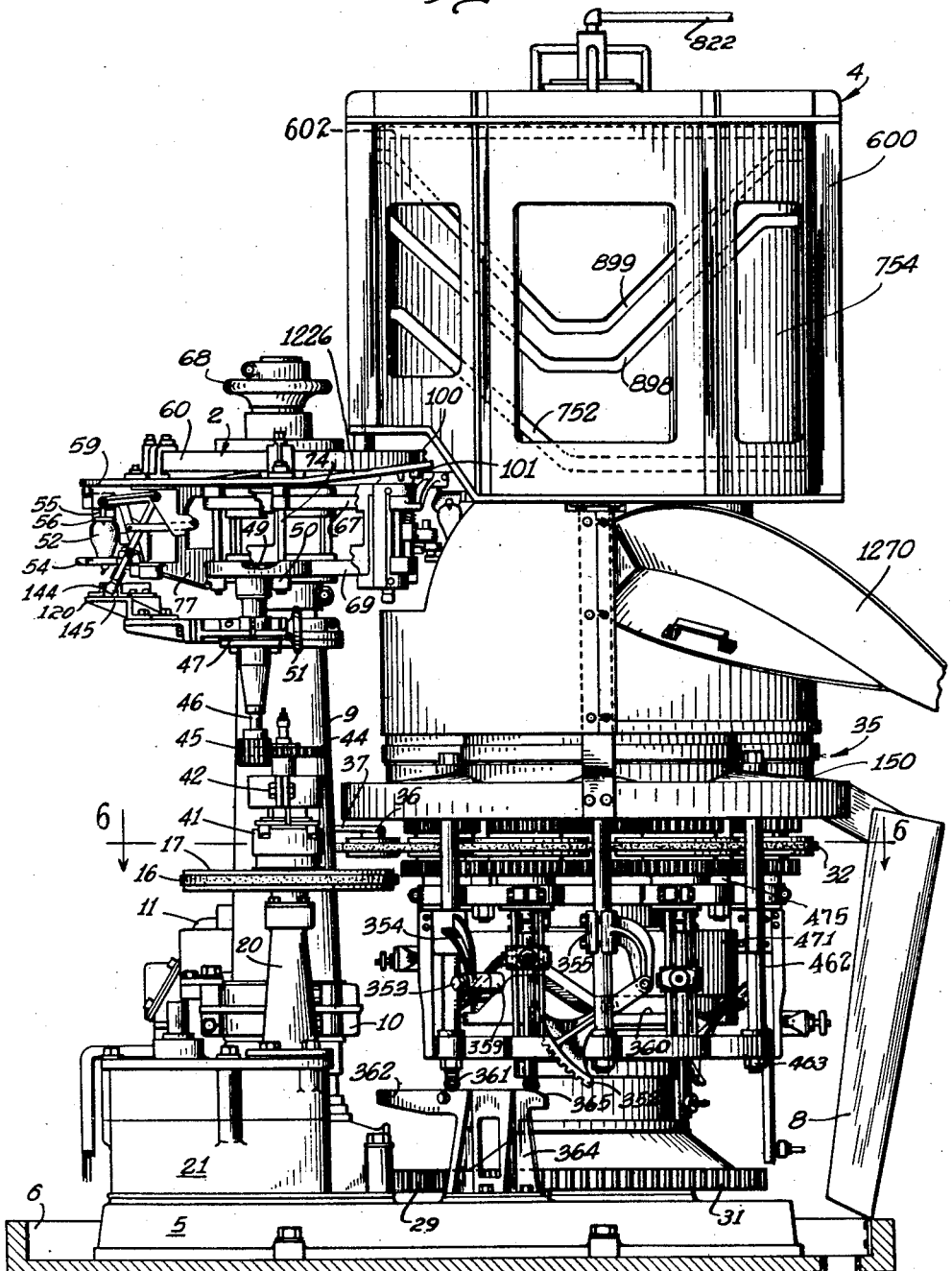

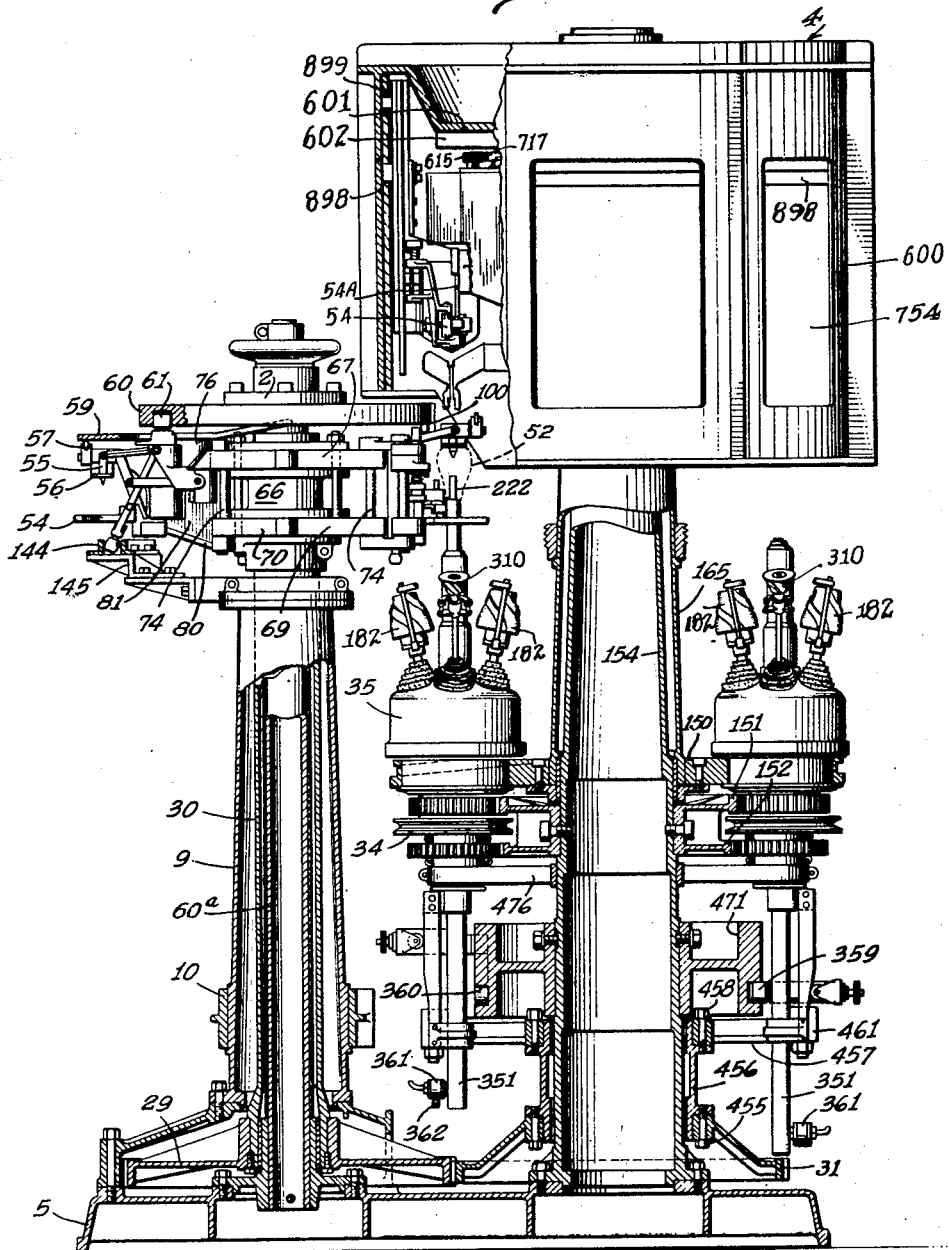

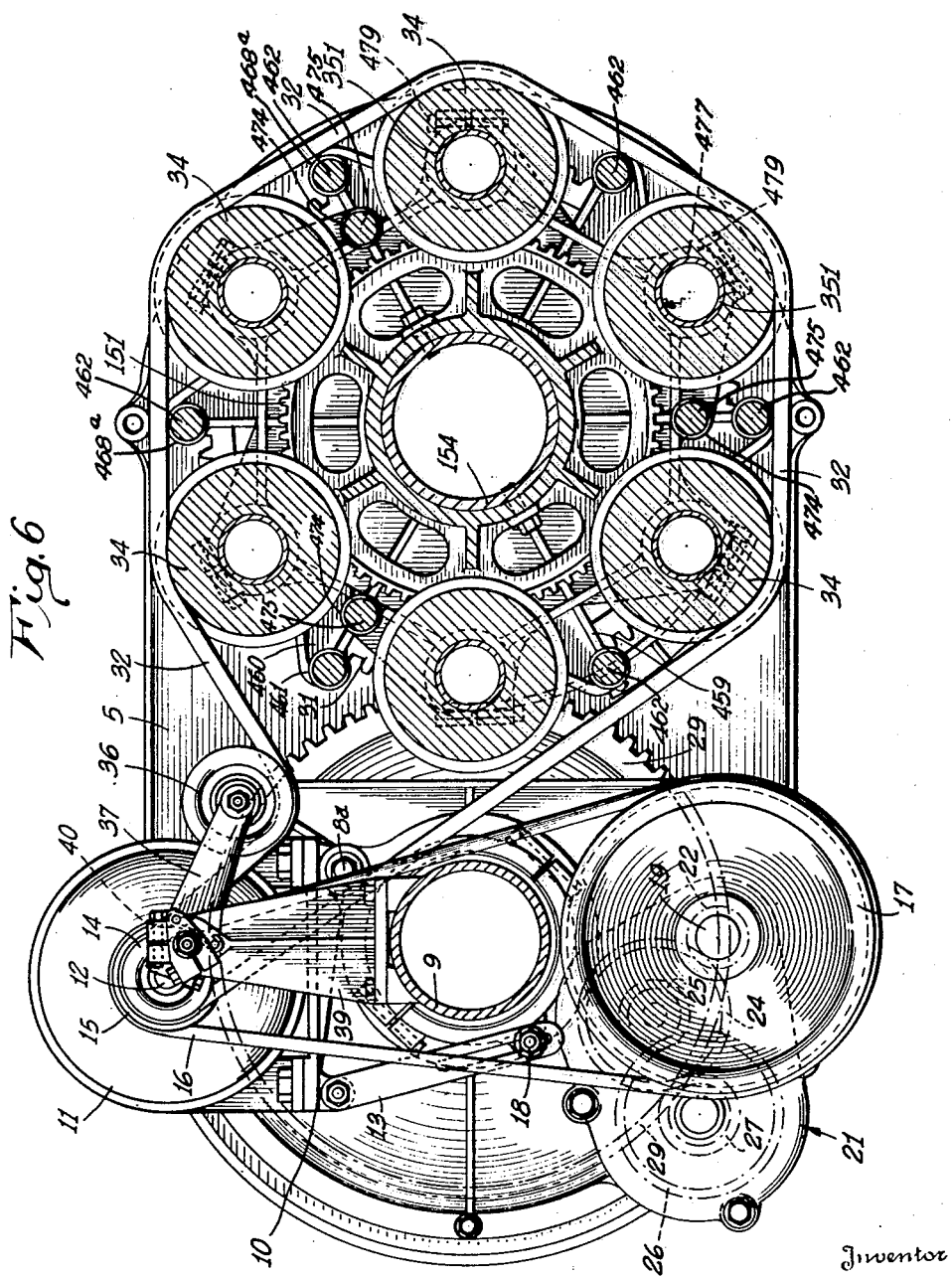

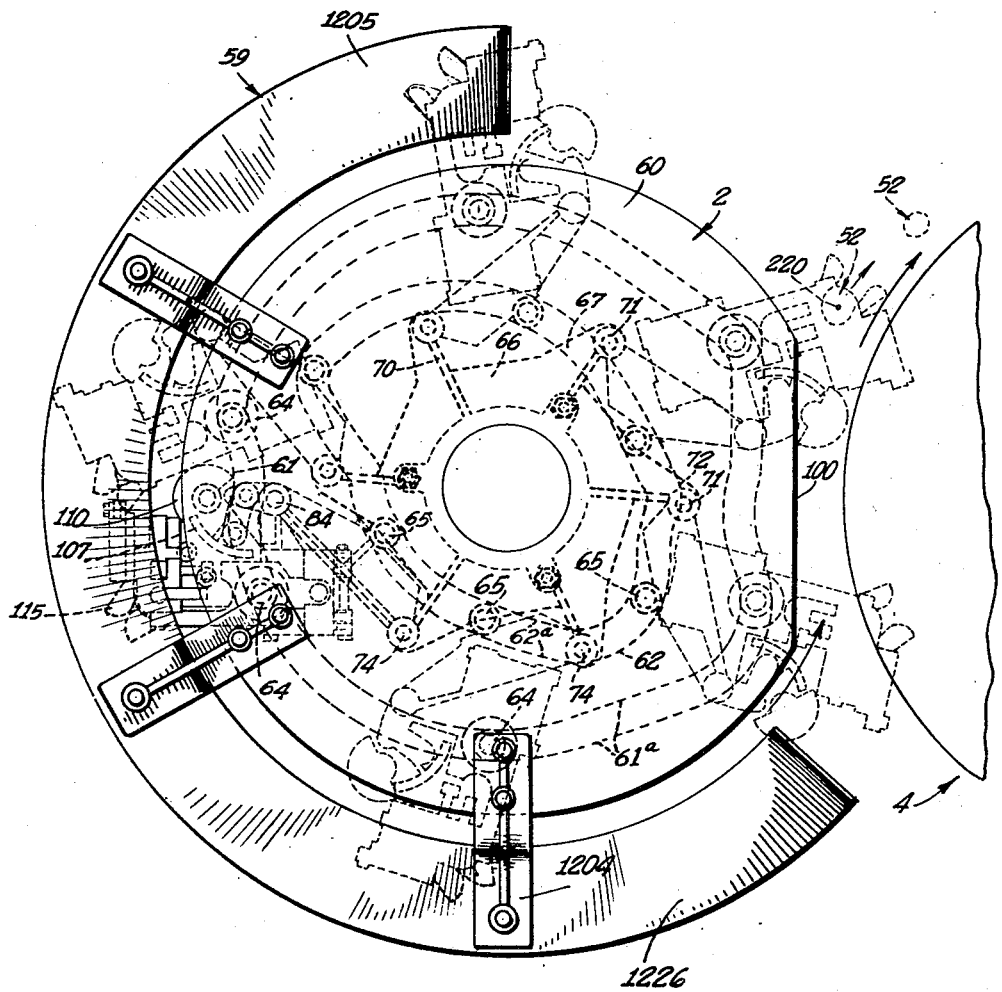

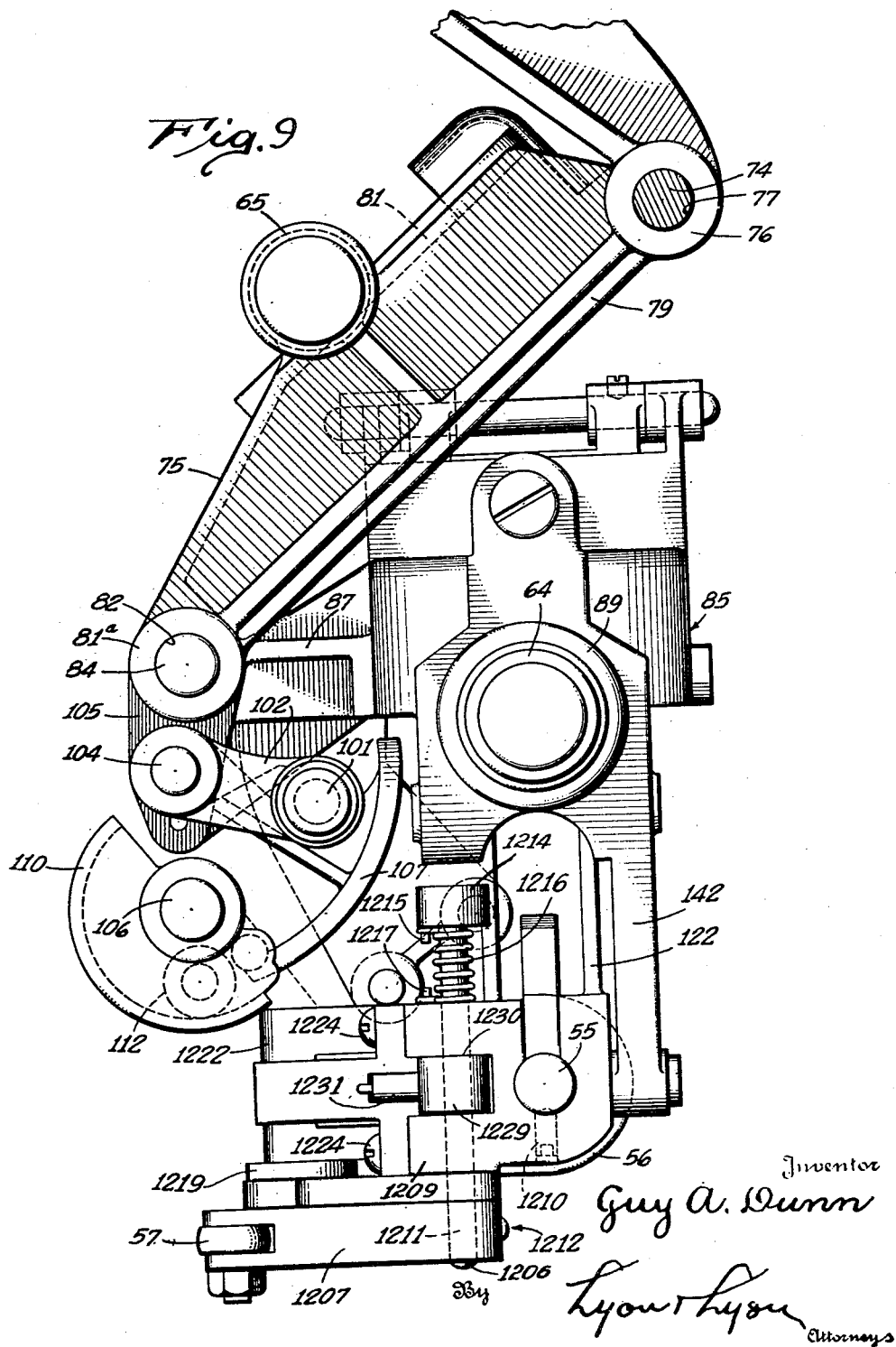

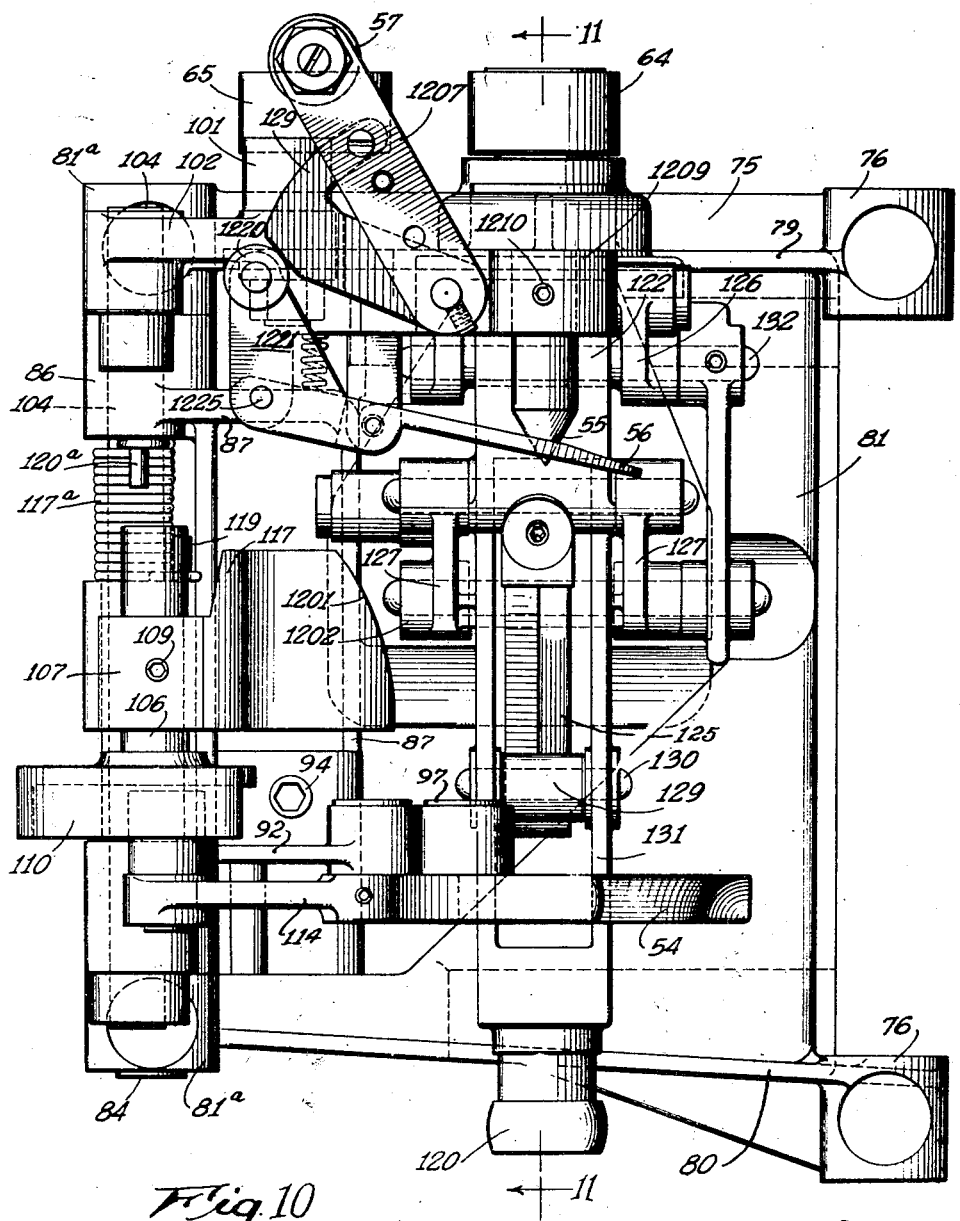

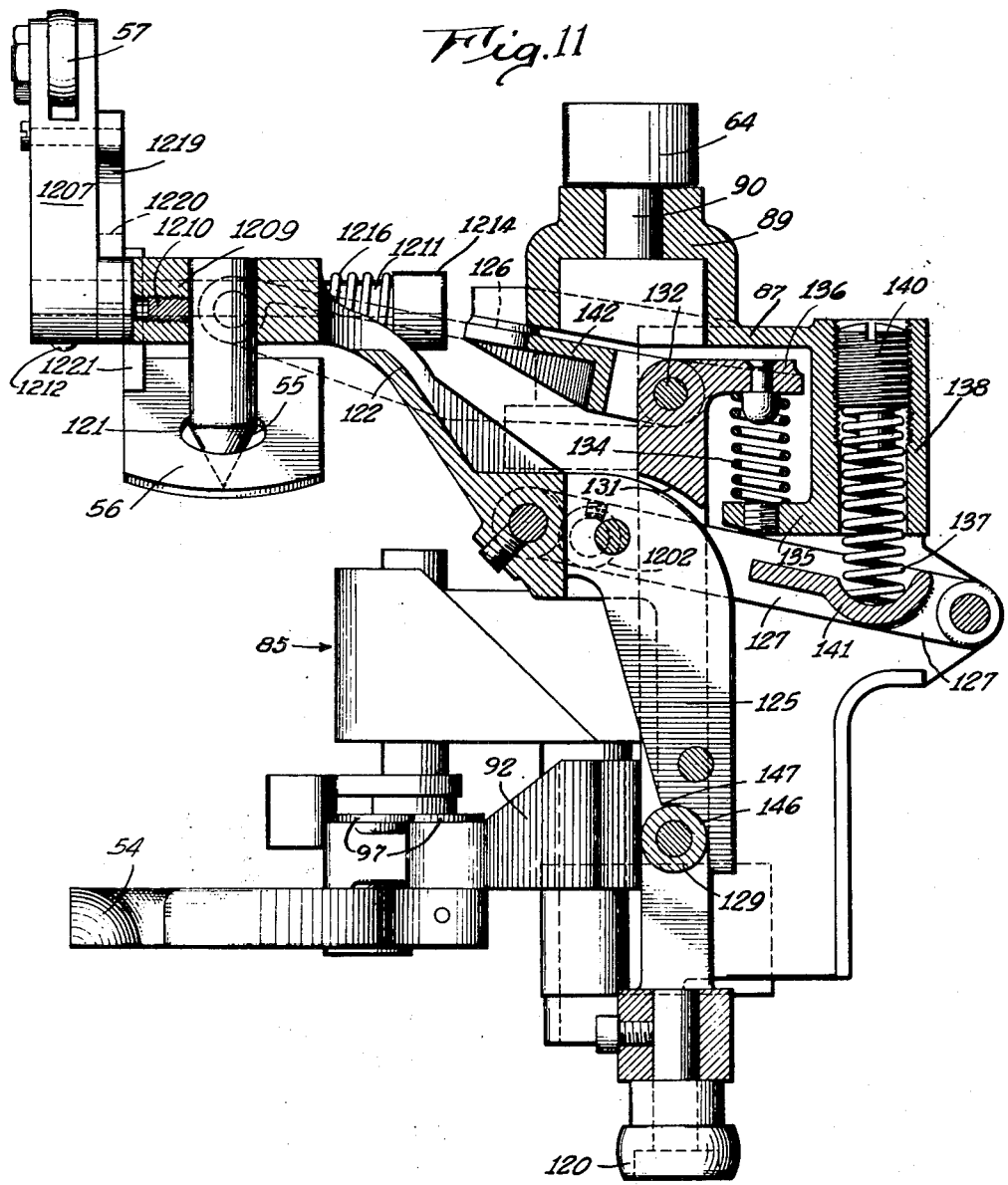

Jan. 18, 1949.  G. A. DUNN  2,459,368
PEAR PEELING, CORING, AND SPLITTING
METHOD AND APPARATUS
Filed Sept. 9, 1940
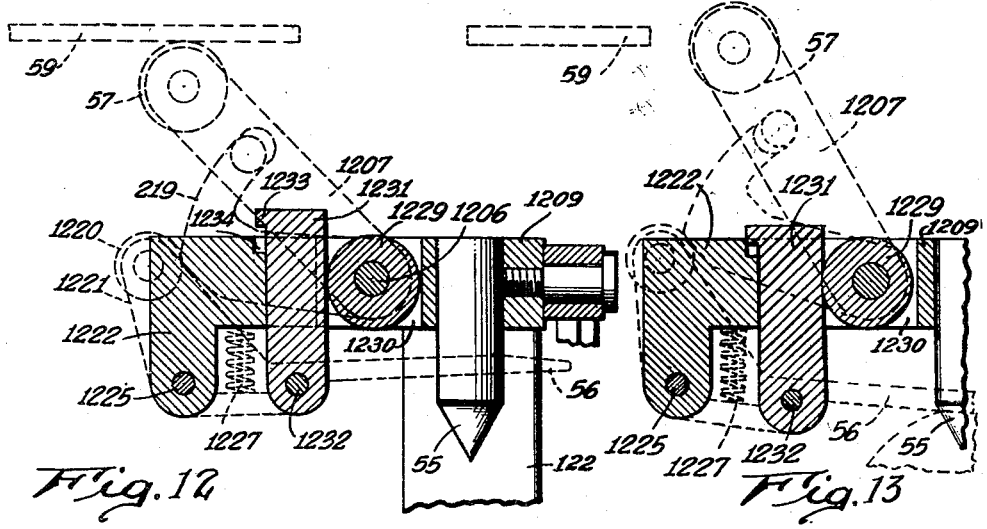
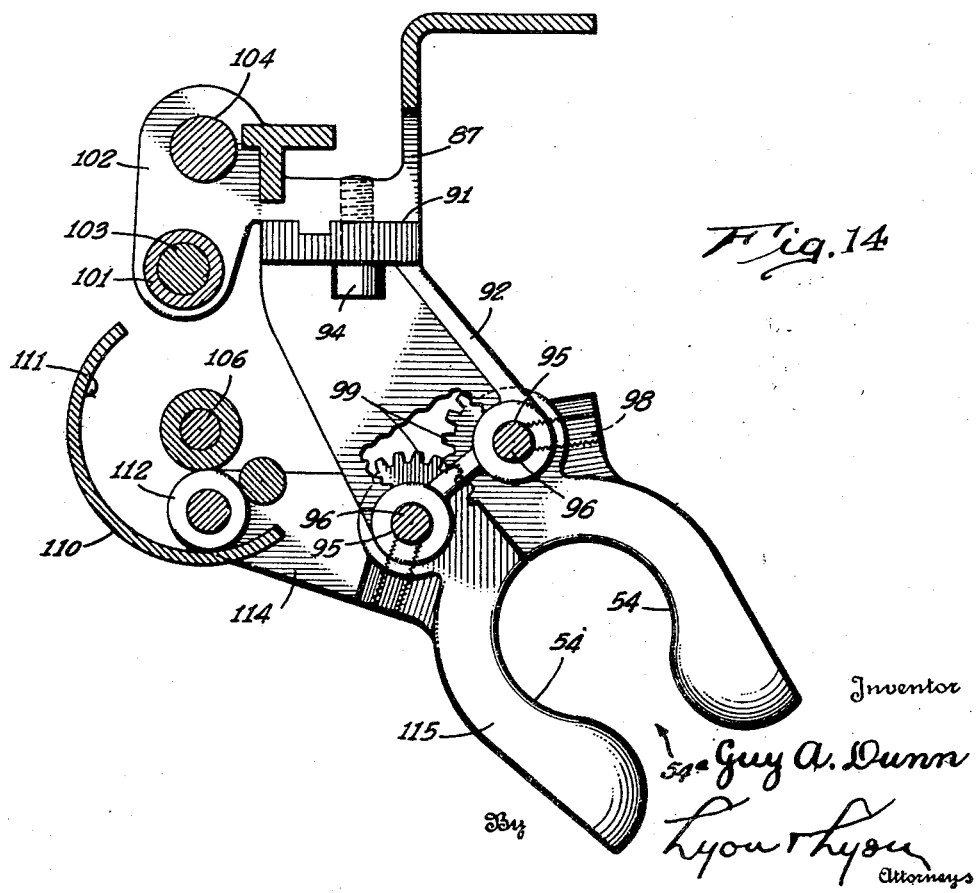
Inventor
Guy A. Dunn
By Lyon & Lyon
Attorneys Jan. 18, 1949.  G. A. DUNN  2,459,368
PEAR PEELING, CORING, AND SPLITTING
METHOD AND APPARATUS
Filed Sept. 9, 1940  34 Sheets-Sheet 12

Inventor
Guy A. Dunn
By Lyon & Lyon
Attorneys

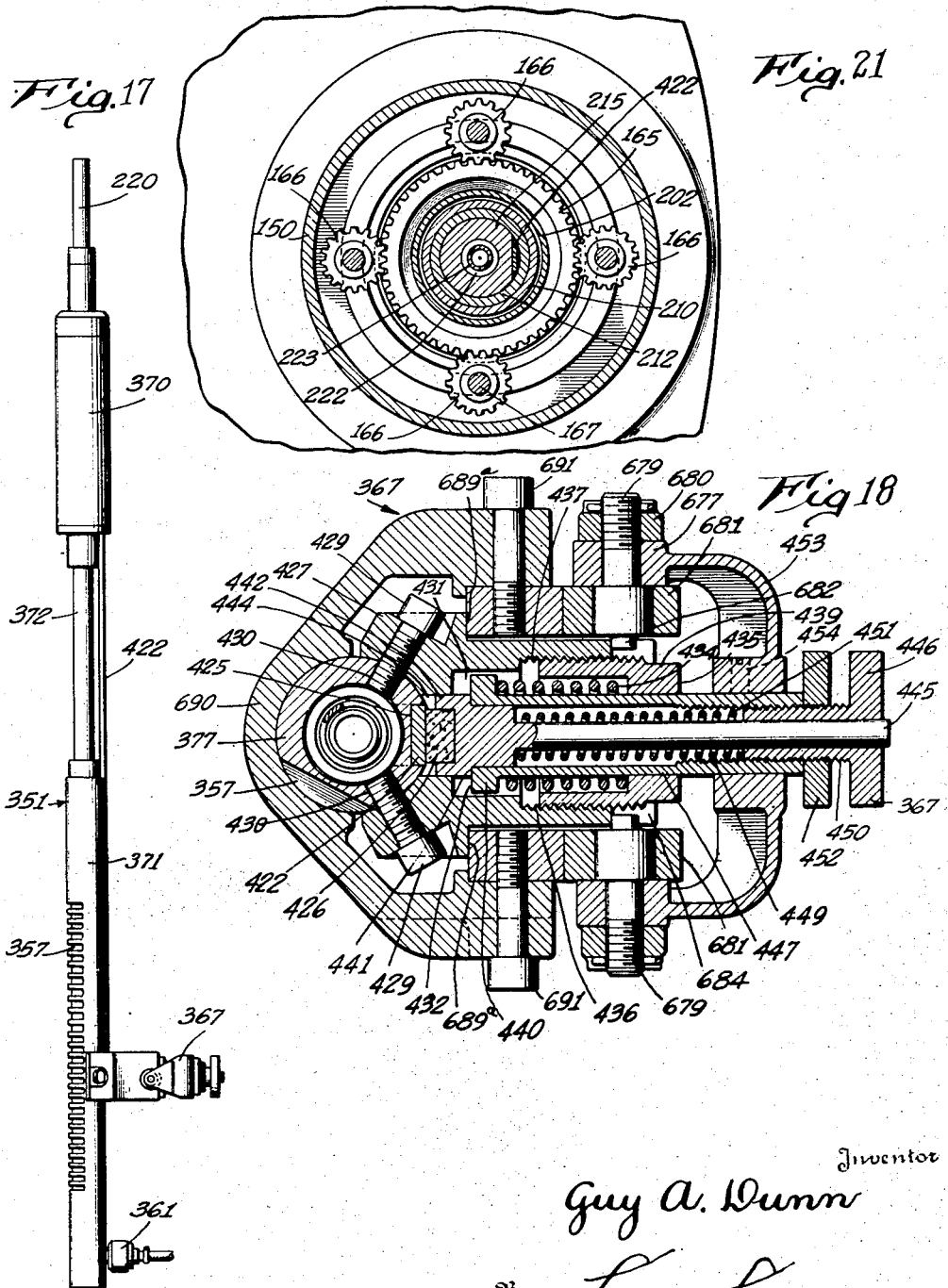

Jan. 18, 1949.  G. A. DUNN  2,459,368
PEAR PEELING, CORING, AND SPLITTING
METHOD AND APPARATUS
Filed Sept. 9, 1940  34 Sheets-Sheet 14

Inventor
Guy A. Dunn
By Lyon & Lyon
Attorneys

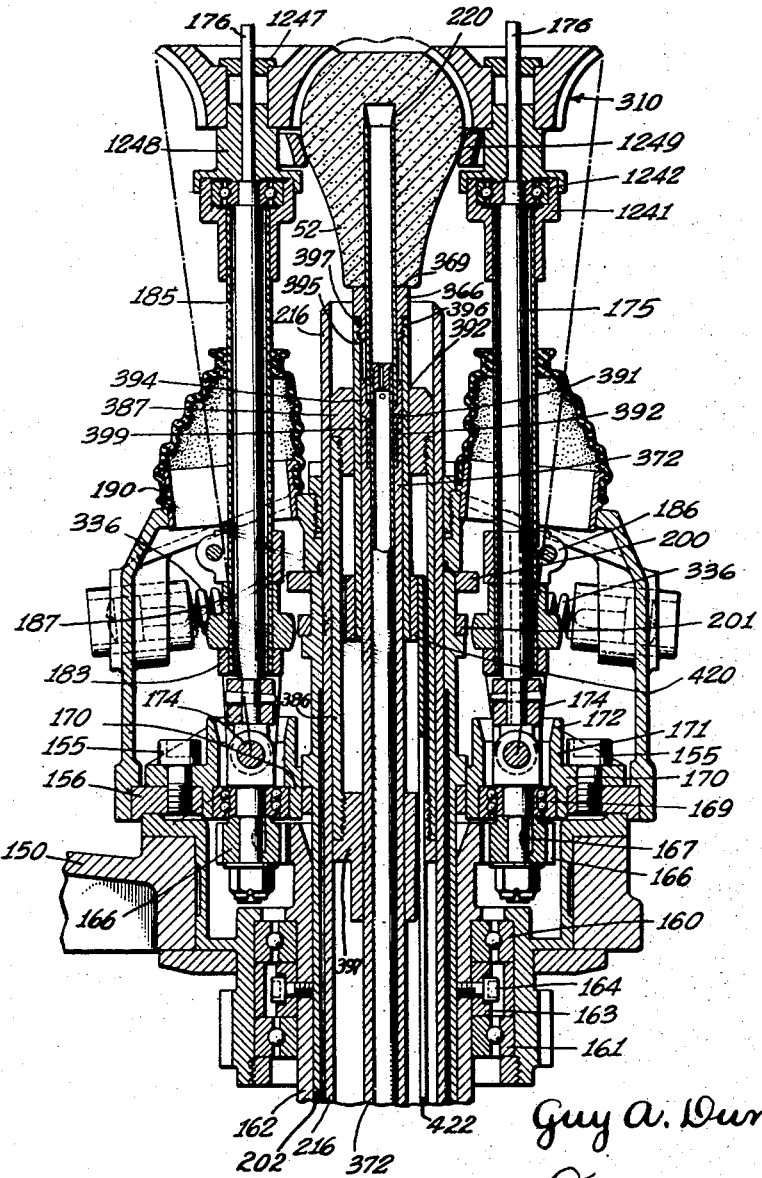

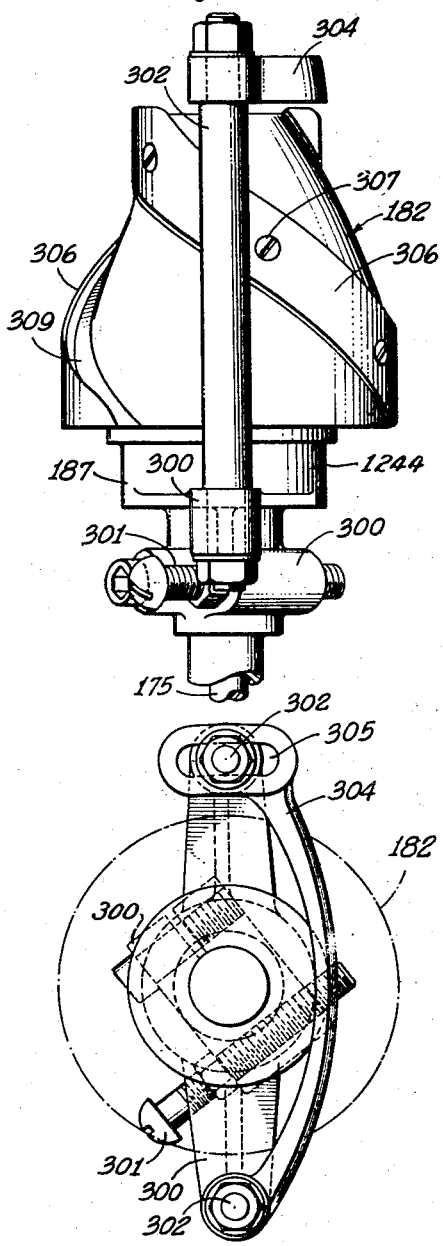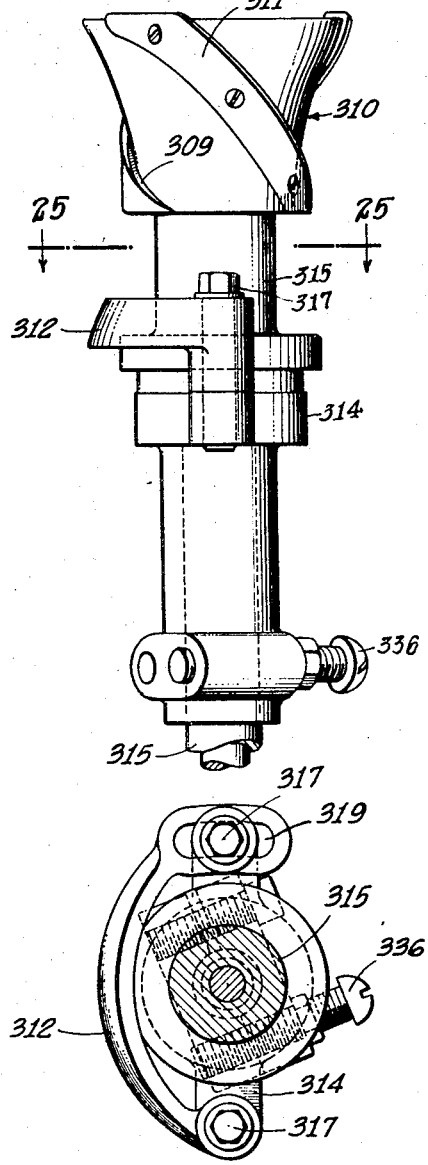

Jan. 18, 1949.    G. A. DUNN    2,459,368
PEAR PEELING, CORING, AND SPLITTING
METHOD AND APPARATUS
Filed Sept. 9, 1940    34 Sheets—Sheet 17
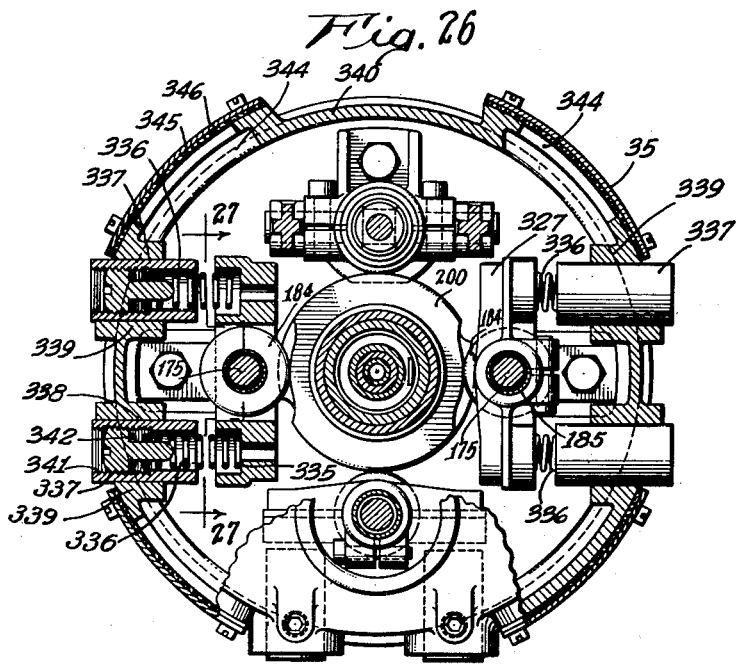
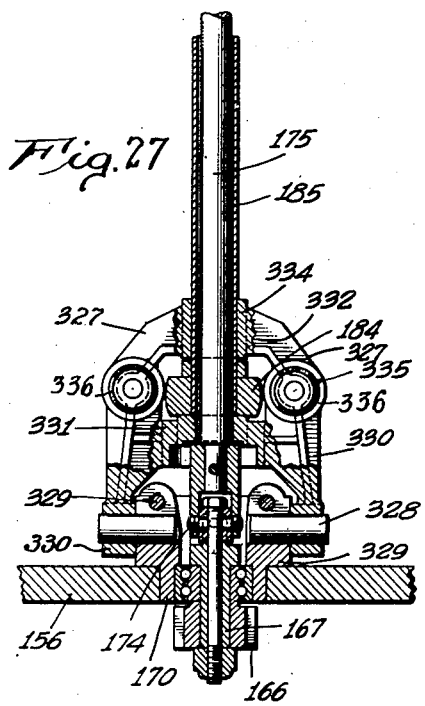
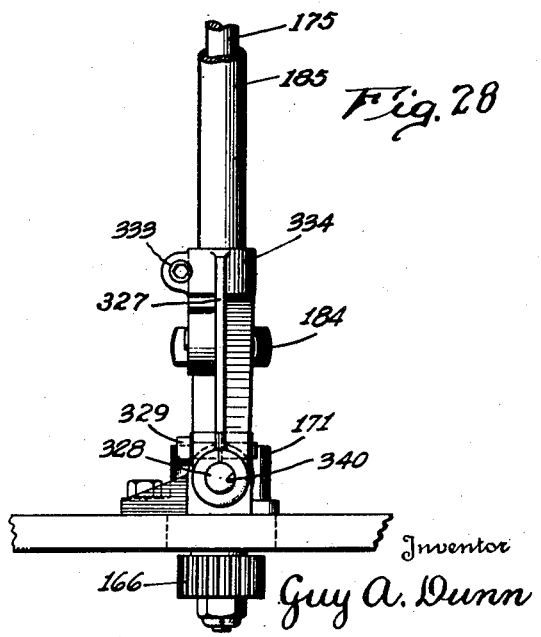
Inventor
Guy A. Dunn
By Lyon & Lyon
Attorneys

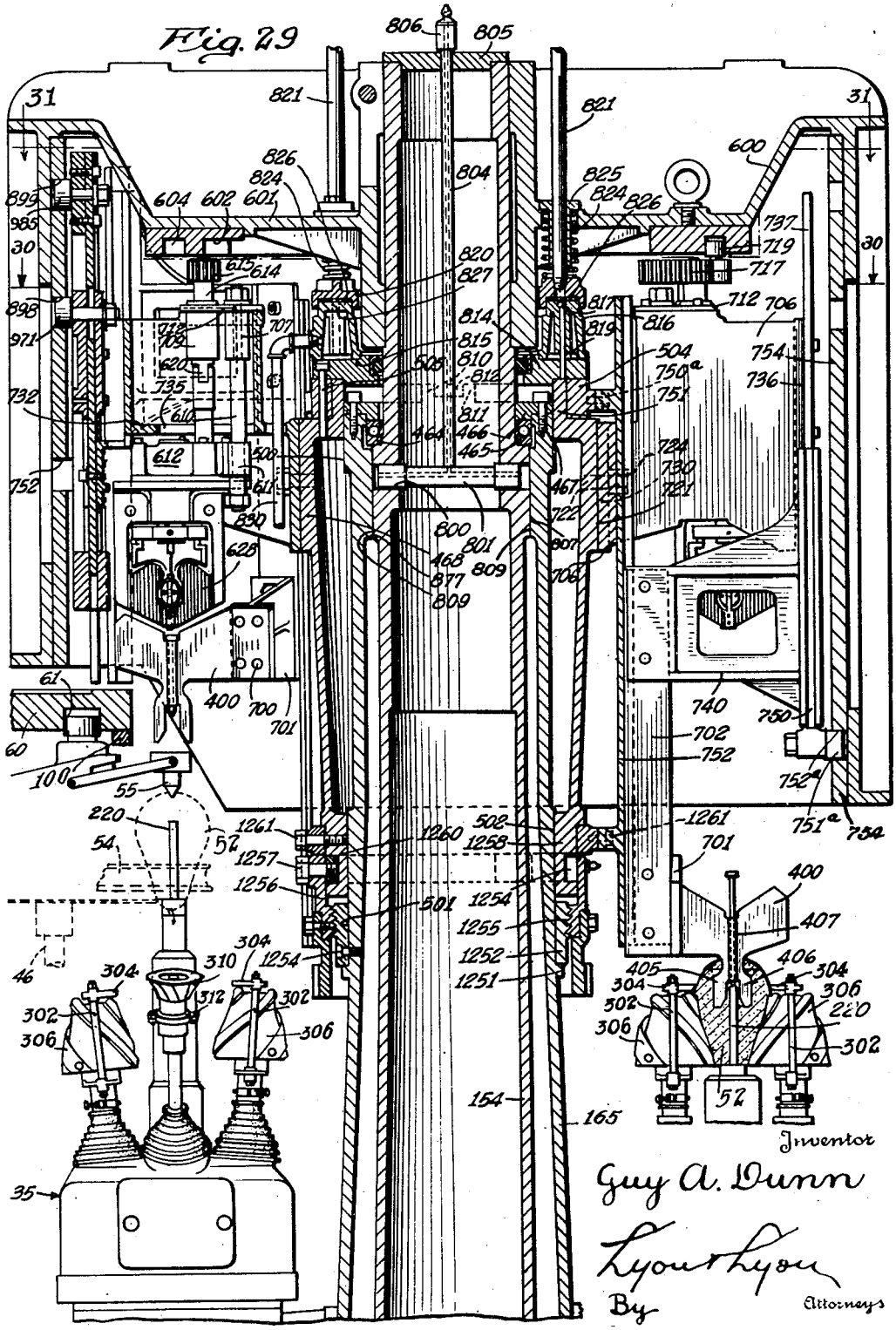

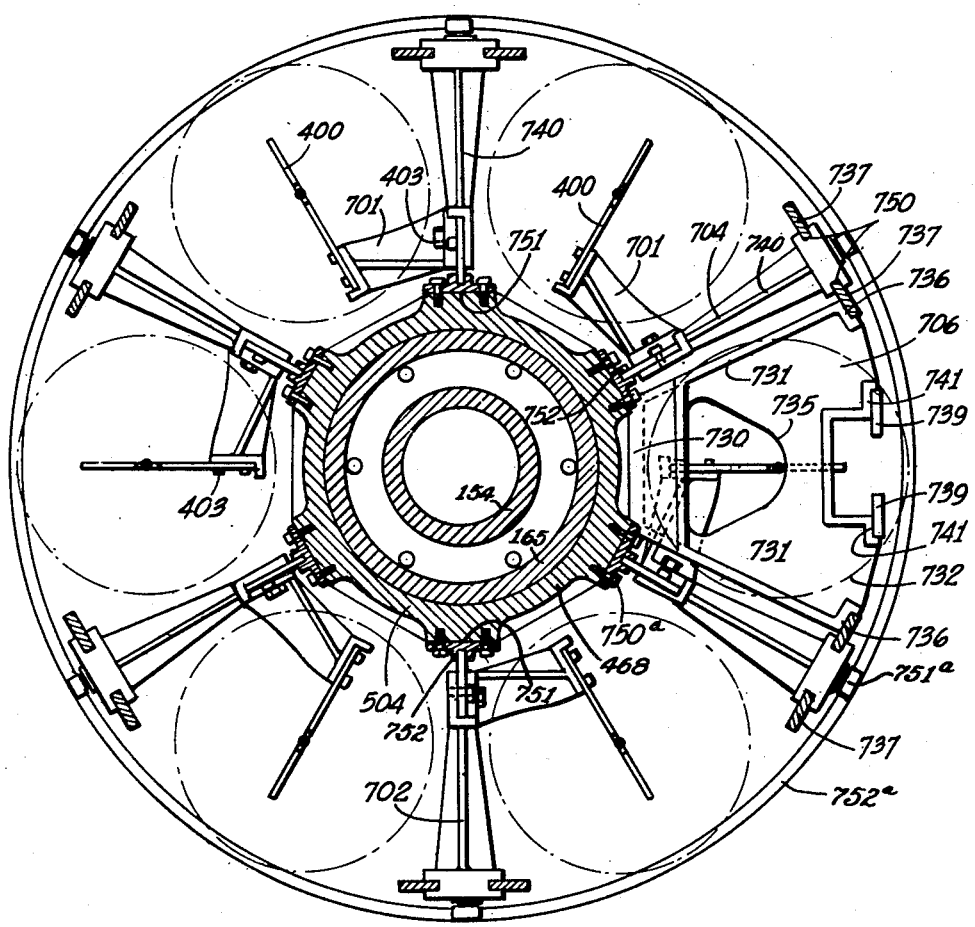

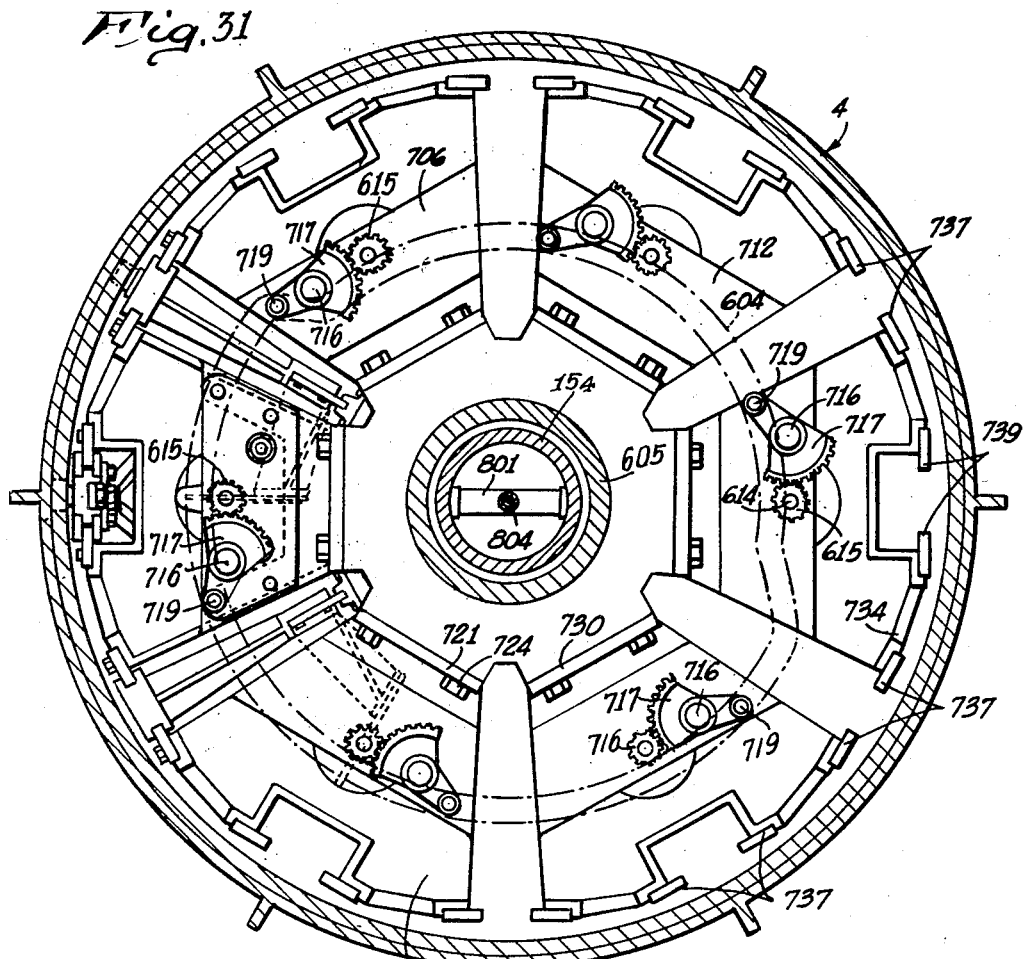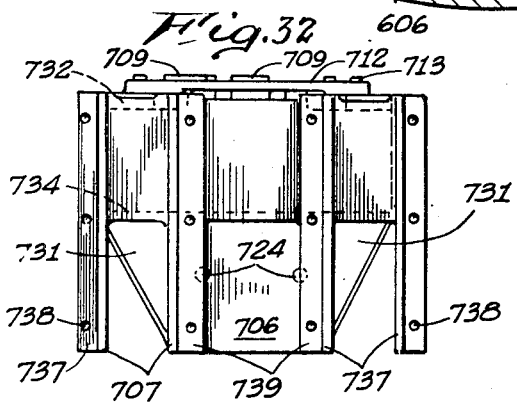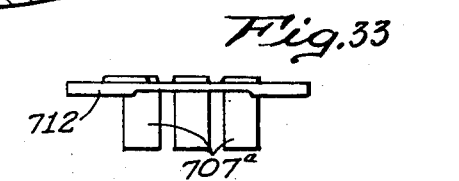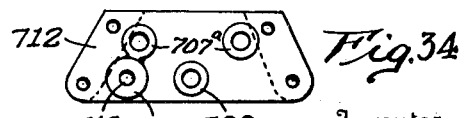

Jan. 18, 1949. G. A. DUNN 2,459,368
PEAR PEELING, CORING, AND SPLITTING
METHOD AND APPARATUS
Filed Sept. 9, 1940 34 Sheets-Sheet 21
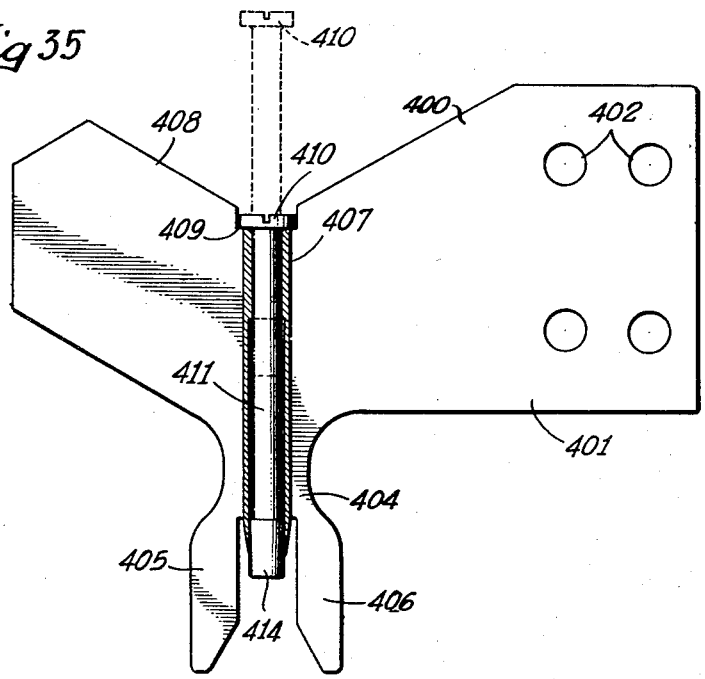
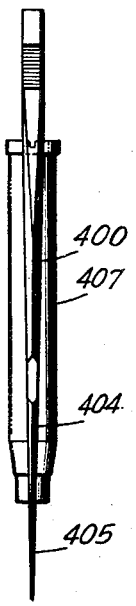
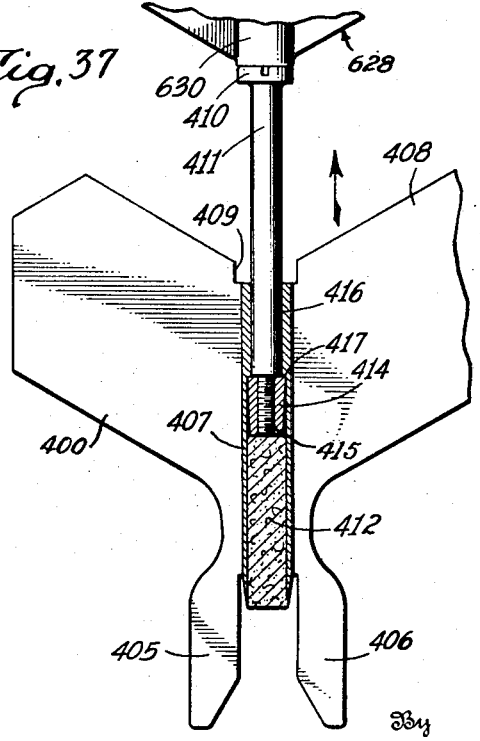
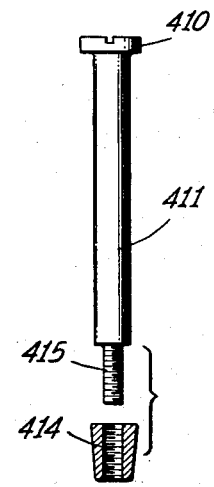
Inventor
Guy A. Dunn
By Lyon & Lyon
Attorneys

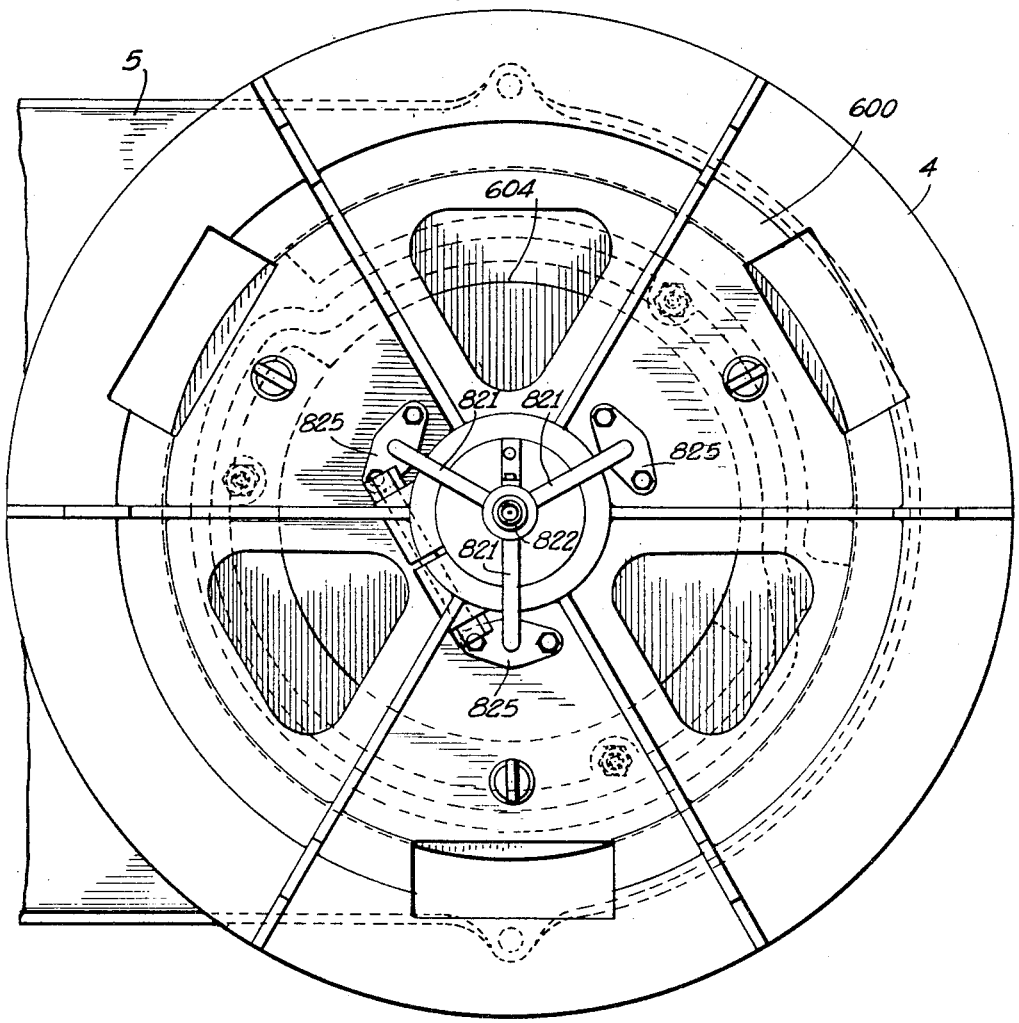

Jan. 18, 1949.  G. A. DUNN  2,459,368
PEAR PEELING, CORING, AND SPLITTING
METHOD AND APPARATUS
Filed Sept. 9, 1940  34 Sheets-Sheet 23
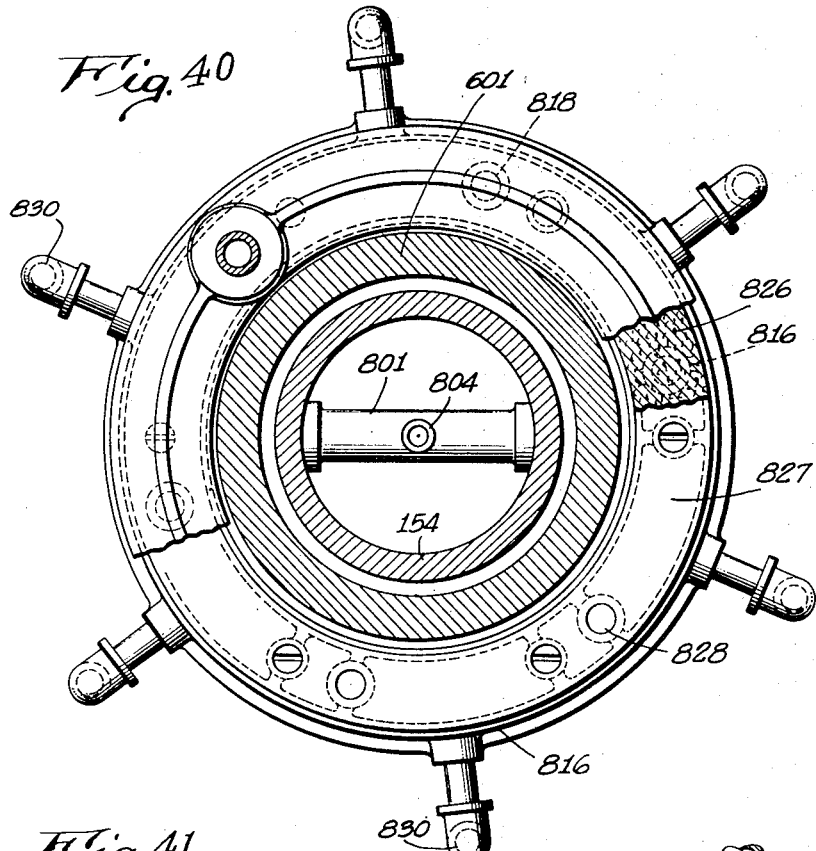
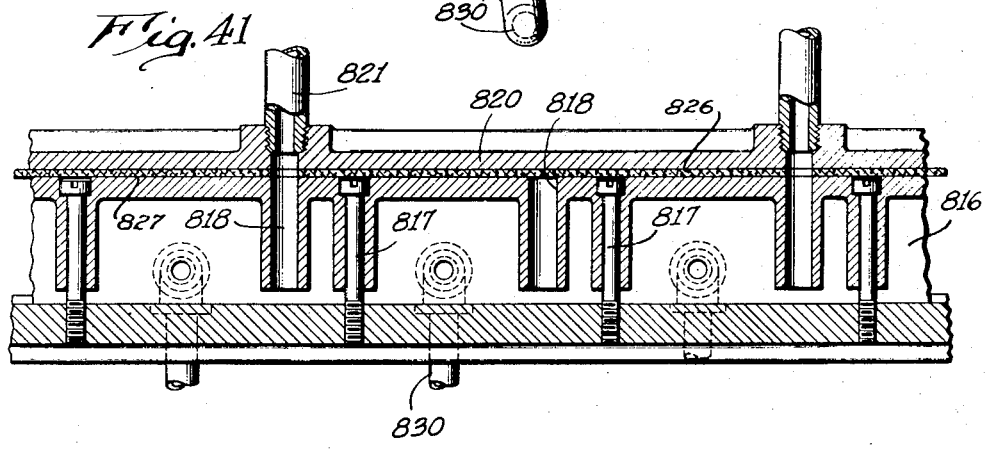
Inventor
Guy A. Dunn
By Lyon & Lyon
Attorneys

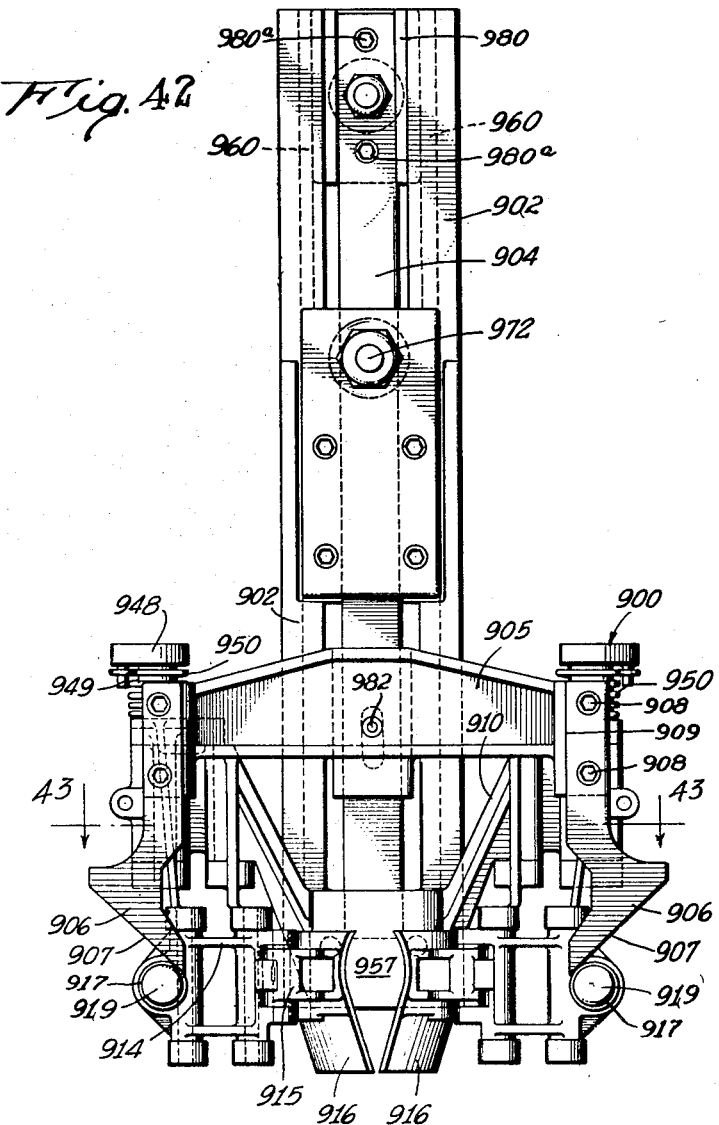

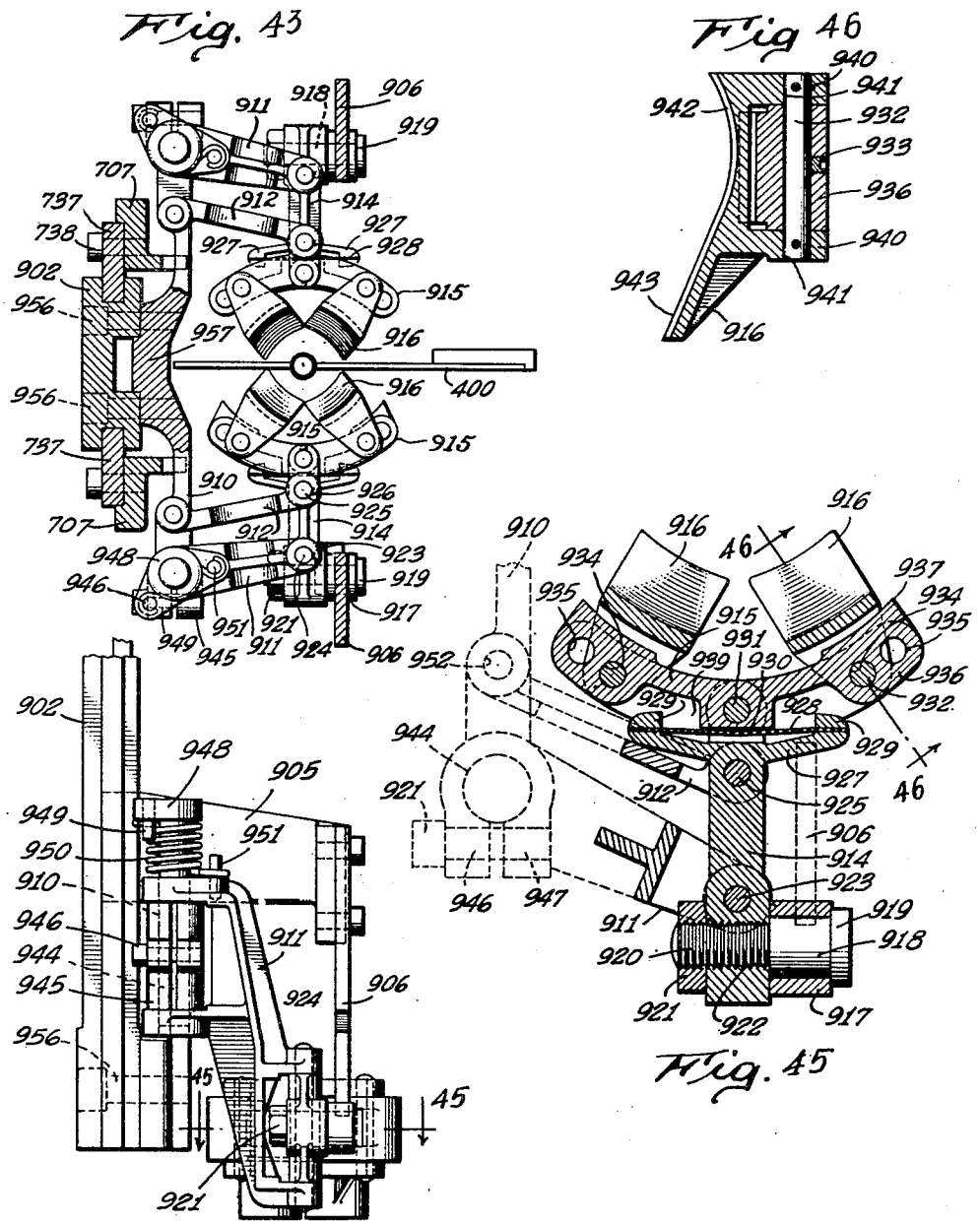

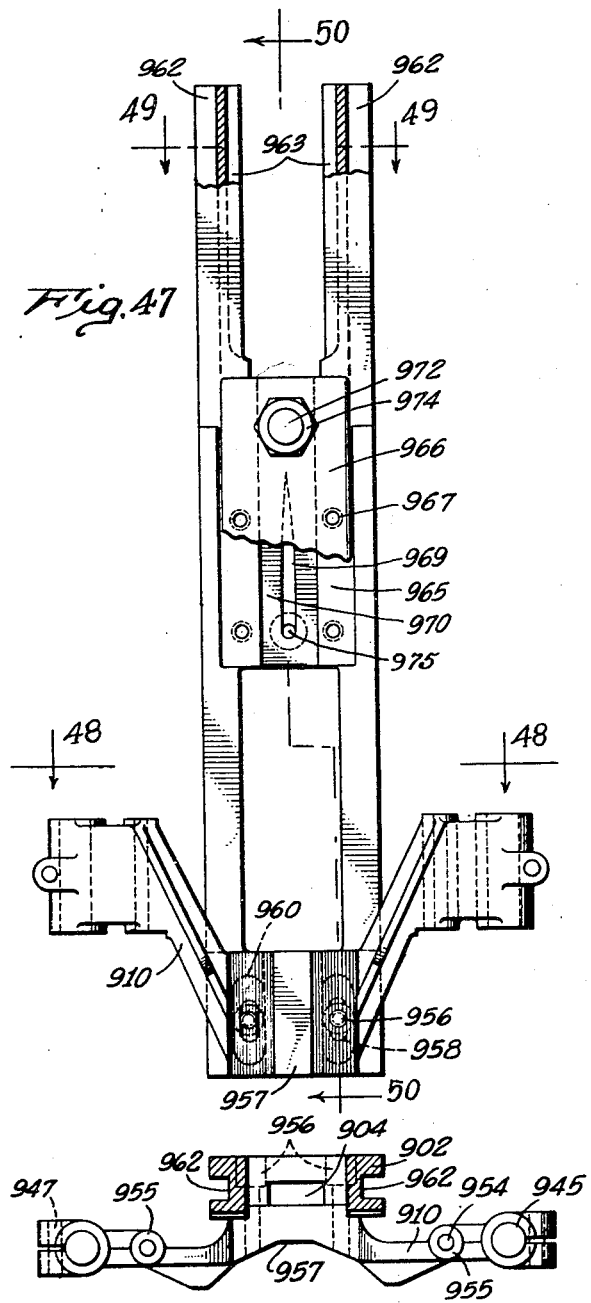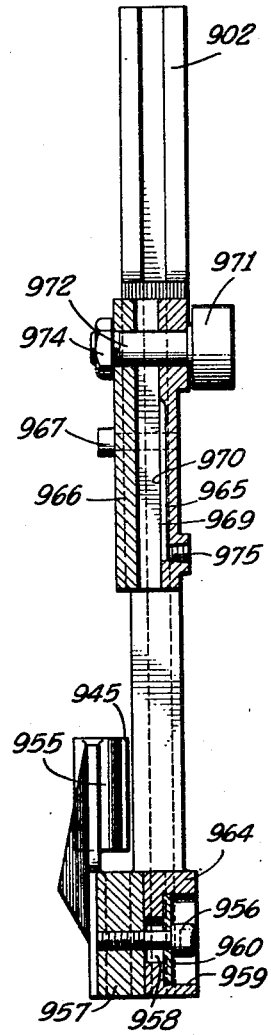

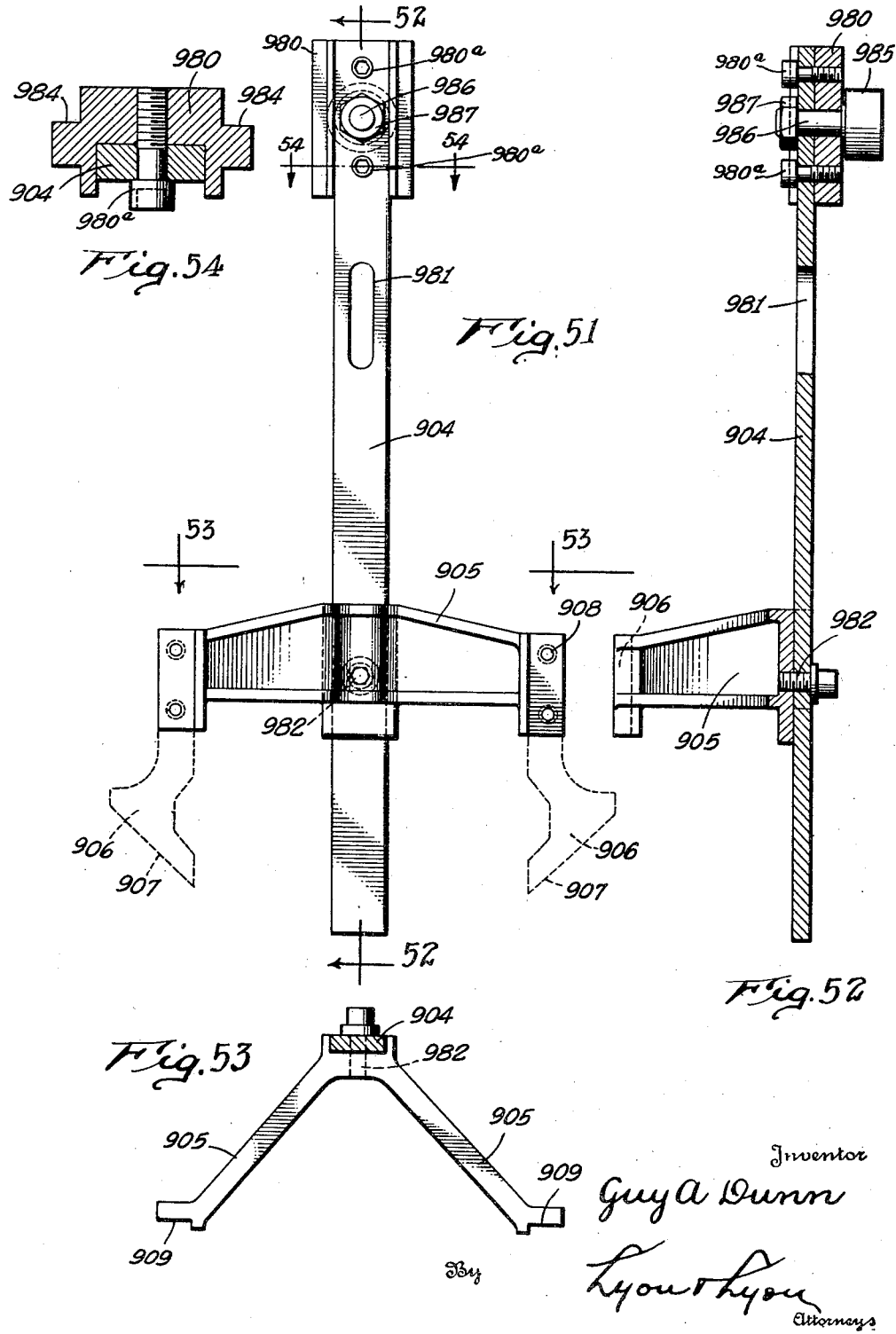

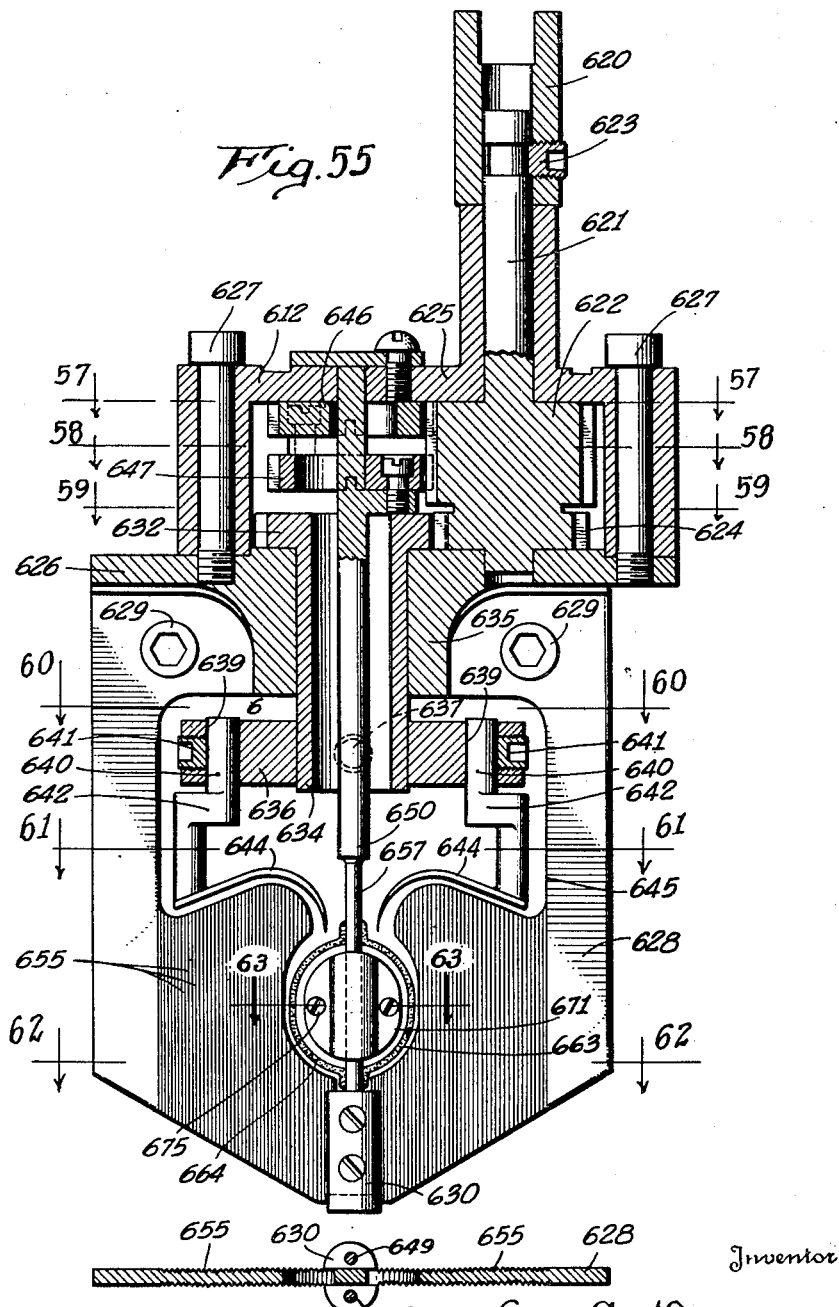

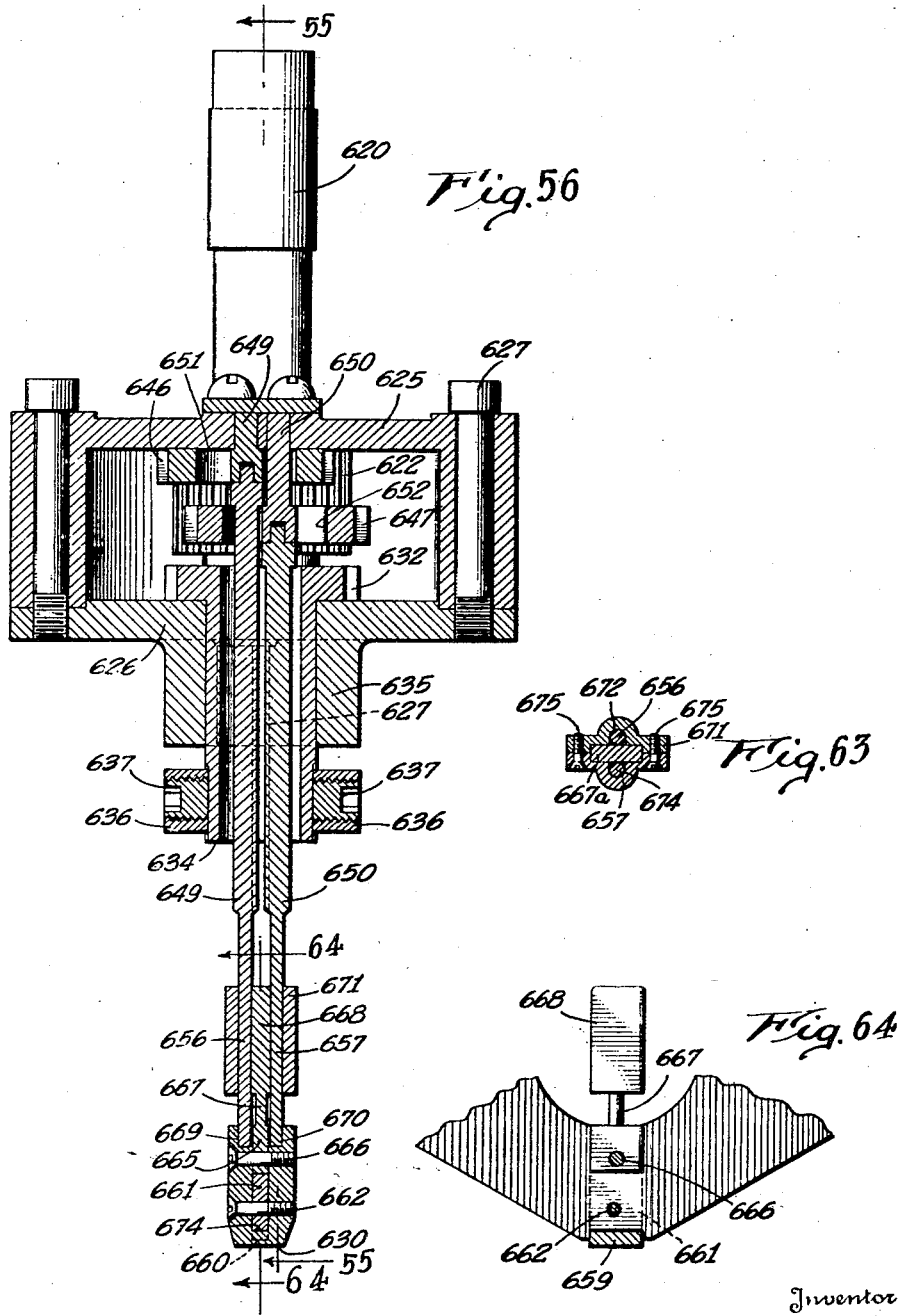

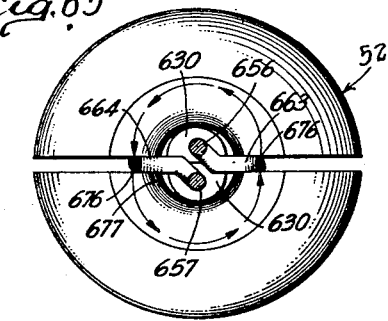
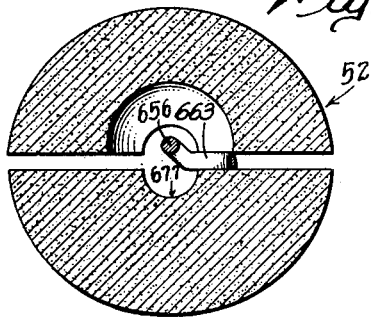
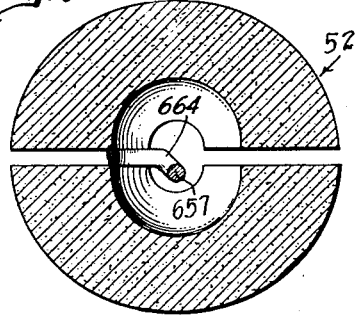
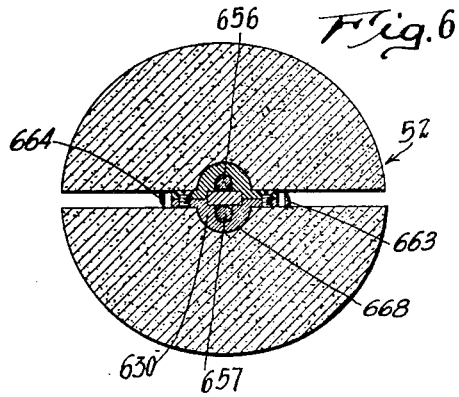
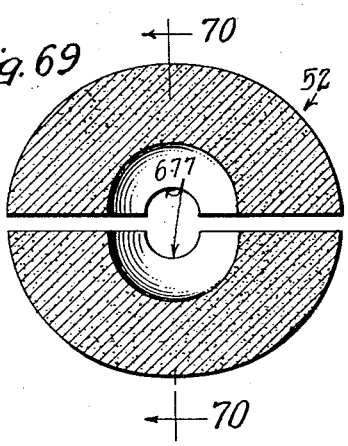
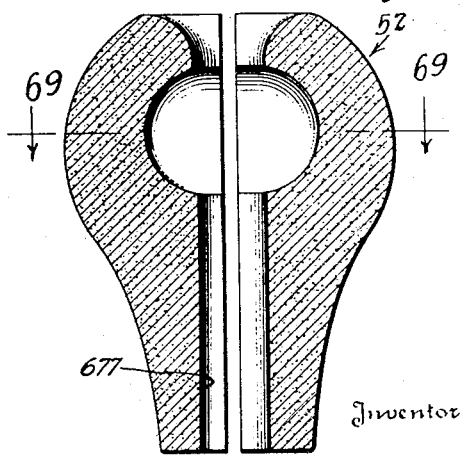

Jan. 18, 1949. G. A. DUNN 2,459,368
PEAR PEELING, CORING, AND SPLITTING
METHOD AND APPARATUS
Filed Sept. 9, 1940 34 Sheets-Sheet 32
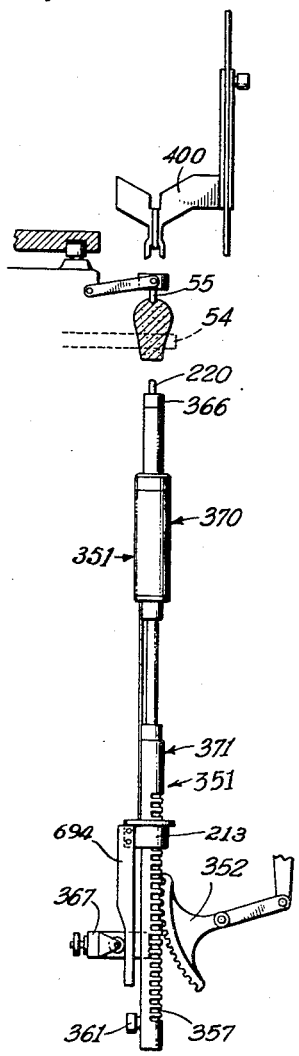
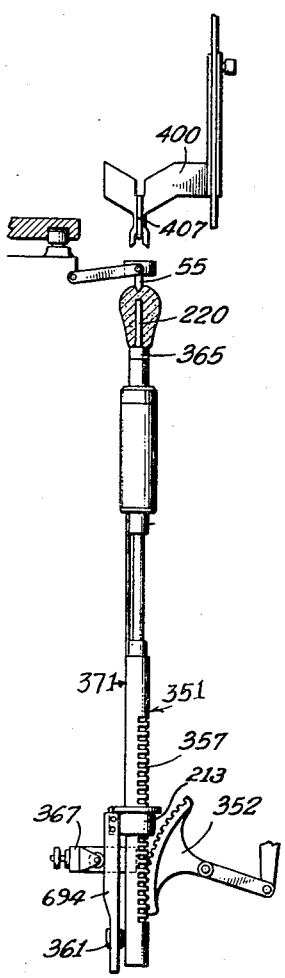
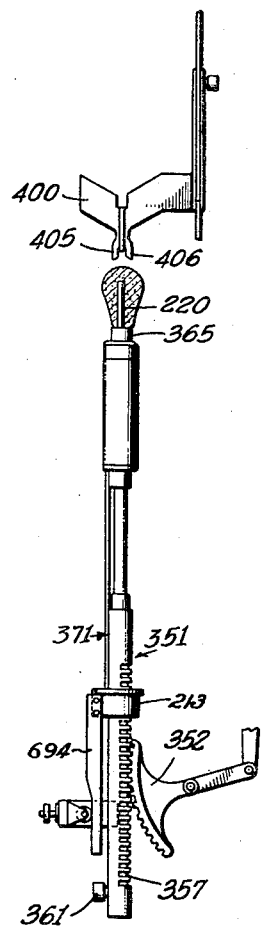
Inventor
Guy A. Dunn
By Lyon & Lyon
Attorneys

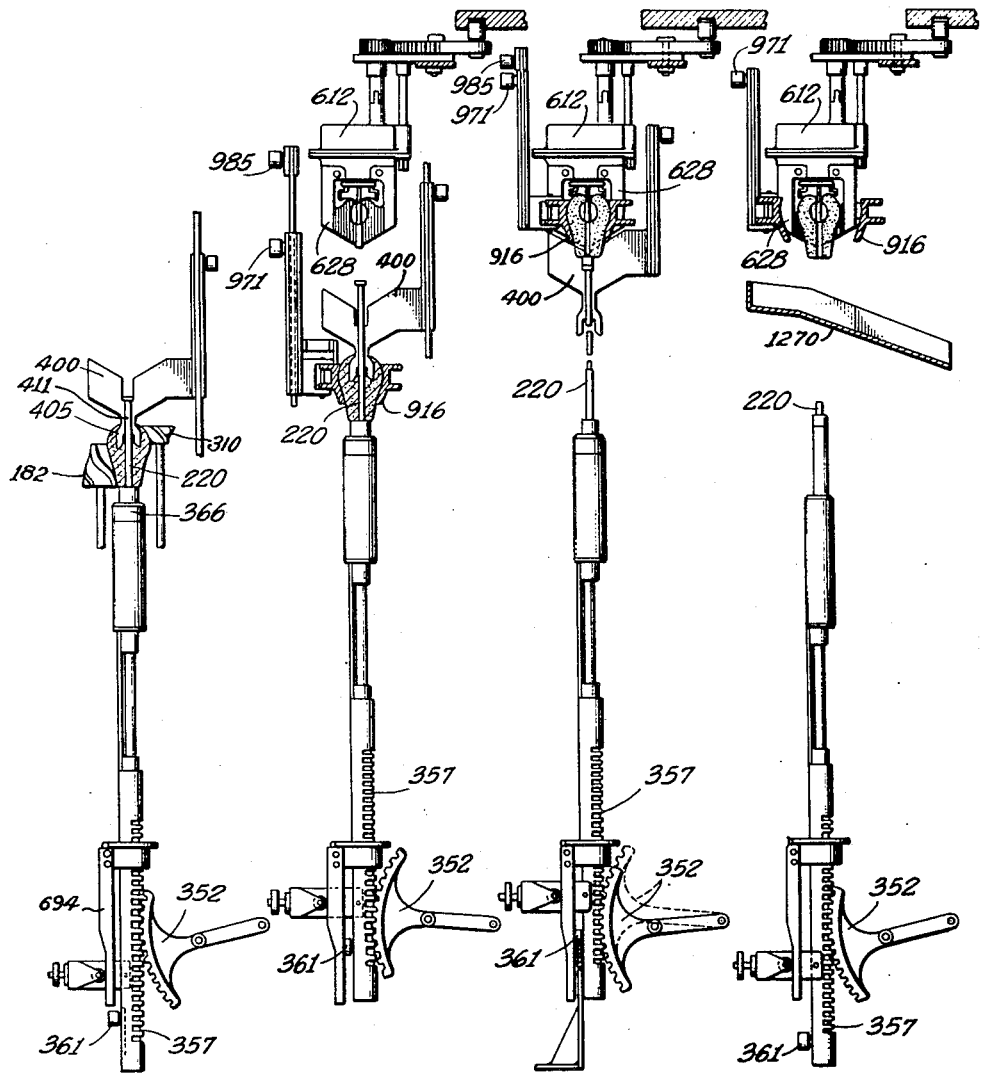

Jan. 18, 1949.  G. A. DUNN  2,459,368
PEAR PEELING, CORING, AND SPLITTING
METHOD AND APPARATUS
Filed Sept. 9, 1940  34 Sheets-Sheet 34
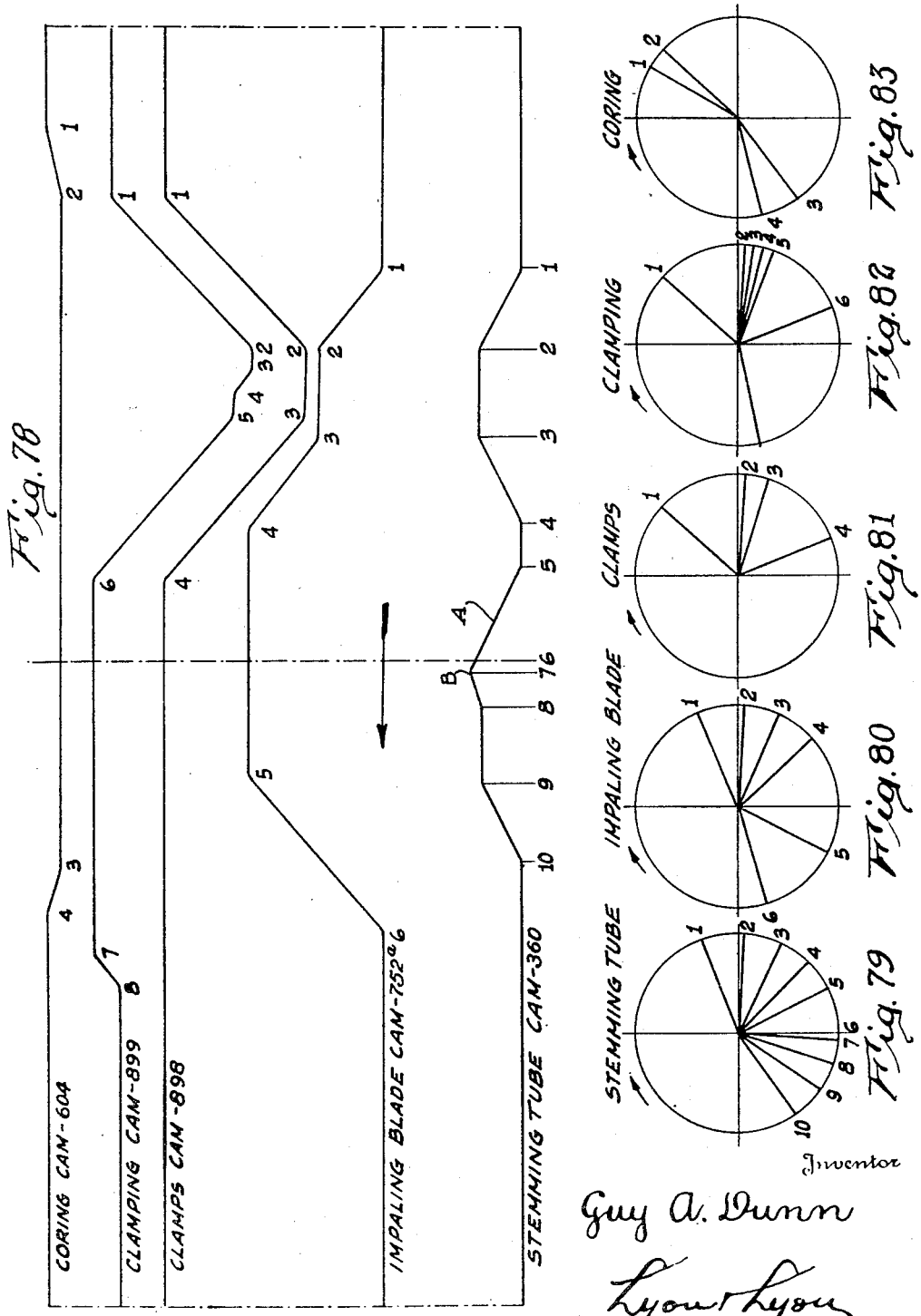
Inventor
Guy A. Dunn
By Lyon & Lyon
Attorneys Patented Jan. 18, 1949

2,459,368

UNITED STATES PATENT OFFICE 2,459,368

PEAR PEELING, CORING, AND SPLITTING METHOD AND APPARATUS

Guy A. Dunn, Oakland, Calif., assignor to California Packing Corporation, San Francisco, Calif., a corporation of New York Application September 9, 1940, Serial No. 355,988

12 Claims. (Cl. 146—238)

My invention relates to fruit preparing machinery and particularly to a device for the complete preparation of pears for canning or otherwise preserving.

In the past the most widely used method of preparing pears for canning was that in which cannery help peeled the pears by hand and cut them into halves, after a washing operation had taken place in accordance with conventional cannery practice. When the pears had been peeled, they were split into halves, cored, and passed by the proper conveying equipment to another station at which they were packed into cans and were subsequently filled with sirup, sealed and cooked.

The use of hand labor for the peeling, halving and coring operations is slow and expensive and has the additional disadvantage that the thickness of the peel removed by individual cutters varied considerably so that fruit of the one size before preparation for canning might be of considerably different size after preparation. This made proper classification of the fruit difficult, and there was frequently found to be an undue percentage of waste in the thick peelings and corings which inexperienced help were likely to remove from the pears.

An additional disadvantage lay in the fact that the shape of the fruit naturally deviated from the standard and the completely prepared fruit was hence of various shapes. In the marketing of the fruit, such departures from the standard shape do not command the same price as do the perfectly shaped fruit, and must be sold as an inferior grade, although the quality of the pear meat itself is perfect.

Some varieties of pears, and certain growing conditions, produce a pear so irregularly shaped that hand preparation could not re-shape it uniformly, and hence an entire crop might bring a low price, although the quality of the pear meat was of the best grade. It was hence desirable to re-shape such fruit in preparation, the wastage in trimming being counterbalanced by the better grade and consequent higher price.

The present machine was developed to expedite the handling of the pears and to produce uniform pear halves with a minimum of waste.

The pear preparing machine which I have invented comprises briefly a standard on which is mounted a rotating turret having within it a number of separate heads by which a pear is carried through the complete sequence of preparing operations. Also mounted on the frame and working in synchronism with the main turret is a feed turret into which an operator feeds the pears, one by one, and which then transfers them into the interior of the main turret.

A common motor drive for both turrets and the machine is so arranged that no attention by the operator is required except that of a very low degree. Once the pear is placed stem down in the receiving fingers of the feed turret, the operation is completely automatic throughout the cycle and the finished halves are discharged from the main turret without further attention by the machine operator.

While the pear is under the control of the feed turret, the external portion of the stem is cut off, together with a small portion of the stem end of the pear.

When the pear is transferred to the main turret, it is secured by a stemming tube which is inserted upwardly into the pear and around the internal portion of the stem fibres while the pear is still grasped firmly by the mechanism associated with the feed turret. The opposite, or calyx, end of the pear, is then held by an impaling knife or blade which enters from the top. The impaling blade and the stemming tube combine to hold the pear firmly while it is completely peeled by rotating peeling knives or cutters, with the exception of a small area at the blossom end of the pear. Thereafter the pear is gripped by fingers which remove it upwardly from the stemming tube, draw it over an upper stemming tube which removes the stem fibres from the large end and over a splitting plate which completes the separation into halves which was begun by the impaling knife. These gripping fingers maintain the pear halves in alignment on opposite sides of a splitting plate within which are mounted reciprocating rotary knives which peel the remainder of the skin from the blossom end and which remove the seed pod. When this operation has been completed, the gripping fingers release the separate pear halves which then fall into a discharge chute and leave the machine. The halves are now uniformly peeled and shaped, halved, stemmed, and cored, and are ready to be packed.

It is thus an object of the present device to process pears with a rapidity beyond that previously possible and to produce fruit of uniform shape regardless of the shape of the fruit prior to processing.

A further object is to remove an easily controllable and absolutely uniform amount of pear meat from perfectly shaped pears during the peeling operation.

It is a further object to produce a uniformly shaped cut in coring the pears and to insure the removal of the entire stem and seed pod without fail.

Other objects and advantages will be apparent as the nature of the same is more fully understood from the following description and accompanying drawings wherein is set forth what is now considered to be a preferred embodiment. It should be understood, however, that this particular embodiment of the invention is chosen principally for the purpose of exemplification, and that variations therefrom in details of construction or arrangement of parts may accordingly be effected and yet remain within the spirit of the scope of the invention as the same is set forth in the appended claims.

My invention has been illustrated in the drawings accompanying this specification, in which:

Figure 2 is a side view of the feed turret and main pear preparing turret, with the driving gears indicated.

Figure 4 is a partially sectional view of the feed turret and main turret shown in Figure 2.

Figure 6 is a top sectional view, taken on line 6—6 of Figure 2, and showing the assembly for driving the individual turret heads.

Figure 8 is a top view of the feed turret.

Figure 9 is a top view of the feed turret transfer mechanism with the feed ring and support removed.

Figure 10 is a side view of the feed turret transfer mechanism.

Figure 11 is a side view partially in section of the feed turret transfer mechanism taken along line 11—11 of Figure 10.

Figure 12 is a fragmentary sectional view of the locking plate control mechanism of the feed turret transfer unit shown in Figure 11.

Figure 13 is a fragmentary view of the mechanism shown in Figure 12, in locking position.

Figure 14 is a view partially in section of the feed turret clamping finger mechanism.

Figure 17 is a side view of the stemming tube assembly.

Figure 18 is a sectional view of the friction release assembly indicated by line 18—18 of Fig. 19.

Figure 20 is a sectional view of the stemming tube and peeling head assembly taken at right angles to Figure 19.

Figure 21 is a sectional view through the drive pinions of the peeling head.

Figure 22 is a detailed view of the lower peeling head.

Figure 23 is a top view of the guide bar shown in Figure 22.

Figure 24 is a side view of a detailed view of the upper cutter assembly.

Figure 25 is a sectional view taken on the line 25—25 of Figure 24.

Figure 26 is a top sectional view of the peeling head assembly.

Figure 27 is a detailed view partially in section of a yoke member.

Figure 28 is a view of the yoke member shown in Figure 27 taken at right angles to that figure.

Figure 29 is a sectional view taken diametrically through the upper portion of the main turret.

Figure 30 is a top sectional schematic view taken along line 30—30 of Figure 29.

Figure 31 is a top view taken as indicated by a line 31—31 of Figure 29.

Figure 32 is a view of a bracket member detached from the main turret.

Figure 33 is a side view of a plate fixed to the bracket member shown in Figure 32.

Figure 34 is a top view of the plate shown in Figure 33.

Figure 35 is a side view of an impaling blade partially in section.

Figure 36 is a side view of the blade shown in Figure 35.

Figure 37 is a fragmentary view partially in section of the blade shown in Figure 35.

Figure 38 is a detailed view of a portion of the mechanism shown in Figure 37.

Figure 39 is a top view of the main turret.

Figure 40 is a view partially in section showing the water control manifold in the water distributing system.

Figure 41 is a sectional view of the water system of Figure 40 in flat laid-out view.

Figure 42 is a front view of the main turret clamping finger assembly.

Figure 43 is a top sectional view taken along line 43—43 of Figure 42.

Figure 44 is a side view of the clamping fingers of Figure 42.

Figure 45 is a sectional view taken along line 45—45 of Figure 44 showing one side of the clamps in open position and showing the actuating linkage in dotted lines.

Figure 46 is a sectional view of a clamping finger taken as indicated by line 46—46 of Figure 45.

Figure 47 is a view of a slide member associated with the main turret clamping fingers.

Figure 48 is a sectional view taken along line 48—48 of Figure 47.

Figure 49 is a sectional view taken along line 49—49 of Figure 47.

Figure 50 is a side sectional view taken as indicated by line 50—50 of Figure 47.

Figure 51 is a front view of a slide member associated with the main turret clamping fingers, the cam members that actuate the opening of the clamps being shown in dotted lines.

Figure 52 is a sectional view taken along line 52—52 of Figure 51.

Figure 53 is a top sectional view taken as indicated by line 53—53 of Figure 51.

Figure 54 is a sectional view taken along line 54—54 of Figure 51.

Figure 55 is a side view of the coring assembly taken as indicated by line 55—55 of Figure 56.

Figure 56 is a sectional view of the coring head assembly taken at right angles to Figure 55.

Figure 62 is a sectional view of the splitting blade taken along line 62—62 of Figure 55.

Figure 63 is a sectional view taken along line 63—63 of Figure 55.

Figure 64 is a fragmentary sectional view taken as indicated by line 64—64 of Figure 56.

Figure 65 is a schematic top view showing the relation of the coring cutters to a split pear.

Figure 66 is a view showing the relation of the center journal to a pear being cored.

Figure 67 is a schematic view showing one stage of the coring operation.

Figure 68 is a schematic view showing a second stage of the coring operation within the pear.

Figure 69 is a top sectional view illustrating completely cored pear, taken in the plane 69—69 of Figure 70.

Figure 70 is a sectional view of a completely prepared pear taken along line 70—70 of Figure 69.

Figure 1:
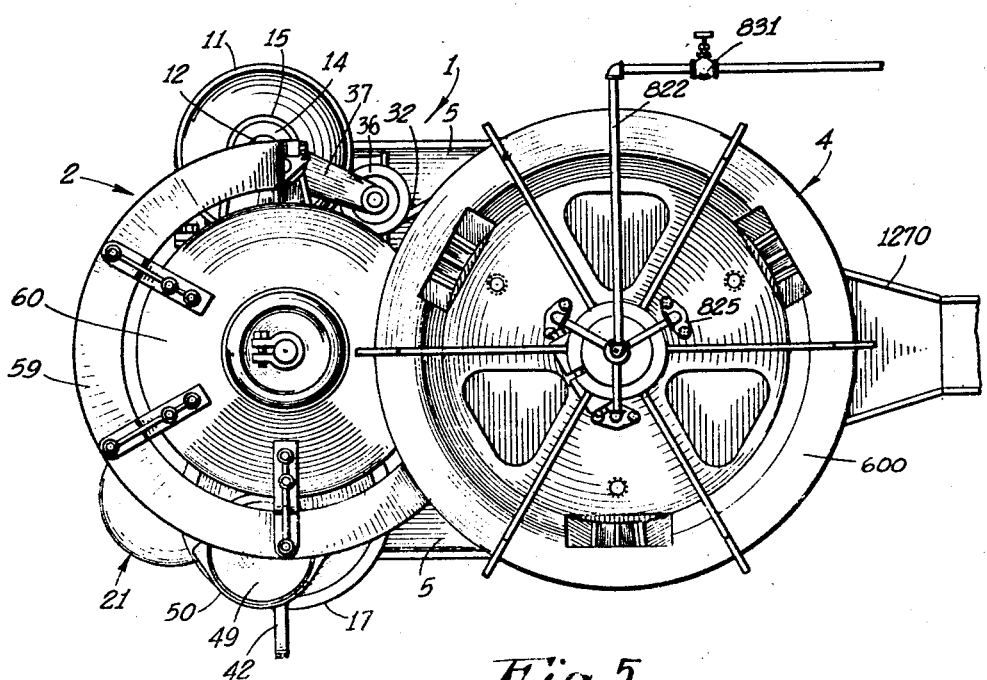
Figure 1 is a top plan view of the feed turret and pear preparing device.
Figure 5:
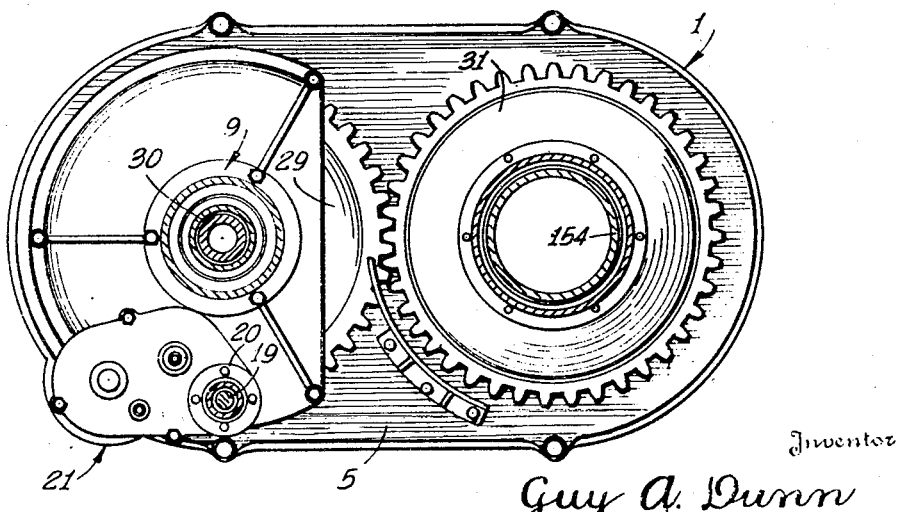
Figure 5 is a top sectional view showing the driving gear arrangement for the feed turret and the main turret.

Figures 71 to 77, inclusive, show schematically successive operational position of the stemming tube, impaling blade and splitting and coring mechanisms.

Figure 78 is a chart showing the layout of various cam tracks.

Figures 79 to 83, inclusive, show a series of rotary cam charts correspondingly numbered to numbered positions on the flat cam charts of Figure 78.

The detailed operation and construction of my device will now be considered, reference being made to the drawings.

In order to understand the principle of operation of the continuous method and apparatus for preparing the pears embodying my invention, it is believed advisable to give a short operational description thereof prior to the explanation of the details of the preferred embodiment of my invention set forth in the accompanying drawings, reference being had to Figures 71 to 77, inclusive.

A pear to be peeled, stemmed, cored and halved preparatory to canning is placed by an operator in a feed ring 54 with its stem end down. The vertical position of the pear is established by a center 55 being engaged in the calyx of the pear whereby an axis through the pear is determined substantially coincident with the stem of the pear. The pear as thus positioned has its stem end cut off in the direction transverse to the axis thus determined. These operations are performed in the feed turret. As the feed turret rotates the pear thus positioned is moved to the point of transfer to the main turret. The pear is transferred to the main turret upon the stemming tube 220 which, during the interval of transfer, is fed along the reference axis previously determined until the stemming tube occupies a position along this stem axis substantially as indicated in Figure 72. The center 55 is then moved out of the calyx and the two separable fingers which form the feed ring 54 are then opened to permit the pear to pass between the fingers and out of the feed turret. The blade 400 carrying the impaling blades 405 and 406 is fed downwardly to impale the pear from above. The pear thus gripped from its opposed ends and held from rotation by the impaling blades 405 and 406 then travels around the main turret and the pear is then peeled by the peeling members 182 and 310.

The impaling blade 400 has formed thereon a tube 407 corresponding in external diameter with the stemming tube 220. As the stemming tube 220 is projected through the pear along the stem fibre axis, it cuts from the pear the stem section.

After the pear has been peeled, it is gripped by a pair of transfer clamps 916 which grip the pear upon the opposite sides of the blade 400 and raise the pear in the direction of the previously established stem axis and during this action the stemming tube 220 and the tube 407 of the impaling blade 400 act as the guide to maintain the pear in its same position located from the same predetermined stem axis. As the stemming tube 220 has cut a plug 418 from the pear along the stem axis, I provide a plug-ejector 695 mounted axially of the stemming tube 220 which acts to cause the plug 418 to be forced out of the stemming tube 220 as the pear is moved along the guide tube 407. This plug, together with the plug which is cut from the upper portion of the pear by the guide tube 407, may tend to follow the pear during its movement over the impelling or splitting blade 400. Mounted in the tube 407 is a floating ejector pin 411 (Fig. 37), which is moved upward by the plug in the tube 407 as the pear is moved over the blade 400. After the pear has reached its position over the splitting blade 400 and has been thereby cut into halves, the blade 400, together with the cups 916, move upwardly as indicated in Fig. 76 to a position where the pear is positioned over the coring plate 628 of the seed cavity removing and calyx end-shaping unit 612.

During this upward movement of the pear and splitting blade 400, the floating ejector 411 strikes the lower end of the blade 628 with the result that further upward movement of the pin 411 is arrested causing the plug 418 to be ejected from the tube 407 (Fig. 76).

The coring unit 612 is provided with coring and shaping knives which cut the seed cavity from the pear and shape or peel the calyx end of the pear, completing the operation of the preparation of the pear. The clamps 916 are then retracted from the pear and the two halves fall from the machine and are suitably discharged. It will be apparent from the foregoing that the principle of operation is to establish the vertical stem axis through the pear and to then carry out the operations of peeling, splitting and coring the pear while the pear is held on this axis, much the same as if the pear was continuously moved along a rod extending through the pear on this established axis.

Referring now to the drawings for a more detailed understanding and explanation of my invention, I have shown in Figure 1 a top view of my completed machine 1 which comprises a feed turret 2 and a main turret 4 which are mounted together on a sturdy base 5. The base 5 in turn may be mounted in a tray 6 which is designed to catch the drippings from the machine, whether oil or pear juice. The tray 6 is provided with a suitable drain 7 and is preferably made of some material not readily corroded by the acid content of the fruit juice, to which a chute 8 leads from the main turret 4.

About a feed turret tubular housing 9 (Fig. 4) is secured a motor bracket 10 adjustably supporting, by means of a pivotal supporting shaft 8ª (Fig. 6), a motor 11 which is mounted with its shaft 12 extending vertically upward parallel to the axis of housing 9 and bearing two pulleys, a peeling head drive pulley 14 and a main turret drive pulley 15.

About the main turret drive pulley 15 there is disposed a belt 16 which extends around the feed turret supporting housing 9 and about a pulley wheel 17 (Fig. 2) supported on a drive shaft 19 which is journaled in a housing 20 supported by a gear casing 21 mounted on the base 5.

The motor 11 drives the rotating portions of the feed turret 2 through the belt 16, pulley 17, and shaft 19 through a train of speed reduction gears mounted within the gear casing 21, which train is shown schematically in Figure 6. A slotted arm 13, linked to motor bracket 10, controls the tension of the belt 16 by fixing the position of the motor 11 on its bracket. A bolt 18, extending through the slotted arm 13, locks the arm relative to the bracket 10. A spur gear 22 is mounted on the shaft 19 within the gear casing 21. The spur gear 22 engages an intermediate gear 24 carrying a pinion 25 which in turn engages a second intermediate gear 26 carrying a spur gear 27, which in turn meshes with and drives a feed turret ring gear 29.

The gear train consisting of gear members 22 to 27, inclusive, is carried on shafts suitably journaled within the gear casing 21. The feed turret ring gear 29 enters gear casing 21 to engage the pinion 27 and is fixed to a rotating column 30 (Fig. 4) extending coaxially within the housing 9 and rotatably supported therein. At its upper end the rotating column 30 is fixed to, and drives, the feed turret mechanism to be described in detail subsequently. The feed turret ring gear 29 meshes also with a main turret ring gear 31 which is the main drive gear for the main turret 4. The structure connecting the main turret 4 and the main turret ring gear 31 will be described subsequently.

Returning now to the motor shaft 12, the peeling head drive pulley 14 carries a belt 32 which extends completely around a set of peeling head rotary cutter individual drive pulleys 34, each of which rotates the set of rotary cutters associated with each of the peeling heads 35 which are mounted within the main turret 4 and are rotated relatively thereto by gearing to be described subsequently.

An idler pulley 36 is mounted on an arm 37 rotatively secured within a bracket 39 fixed to the feed turret housing member 9 and is urged against the belt 32 by a spring 40 in order to take up any slack in the belt. It will thus be seen that the motor 11 drives the feed turret and the main turret, and also drives the peeling head cutters associated with each peeling head within the main turret so that they may rotate relative to their associated heads about their own axes and the heads themselves may rotate relative to the main turret while revolving as units with the main turret.

The connection between pulley wheel 17 and the shaft 19 is effected through a clutch 41 operated by means of a handle 42 (Fig. 2). This permits the operator to disengage the feed turret from the motor drive when desired.

About the clutch 41 a gear 44 is fixed to the shaft 19, which gear engages a correspondingly wide-toothed gear 45 fastened on a shaft 46 journaled in a bracket 47 fixed to the upper end of the feed turret housing 9. The upper end of the shaft 4₋ carries a rotary knife blade 49 which revolves in a horizontal plane and is protected by a guard 50. The knife 49 is adjustable vertically to control the cut from the stem end of the pear by means of a screw, (not shown but of conventional design) controlled by a hand wheel 51, and which is so positioned as to intercept each pear as it is carried around the feed turret to cut off the external portion of the stem and to square off a portion of the pear at that end to engage the stemming tube.

In Figure 2 I have shown a side view of the feed turret mechanism partially broken away for the sake of clarity and with one pear shown in the position it would occupy just after insertion by an operator. The pear 52 is shown as having its stem end within the feed ring 54 and as being engaged at its upper end within its calyx by a center or mandrel 55 and as being held on the axis determined through the pear by the feed ring 54 and the center 55 by means of a locking plate 56. The action of the locking plate 56 is controlled through a roller 57 which bears against the cam plate 59. The details of the pear-holding mechanism are set forth in Figures 8 to 14.

There are six of the pear-holding units detailed in Figures 8 to 14 disposed uniformly about the feed turret 2. The design there shown in detail has been invented to provide a readily accessible transfer unit into which the operator can feed the pears and which will accomplish the trimming of the stem and align the pear exactly with the stemming tube on the proper peeling head unit within the main turret. The means for transferring the pear from the feed turret to the main turret may be as illustrated in my copending application, Serial No. 382,630, filed March 10, 1941, patented March 24, 1942, No 2,277,036. This transfer mechanism as therein illustrated contemplates the movement of the pear during the interval of transfer along an arc of travel of the stemming tube 220 of the main turret. As herein illustrated, means are provided for causing the feed ring 54 and the associate pear-positioning means, including the center 55 and plate 56, to travel at the same speed through the same arc as is being traversed by the stemming tube 220 during the period of time when the stemming tube is being impaled along the stem axis of the pear and when the plate 56 and center 55 are being drawn from contact with the pear and the two fingers of the ring 54 are opening to permit the pear to pass out of the influence of the feed turret and into the main turret. This operation may be effected by the following mechanism:

A cam plate 60 is mounted axially of the feed turret 2 upon a stationary post 60ª mounted within the rotating sleeve shaft 30 and secured to the base plate 5. The cam plate 60 has formed on its under side two cam grooves forming inner and outer cam tracks 61 and 62. These cam tracks 61 and 62 are of proper width to receive an outer cam roller 64 and an inner cam roller 65. In Figure 8 the dotted lines 61ª represent the pitch line of the outer cam track and the dotted lines 62ª represent the pitch line of the inner cam track in which the rollers 64 and 65, respectively, travel.

As explained before, the feed turret is driven through the hollow vertical drive shaft 30, to the upper end of which is secured a spider 66 (Fig. 4) having an upper plate 67 and a lower plate 69. Both upper plate 67 and lower plate 69 have six arms 70 (Fig. 8) projecting radially therefrom and terminating in bushings 71. Suitable webs 72 are provided to strengthen the radially projecting arms 70, and the bushings 71 of the top plate 67 are aligned with the corresponding bushings 71 of the lower plate 69 so that spindles 74 may be fitted therethrough to secure pivotally the corresponding pear - holding unit. This mounting enables the entire unit to swing through a wide arc about the axis of the pin 74 under control of the rollers 64 and 65 traveling in the outer and inner cam tracks 61 and 62, respectively.

Each of the six pear transfer units mounted on the spindles 74 is identical with the others, so that it will be necessary to describe only one of them in detail. The transfer unit mounting frame 75 (Fig. 9) is supported on the spindles 74 by the engagement thereof with suitable bushings 76 projecting from the frame 75, and having bores 77 formed therein to fit over the spindles 74.

The transfer frame 75 comprises the upper arm 79 and a lower arm 80 joined by a dished plate 81. The dished plate 81 unites the upper and lower arms 79 and 80 into a single unit while permitting portions of the transfer unit to be described hereafter to swing within the space defined by the upper and lower arms 79 and 80 during its movement around the feed turret. Bushings 81ª are formed on the upper and lower arms 79 and 80 at the ends thereof, opposite those bushings 76 which engage the spindles 74, and through bushings 81ª are formed bores to receive pivotally a pivot pin 84 on which is pivotally mounted the pear-holding unit 85 of the transfer assembly.

Midway between the spindle 74 and the pivot pin 84 there is rotatably mounted on the dished portion 81 of the transfer frame 75 the inner cam roller 65, which extends upwardly from the transfer frame 75 to engage inner cam track 62, as described above. As the spider 66 rotates, the transfer frame 75 is rocked about its supporting spindle 74 by the inner cam roller 65, in accordance with the configuration of the inner cam track 62. At the same time the pear-holding unit is rotated with the transfer frame 75 on the spider 66, but is rotated about its pivot pin 84 independently of the rotational position of the transfer frame 75 about its spindle 74, because of the engagement of the outer cam roller 64 which is mounted on the pear-holding unit 85 with the outer cam track 61 in which roller 64 travels. The relative configuration of the outer and inner cam tracks 61 and 62 is designed, as has been expressed briefly above, to cause the pear-holding unit 85 in effect to pause to permit the operator to insert the neck of the pear into the feed ring 54 at one point of rotation around the feed turret, and to produce at another point in the feed turret's rotation a movement of the pear in an arc which may be identical with that in which the coring stem 220 is traveling, and at the same speed, so that the stemming tube may be inserted during a period when the pear is still firmly grasped by the pear-holding unit 85.

During the travel from the feeding position of the pears to the transfer position, the pear is engaged with the rotary knife 49 which cuts the stem end of the pear below the feed ring 54 and transversely to the stem axis of the pear. All of these objects are joined by the use of a cam track laid out as indicated in conjunction with the relative proportions shown for the transfer frame 75 and the pear-holding unit 85.

Turning now to the detailed structure of the pear-holding unit (Figs. 8 to 24, inclusive): A bushing 86, having suitable bore therein (not shown) to receive the pivot pin 84 is formed on the pear-holding unit main frame 87, in the upper portion of which is formed a boss 89 bored to receive a roller shaft 90, on which is rotatably mounted the outer cam roller 64. The lower portion of the pear-holding unit main frame 87 has a clamp finger frame seat 91 formed thereon, to which a clamp finger frame 92 may be secured by means of a bolt 94. At the outer end of the clamp finger frame 92 are formed suitable bores 95 to receive clamping finger supporting shafts 96. The clamping finger supporting shafts 96 have heads 97 (Fig. 10) of greater diameter than the shafts 96, which position them relative to the bores 95 at their upper ends. On the lower ends of the shafts 96 are secured the clamping fingers 54 by means of set screws 98. The feed ring 54 (Fig. 14) is of divided construction and each section of the ring 54 is pivoted on its shaft 96 and has formed integral therewith meshing gear teeth 99. One of the divided members of the ring 54 is formed with an extended arm 114 which carries at its outer end a cam roller 112. This mechanism is provided to enable the two sections of the feed ring 54 to swing away from each other to open the throat 54ª so that the stem of the pear may be moved out of the feed ring during transfer to the main turret. The opening in the feed ring 54 is of sufficient diameter to permit the stem of the pear to pass into the ring but is insufficient to permit the butt of any pear to pass through the ring.

Means are provided for actuating the cam roller 112 and are herein illustrated as including a releasing cam plate 100 (shown in Figures 2 and 4), fastened to a portion of the feed turret top plate 60, which projects into the main turret 4. As the pear approaches the transfer position, the finger releasing cam plate 100 is engaged by a roller 101 rotatably mounted in a roller arm 102 by means of a roller stub shaft 103 fixed to a shaft 104 journaled in a suitable bore in bracket arms 105, formed integrally with the transfer frame 75 adjacent to the pivot pin bushings 81ª. The shaft 104 has a stub shaft 106 fixedly secured parallel thereto by means of a bracket member 107. A set screw 109 fixes the position of the bracket member 107 relative to the stub shaft 106 and a similar set screw (not shown) fixes the position of the bracket member 107 relative to the shaft 104. At the lower end of the stub shaft 104 is fixed a camming member 110 formed as having a semi-cylindrical cam wall 111, disposed about a stub shaft 106 as a center, and engaging a clamping finger cam roller 112 which is rotatably mounted on and upwardly extending from a lever arm 114 formed integrally with the actuating member 115 of the divided feed ring 54.

A helical spring 117ª is disposed about the stub shaft 104 and is secured to the bracket member 107 at its lower end by an anchor pin 119. Its upper end is fixed relative to the bracket arms 105 formed integrally with the transfer frame 75 and the tension in the spring is sufficient to maintain the divided feed ring normally closed. The divided feed ring thus occupies the closed position except when the roller 101 engages the releasing cam plate 100, at which time the cam plate forces the roller to rotate through roller arm 102 the shaft 104 which in turn causes the bracket member 107 to turn about that shaft and to move the semicylindrical cam wall 110 against the clamping finger cam roller 112, rocking the lever arm 114 about the supporting shaft 96 opening the divided feed ring so that the stem end of the pear may pass through the throat 54a during transfer and as the continuously operating turrets continue their operation.

Means are provided for positioning the pear in the feed ring 54 to determine a longitudinal axis therethrough which corresponds substantially with the stem axis of the pear which means are herein illustrated as being of the following construction: The pear is positioned by a pointed mandrel or center 55, and the locking plate 56, which are designed to hold after centering by the center 55, the pear securely regardless of its size or shape. The mandrel or center 55 engages within the calyx depression of the pear and after this engagement the locking plate 54 is engaged with the butt end of the pear to hold the pear in the position thus established between the ring 54 and the center 55. The operation of these positioning members is under the control of two rollers, a mandrel positioning roller 120a, and a locking plate controlling roller 57 (Figs. 10 and 11).

The mandrel 55 engages the pear through an aperture 121 in locking plate 56, and is supported by the mandrel frame 122, having a downwardly extending mandrel release cam 125. The mandrel frame 122 is pivotally supported from the pear-holding main frame 87 by a lower mandrel frame supporting arm 127 and an upper mandrel frame supporting arm 126 so that the mandrel frame can move up and down while being held horizontally by the upper and lower supporting arms 126 and 127.

The mandrel frame 122 is controlled in its vertical position by the engagement of the mandrel release cam 125 with the mandrel release cam roller 129, which is rotatably mounted by means of the pin 130 in the bifurcated arm 131, pivotally mounted on the main transfer frame 87 by means of the shaft 132 which also supports the upper mandrel frame supporting arm 126. The mandrel 55 is normally urged downwardly against the pear by a spring 134 supported on a bracket 135 formed on the frame 87 and engaging a transversely extending spring arm 136 formed integrally with the bifurcated arm 131 by an additional spring 137, disposed within a cylindrical spring housing 138 formed integrally with the frame 87.

An adjusting screw 140 is threadedly disposed within the spring housing 138 to control the tension of the spring 137 which bears at its lower end against the spring engaging plate 141 formed integrally with the lower supporting arms 127. The lower supporting arms 127 are separated to fit around the bifurcated arm 131 and the spring engaging plate 141 forms a web connecting them. A similar connecting web 142 is provided so that the single upper arm 126 may be supported at two points on the shaft 132. At the lower end of the bifurcated arm 131 a mandrel positioning cam roller 120 is mounted and is freely rotatable about the long axis of the bifurcated arm 131.

The mandrel positioning roller 120 is drawn into the mandrel positioning cam track 144 (Fig. 2) mounted on a mandrel positioning cam track bracket 145, secured to the feed turret housing 9 as the transfer unit approaches the position in which the operator is to insert a fresh pear. When the roller 120 engages cam track 144 it is first drawn inwardly toward the center of the turret for a slight distance which draws up the mandrel 55 to allow the operator to insert the pear into the clamping fingers 54.

When the mandrel has been raised to its highest position, a locking cam section 146 formed on the mandrel release cam 125 locks the bifurcated arm 131 in the position shown in Figure 11.

The operator inserts the pear and as the feed turret continues to rotate the cam track 144 displaces the mandrel positioning roller 120 outwardly about its turret shaft 132 just sufficient to enable the roller 129 to clear the shoulder 147 of the locking section 146 of cam 125. Thereupon the springs 134 and 137 cause the mandrel to drop downwardly and engage the upper end of the pear. This engagement continues until the feed turret rotates to the transfer position, which is that occupied by the pear 52 shown in the dotted outline in Figure 4. In this position the stemming tube 220 has engaged the pear and the divided feed ring 54 is about to be opened by the action of roll 101 against the cam plate 100. At this point the mandrel 55 is raised by the engagement of the mandrel releasing cam surface 1201, formed on the bracket member 1202 pivotally mounted on the inner side of the lower mandrel frame supporting arm 127. The mandrel releasing cam surface 1201 is rotated by the same means which produces the opening of the clamping fingers 54 and raises the entire mandrel assembly into the upper locked position which it occupied prior to the insertion of the pear, as shown in Figure 11, where it remains until time to engage another pear.

A two-fold support of the upper portion of the pear is provided to hold the pear firmly during the insertion of the stemming tube without damage to the pear meat. This additional support is provided by the locking plate 56 which fits over a large area of the top of the pear. The locking plate 56 makes this supporting contact with the pear by means about to be described, and is arranged so that the desired wide contact area is obtained for any size and shape of pear automatically. The position of the locking plate 56 is controlled through the locking plate positioning roller 57 by the locking plate controlling cam plate 59 (Fig. 8). The cam plate 59 is secured to a substantial portion of the periphery of the feed turret top plate 60 by suitably placed brackets 1204. The cam plate 59 is of substantial width so that the roller 57 may be engaged thereby over the wide path occasioned by the swinging in and out of the pear supporting unit as it travels around the feed turret 2.

During the portion of the feed turret rotation in which the pear-holding unit is approaching the position at which the pear is to be inserted in the clamping fingers, the cam plate 59 holds the roller 57 down. As the roller is forced down by its engagement with the initial portion 1205 of the cam track 59, it rotates about a pivot pin 1206 (Figs. 12 and 13) which supports the roller arm 1207 to which the roller 57 is attached, and which is journaled in the head portion 1209 of the mandrel frame 122 into which portion the mandrel 55 is itself secured by a set screw 1210 (Fig. 11).

The roller arm 1207 is supported by the mandrel frame head portion 1209 through the medium of shaft 1211 secured to the roller arm by set screw 1212, and pivotally journaled in the head portion 1209. The shaft 1211 is terminated by the head 1214 having an anchor stud 1215 against which is disposed a positioning spring 1216, the opposite end of which engages an anchor stud 1217 in the mandrel head portion 1209 (Fig. 9). The spring 1216 is so adjusted as to normally urge the roller 57 upwardly against the cam plate 59. The release cam plate 1219 is fixed to the roller arm 1207 and about shaft 1211. When the roller arm 1207 is forced downwardly by the cam plate 57, the release cam 1219 engages the release cam roller 1220, rotatably mounted on the locking plate frame 1221, to which the locking plate 56 is attached. The locking plate support bracket 1222 is secured to the mandrel frame head portion 1209 by suitable screws 1224, and carries the locking plate frame 1221 pivotally by means of a shaft 1225 disposed therethrough as shown in Figures 12 and 13. Hence the pushing down of the cam roller 57 raises the plate 56 and holds it out of engagement with the pear during the time that the pear is inserted in the feed ring 54 and until the mandrel 55 has been moved into the pear calyx. As the pear approaches the transfer point the cam plate 59 curves outwardly as shown in Figure 2 at 1226, and gradually removes the release cam 1219 from engagement with the release cam roller 1220, so that the locking plate 56 may drop down onto the upper portion of the fruit by gravity and by the action of the compressed spring 1227 disposed between the locking plate frame 1221 and the locking plate supporting bracket 1222.

Once the locking plate 56 has engaged the fruit, it is fixedly secured in whatever position the engagement occurs by an eccentric lock which is shown in detail in Figures 12 and 13. A roller 1229 is eccentrically mounted on the shaft 1206 supporting the cam roller arm 1207 within a slot 1230 formed in the mandrel head portion 1209. In the slot there is also disposed a vertically slidable locking bar 1231, which extends beneath the mandrel head portion 1209 and is connected by a pivot 1232 to the locking plate frame 1221. The downward movement of the locking bar 1231 is limited by the engagement of a locking lug 1233 formed thereon with a lug seat 1234 formed in the support bracket 1222. As long as the cam 57 is depressed by engagement with the cam plate 59 as shown in Figure 12, the eccentric roller 1229 does not engage the bar 1231 and consequently the locking plate 56 is free to move up and down as desired. When, however, the cam roller leaves the cam track 59 as illustrated in Figure 13, which corresponds to the relations existing as the roller 57 leaves the upwardly curving portion 1226 of the cam track in approaching the transfer point, the rotation of the eccentric roller brings it into contact with the slide 1231 and locks it vertically, thus fixing the position of the locking plate 56. It will thus be seen that as the pear approaches the point at which it needs support while the stemming tube is inserted into it, the locking plate engages it over a wide area and holds it securely against vertical displacement, and holds it until the entire mandrel frame and locking plate are released upwardly by the engagement of the clamping fingers releasing roller 101 of the cam plate 100. An important function is performed by the above-described combination of calyx center 55, pear neck-supporting ring 54 and lock plate 56. By determining the initial position of the pear from the calyx thereof as supported by the ring 54, the position of the seed pod or cavity within the pear is established. The lock plate 56 holds the pear in the established position so that the stemming tube 220 is thrust into the pear a definite distance along the stem axis; thus the pear is positioned in definite vertical position on the stemming tube 220 with definite relation to its seed pod.

The main turret drive will next be considered. Referring back to Fig. 4, it will be recalled that the motor 11 drives the main turret through the feed turret ring gear 29 with which the main turret ring gear is in mesh. The main turret ring gear is fastened by bolts 455 to a cylindrical casting 456 which rotates about the main turret supporting column 154. The cylindrical casting 456 is supported in turn by spider 457 secured thereto by suitable bolts 458. Spider 457 has six symmetrically spaced arms 459 (Fig. 7) extending radially outward and reinforced by webs 460. A bushing 461 forms the outer end of each arm 459 through which upwardly extends spider columns 462 secured to spider 457 by nuts 463 (Fig. 2). The six spider columns 462 extend parallelly upward from spider 457 to extend through and be fastened to the peeling head supporting plate 150. The plate 150 is secured to main turret outer tubular shaft 165 (Fig. 4), the upper portion of which is shown in detail in Fig. 29. On the upper portion of the main turret supporting column 154 is formed a shoulder 464 about which is fixed a thrust bearing 465. An annular bearing and supporting plate 466, freely rotatable about the main turret supporting column 154, carrying the entire weight of the rotating elements of main turret 4, is disposed on top of the thrust bearing 465 and is secured by bolts 467 to the main turret outer tubular shaft 605. About the annular bearing and supporting plate 466 there is disposed a coring head supporting casting 468 which will be described in greater detail hereafter, and which is fastened to the outer column 165 for rotation therewith, transmitting the weight of the entire load consisting of the coring head units, the peeling head assemblies, and the peeling head spider, to the bearing plate 466. The peeling head spider column 462 with spider 457 are driven as a unit by the main turret drive ring gear 31 and are supported as they revolve about the main turret supporting column 154 by the annular thrust bearing 464.

Above the spider 457 I secure to the supporting column 154 an annular stemming tube cam plate 471 (Fig. 4) and upper and lower ring gears 151 and 152 respectively. As the main turret is driven around the column 154 by the main turret drive gear 31, the stationary stemming tube cam plate 471 controls the movements of the stemming tube 220 as will be described hereafter, while the upper and lower ring gears 151 and 152 drive elements of the peeling head units 35, as will also be described in detail below.

Figure 7:
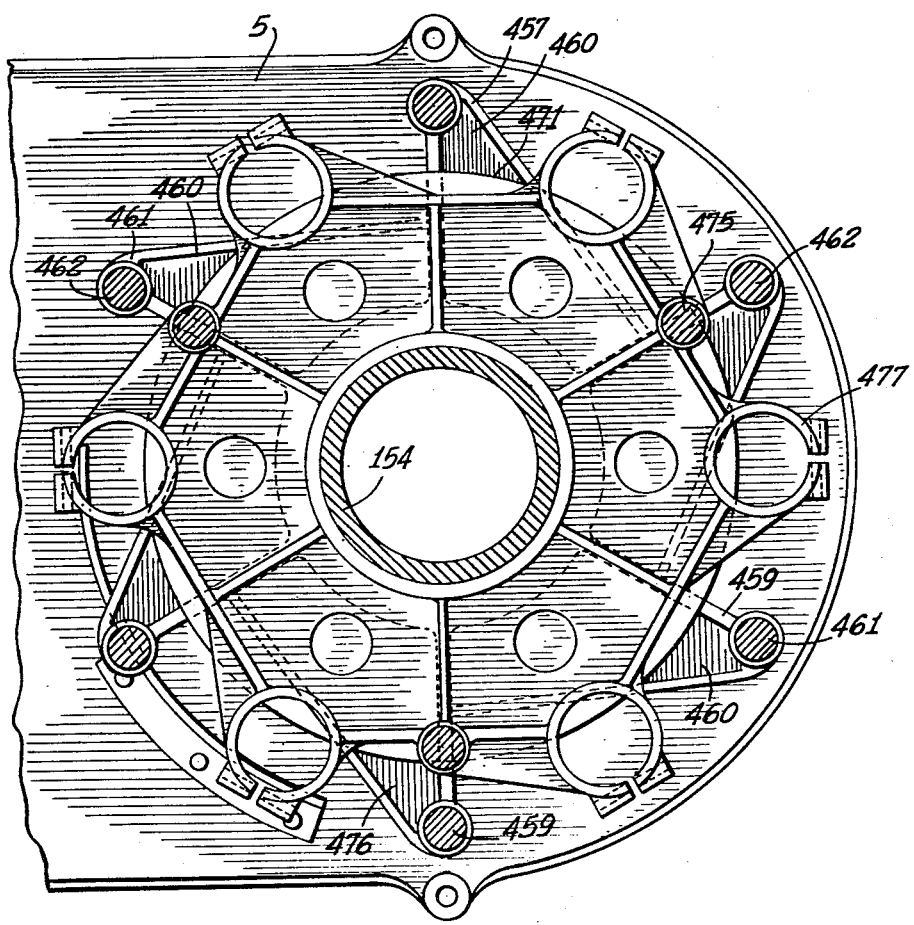
Figure 7 is a top sectional schematic view of the main turret spider assembly which susports the stemming tube assemblies.
Figure 15:
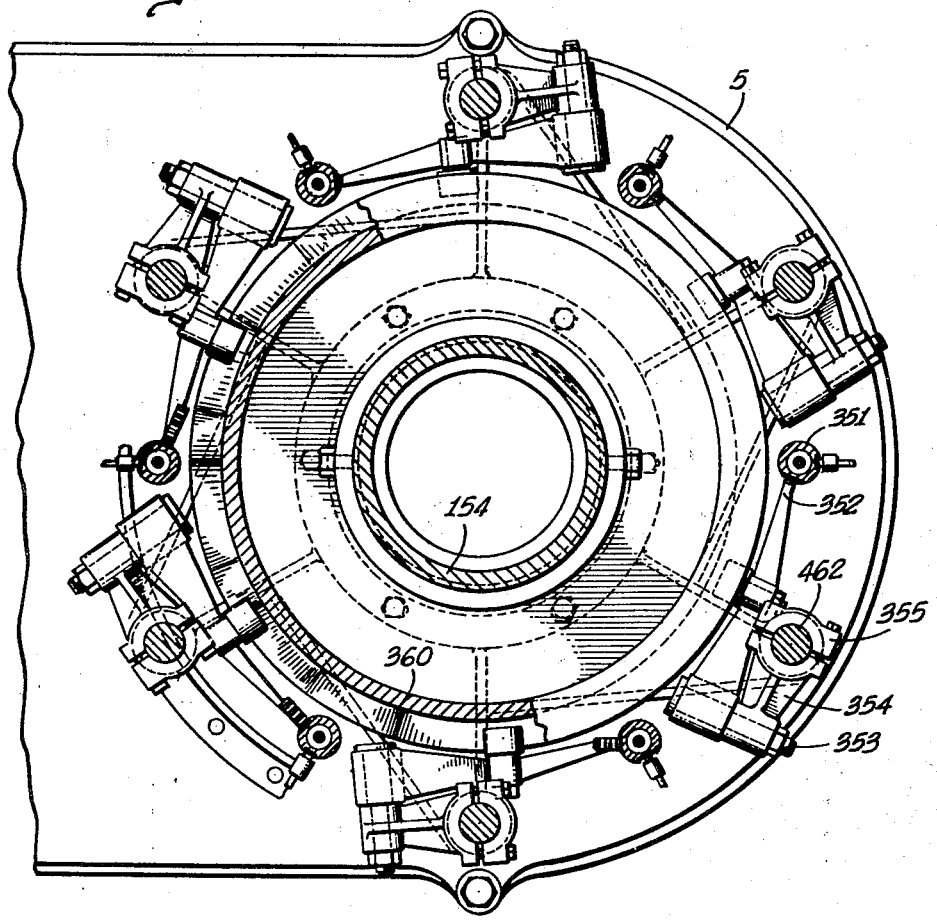
Figure 15 is a top sectional view of the main turret taken beneath the point of attachment of the stemming tubes.

Returning now to the structure of the peeling head as set forth in Figs. 4, 6 and 7: The plate 150 has formed therethrough the bushings 468a which receive the upper ends of the spider supporting columns 462, and bushings 474 through which is fixed by conventional means the inner spider supporting columns 475. Columns 475 extend below the lower ring gear 152 and have fixed thereto a pulley wheel spider 476. The pulley wheel spider 476 has formed thereabout six adjustable bushings 477. A bolt 479 is provided with each of the adjustable bushings 477 by means of which the stemming tube assembly 351 may be fixedly secured in place. The stemming tube assembly (Fig. 19) carries the stemming tube 220 and around it are disposed the tubular shafts about which the gears driven by upper and lower ring gears 151 and 152 and peeling head drive pulley 34 rotate.

As explained above the annular bearing plate 466 carries the entire weight of the rotating turret, the thrust bearing 465 and the weight of the rotating parts is transmitted to the plate by bolts 467 engaging the outer column 165 and by a cylindrical coring head casing 468, which is force fitted at its upper end around the bearing plate 466 and is supported at its lower end to the outer column 165. An annular shoulder 1251 is formed about the member 165 on which is seated a supporting ring 1252. Ring 1252 is fixed by a bolt 1254 in its position against the annular supporting ring 1251, and has externally formed adjusting threads 1255 thereon, onto which is screwed an adjusting collar 1256. The collar 1256 in turn supports by means of bolts 1257 the lower annular portion 1258 of the cylindrical casting 468. The lower portion 1258 of the casting has formed thereabout a groove in which is seated an annular girdle 1260, with which the bolts 1257 are threadably engaged.

It will thus be seen that the vertical position of all of the rotating parts supported by the cylindrical casting 468 within the upper turret housing 600 may be adjusted as desired by rotating the adjusting collar 1256 about the supporting ring 1252.

There are also secured to the lower annular portion 1258 of the casting 468 lower slide supporting bolts 1261, which secure the lower ends of the slides 752 on which the impaling blade bracket 702 travels. The upper ends of slides 752 are secured by suitable bolts 750a to a ring collar 504 disposed about the upper portion 751 of the cylindrical casting 468. The brackets 706 are also secured to the casting 468 between each adjacent pair of slides 752, and extend outwardly for the attachment thereto of splitting blade bracket outer slides 737. On these slides, the inner slide 752 and the outer slide 737, the splitting blade bracket 702 is free to travel vertically under the control of a cam roller 751a pivotally mounted thereon and extending outwardly to ride in the impaling cam track 752a of the circular cam plate 754. Since the splitting and the impaling both are accomplished by elements mounted on the same bracket 702, this unit will be referred to interchangeably as the splitting or the impaling assembly.

The brackets 706 and their component parts are shown in detail in Figs. 32, 33 and 34.

Bracket engaging surfaces 721 (Fig. 31) are formed hexagonally about the cylindrical casting 468 to which a base plate portion 730 of bracket 706 is secured by means of bolts 724. In the base plate 730 there extend radially ribs 731 (Fig. 32) which are connected by a horizontal web plate 732 (Fig. 30), having an aperture 735 formed therein. At the outer extremity of each of the radial ribs 731 is formed a vertical slide seat 736, to each of which is secured an impaling blade slide 737. Thus the adjacent impaling blade slide 737 with adjacent brackets 706 form the outer tracks on which the impaling blade assembly 702 travels. Midway between the slide seats 736 on each bracket member 706 are disposed clamping assembly slide seats 741, to which are secured clamping assembly slides 739. Slides 739 constitute the track upon which the slide bracket carrying the clamping fingers will travel.

The impaling blade assembly (Fig. 29) has fixed thereto a bracket arm 701 which carries the splitting blade 400, with which is formed integrally the impaling blades 405 and 406 and the upper coring and guide tube 407. The bracket arm 701 is so shaped that the splitting blade 400 is in a plane extending outward radially with the turret, midway between adjacent brackets 740 (Fig. 30), which position places the upper coring tube 407 in direct vertical alignment with the stemming tube 220.

Returning now to the bracket 706; in addition to carrying the slides on which the clamping assembly travels, this bracket supports the coring head assembly 612. A top plate 712 (Fig. 32) is attached to the bracket 706 by means of bolts 713. In top plate 712 are formed vertical bushings 707a (Figs. 29 and 34) through which are fixed coring head supporting rods 610 to which are connected the coring heads 612, as will be described in detail subsequently.

An intermediate drive shaft journal 709 is also formed in the top plate 712, through which extends a coring head intermediate drive shaft 614 having a pinion 615 at its upper end and having a link member 620 at its lower end for connection to the coring head unit 612. A sector shaft journal 746 is also formed in the plate 712 in which is journaled a sector shaft 716. On sector shaft 716 is mounted a toothed sector 717 engaging the pinion 615 and having affixed rotatably thereto a coring head drive roller 719. Coring head drive roller 719 extends upwardly from the sector 717 to travel in the coring head cam track 604, formed in an annular core head cam plate 602 affixed to the under side of the top surface 601 of the main turret outer casing 600. The coring cam track 604 is so shaped as to produce a reciprocating movement of the rack and consequently to drive the coring unit reciprocally as explained in detail hereafter.

The splitting blade supporting bracket assembly comprises the splitting blade 400 which is secured by suitable bolts 700 to splitting blade bracket arm 701 which extends obliquely from a slide member 702 and the bracket body 740. The bracket slide body 740 at the outer end has two parallel grooves 750 vertically disposed therein which are arranged to slide between vertical slide members 737. The blade supporting bracket arm 701 is so spaced as to hold the splitting blade 400 radially midway between adjacent brackets 740 (Fig. 30) so that as the bracket unit moves up and down on the guides 737 and 752, the splitting blade 400 travels vertically in the space between adjacent brackets 740, where it is aligned with the stemming tube 220 associated with the peeling head 35 disposed immediately beneath. The entire bracket assembly splitting and impaling blade 400 is caused to move up and down within the guides by the engagement of the splitting blade cam roller 751a with the cam impaling track 752a, formed in the lower portion of the cylindrical cam plate 754, positioned within the stationary main turrent outer housing 600. The impaling cam track 752a forces the impaling blades 405, 406 into the pear, supporting the pear for the peeling operation, and subsequently holding the splitting blade 400 while the pear is drawn over it by the clamps 916 up into the upper coring blade 628 where it is held during the coring operation, after which the cam 752a returns the impaling and splitting blade unit 400 to its initial position upon release of the split pear halves.

Now returning to the slides 739 positioned centrally of the bracket member 706: These slides provide a track on which the clamping fingers assembly 900 operates (Fig. 42). The clamping finger assembly 900 consists of the clamps 916, and controls the mechanism to grasp the peeled pear immediately after the conclusion of the peeling operation by the upper and lower peeling head cutters 310 and 182. The clamping assembly then draws the pear which has been held previously by the stemming tube 220 and impaling blades 405 and 406 over the splitting blade 400, then completes the separation between the halves while at the same time the splitting blade 400 is being drawn upward by its associated cam 752ª so that the plug of core fibers cut out by the stemming tube 407 of the splitting blade 400 is forced out by the stem ejector plunger 416. The clamps 916 continue to hold the pear while it traverses it to the proper alignment with the coring blades 663 and 664 (Fig. 55) and the calyx end trimming knives 644. The clamping fingers maintain their control of the paired halves until the coring and trimming operations have been completed, where it then releases the halves which are free to drop into the discharge chute 1270 (Fig. 2). The functioning of the clamps 916 is controlled fundamentally through the clamp operating cams 898 and 899 which are formed in the cylindrical cam plate 754.

In Figures 35 to 38 I have shown details of the splitting blade 400 on which are formed the impaling blades 405 and 406, which are forced into the pear opposite the stemming tube 220 to support it rigidly during the operations of the peeling head. The splitting blade has the additional functions of halving the pear before it is transferred to the upper coring plate 628 for the coring operation, and of cutting from the pear the upper portion of the stem fibers.

In Figure 35 I have shown the blade 400 detached from the supporting bracket 701 shown in Figure 30. Blade 400 comprises a bracket-engaging portion 401 having suitable bores 402 formed therein for the insertion of bolts 403 for attachment to bracket 701. The blade 400 is broad enough to extend well beyond the diametrical limits of the largest pear to be processed and tapering down centrally to a bifurcated impaling knife portion 404 having two very sharp thin impaling blade portions 405 and 406. I dispose an upper stemming tube 407 vertically in blade 400 and centrally of impaling blades 405 and 406. The upper edge 408 of blade 400 is V-shaped to fit the lower edge of the coring head plate 628 and has a recessed seat 409 formed therein to receive the head 410 of an ejecting plunger 411. When the splitting blade 400 is forced through a pear, the upper stemming tube 407 cuts out a plug 412 of stem fibers. As the impaling cam track 752ª moves the blade 400 upwardly for the transfer of the pear into coring position by the clamps 916, the head 410 of the ejecting plunger 411 engages the lower end of the stem cavity guide 630 of the plate 628 (Fig. 37) and as the blade 400 continues to move upwardly relative to the coring head plate 628, the plunger 411 ejects the plug of stem fibers 412. A fiber engaging plug 414 is threadably secured to a threaded portion 415 formed on the lower end of plunger 411. The fiber engaging plug 414 is of the same diameter as the interior of the coring tube in the lower portion thereof. The upper portion 416 of the stemming tube 407 is of the proper diameter to make a sliding fit with the plunger 411, and the juncture 417 of the bore portions of greater and lesser diameter forms a stub shoulder 417 against which the fiber engaging plug 414 strikes to limit the upward travel of the plunger 411.

The lubricating and water distributing system is arranged to supply the necessary lubrication and water to various portions without interference to the rotating parts. In the upper portion of the main turret supporting column 154 there are formed bores 800 (Fig. 29) having an oil feed pipe 801 extending diametrically therethrough and connected centrally to a vertical oil feed pipe 804 extending through the supporting top closure plate 805 and having fastened thereto an oil insertion feed fitting 806. The bores 800 are formed in the supporting columns 154 immediately below the thrust bearing 465 and serve to lubricate the surface 807 of the supporting column about which revolves a corresponding engaging surface 809 formed within the main turret outer column 165. The engaging surfaces 807 and 809 help to maintain alignment of the main turret 4 as it revolves on and is supported by the thrust bearing 465. The top bearing and supporting plate 466 which rests on the thrust bearing 465 and transmits the weight of the moving portion 4 has formed thereon driving lugs 810 and 811 which mesh with corresponding driving lugs 812 extending downwardly from an annular drive-in plate 814 fixed by bolts 505 to the cylindrical member 468. Bolts 505 also secure the collar member 504, to which bracket slides are attached as described elsewhere. The main turret-driving force is communicated by the lugs 810, 811 and 812 to the driving plate 814 and by it through bolts 505 to the main turret outer casting 468.

The annular drive plate 814 has the additional function of forming a part of the water supply system. The upper periphery of the annular plate 814 has an annular recess 815 cut therein to which is secured an annular water chamber 816 by symmetrically placed bolts 817. The water chamber 816 has a number of openings 818 on the top surface thereof and is closed at the bottom by a sealing gasket 819. This annular chamber 816 is fed as it revolves with the turret through a stationary annular feed ring 820 (Fig. 29) supplied by three water pipes 821 supported on the main turret outer casing 600 fed by a common supply pipe 822 (Fig. 39). The ring 820 is pressed down resiliently against a gasket 826 seated on the upper surface 827 of the annular water chamber 816 by means of a helical spring 824 (Fig. 29) disposed about each of the feed pipes 821 and secured in position by a collar 825. A control valve 831 (Fig. 1) is provided in the supply pipe 822, and it may be desirable in some cases to use a pressure reduction valve, not shown, in conjunction therewith.

Water enters the chamber 816 for distribution through the gasket apertures at such intervals that the water is sprayed through a jet, not shown, but fixed to a water distributing pipe 830 (Fig. 29). One of the distributing pipes 830 is attached to the water chamber 816 adjacent each of the coring assemblies 612, and a branch pipe, not shown, is arranged to direct a jet or water against the core head parts six times during the rotation of the turret, to remove the pear juice therefrom and keep the splitting plate 628 and the blade 400 clean. The distributing pipe continues downwardly to the peeling head supporting top plate 150, and passes therethrough for the connection thereto of the flexible hose 1012 (Fig. 19) for the purpose hereinafter to be described. Oil grooves and lubricating fittings are provided in accordance with the conventional engineering practice at other necessary points throughout the machine but will not be specifically referred to.

Let us consider next the operation of the stemming tube 220. The pear, with its stem end trimmed off squarely by the rotary knife blade 49, has been carried by the feed turret transfer unit to a position immediately above the stemming tube 220, and is now traveling under the control of the various feed turret and transfer unit cams in a path which is identical with the arc in which the stemming tube is moving, and at exactly the same speed. The upper end of the pear is securely held by the locking plate 57 and we are now ready for the beginning of assumption of control over the pear by the main turret mechanism, which acts in its first stage through the stemming tube 220.

Figure 3:
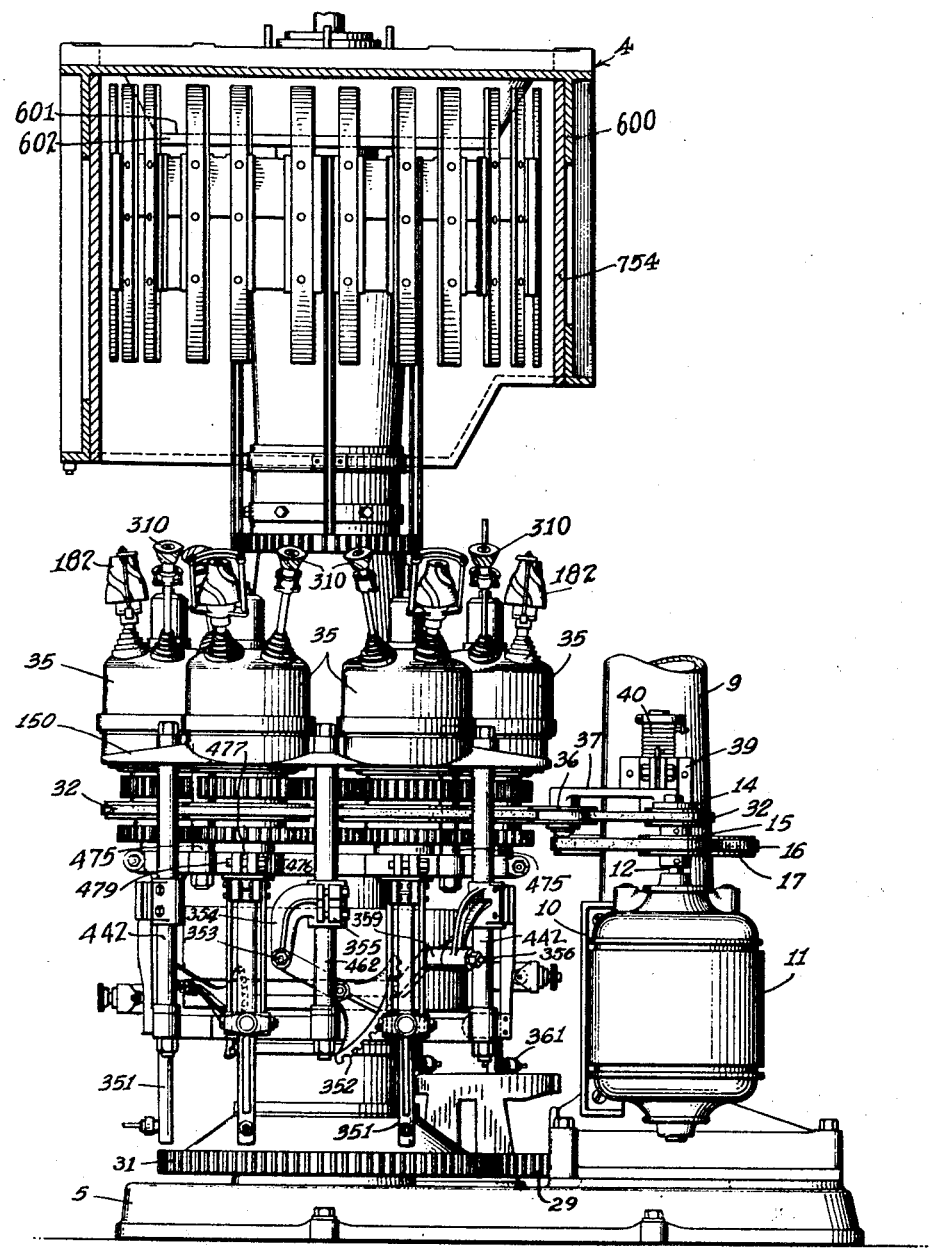
Figure 3 is a side view of the main turret and a portion of the feed turret, taken from the opposite side to the view shown in Figure 2.

At this time the entire stemming tube assembly, generally denominated as 351, has been drawn down to the lowest point in its travel by the action of a stemming tube sector 352 which is supported through a pivot shaft 353 journaled in the bracket arm 354 attached by a clamping member 355 to the spider column 462 (Fig. 3). This position corresponds to point 4 of the stemming tube cam track as laid out in Fig. 78 of the drawings. A grease fitting 356 may be attached to the pivot shaft 353 to provide for adequate lubrication. Spider column 462 forms a part of the main turret rotating assembly previously described.

Figure 16:
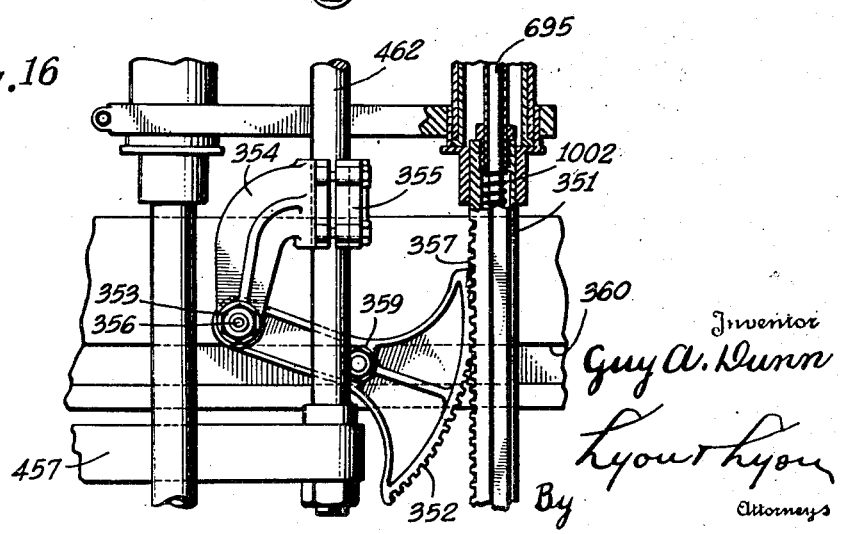
Figure 16 is a fragmentary view showing the cam sectors controlling the stemming tube.

The sector 352 draws down the stemming tube assembly 351 by engagement with the rack 357 cut into the side of the stemming tube assembly, as shown in detail in Figs. 16 and 17, under the influence of a sector cam roller 359 rotatably secured to the sector and extending inwardly therefrom to travel in a sector cam track 360 cut into the cam plate 471 previously described, and which is fixedly mounted on the main turret supporting column 154. As the main turret revolves about the supporting column, the sector cam roller 359 is displaced vertically by the sector cam track 360 to control the vertical position of the stemming tube assembly 351.

As the stemming tube assembly is rotating into the described position for the beginning of the transfer from the feed turret, an operation occurs to remove the stem fibers remaining in the stemming tube from the previous pear. A clearing roller 361 (Fig. 2) is dropped onto an auxiliary curved cam plate 362, supported by a bracket 364 fixed to the base 5, the cam 362 being concentric with the main turret 4. The curved cam plate 362 is substantially horizontal throughout its length, except for a short downwardly curved striking portion 365 to ease the impact at engagement; hence as the turret continues to rotate and the sector continues to draw down the entire stemming tube assembly from point 3 to point 4 on the cam track chart (Fig. 18), the roller 361 is displaced upwardly with respect to the stemming tube assembly 351. The purpose of this displacement and of the parts associated therewith and about to be described, is to remove the fibers from the previous pear from the stemming tube.

Figure 19:
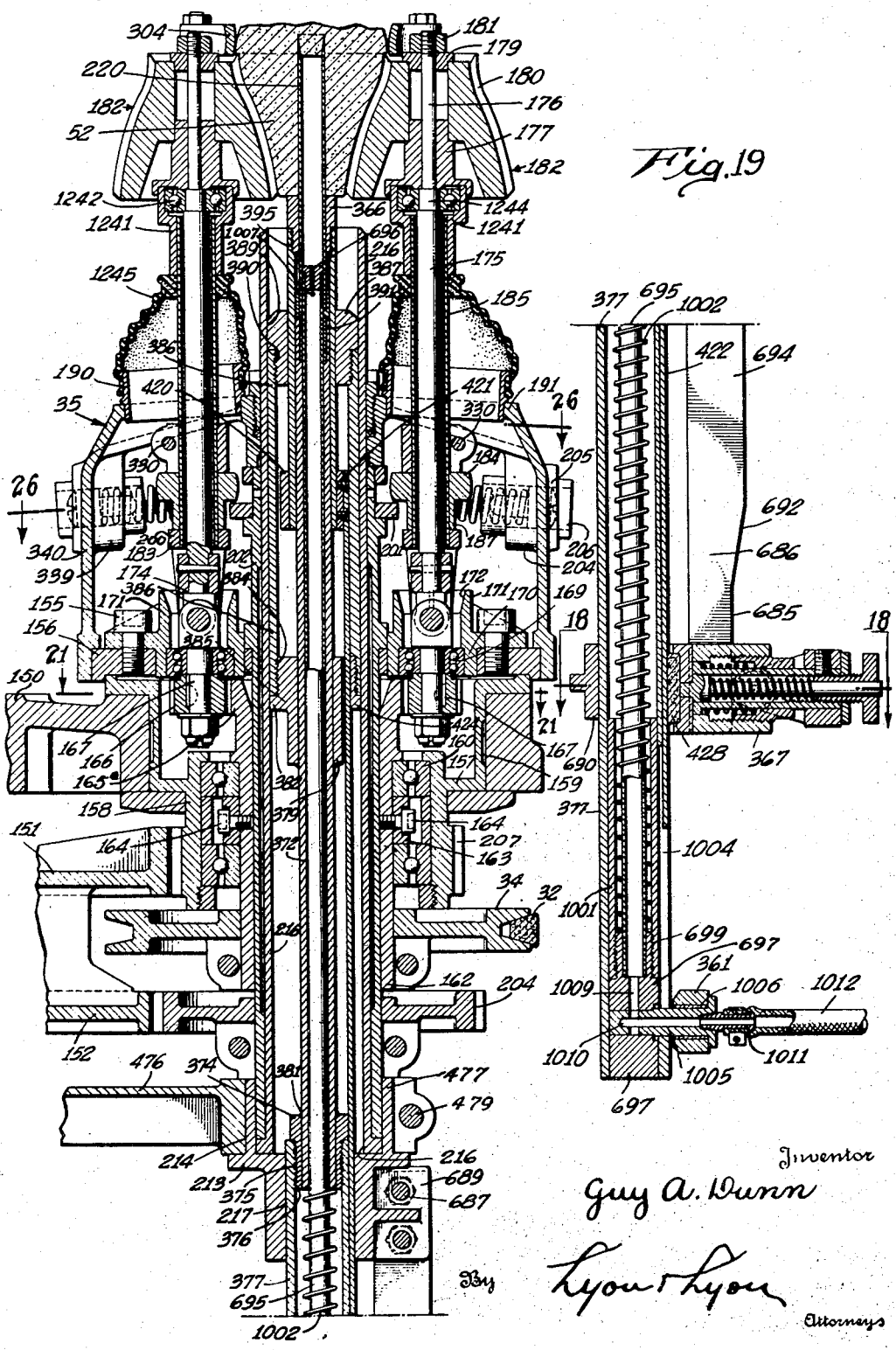
Figure 19 is a sectional view of the peeling head and stemming tube assembly.

In order to understand this preparatory movement we must consider in detail the structure of the entire stemming tube assembly 351, which is shown in detail in Fig. 19, and of the friction locking assembly 367 associated therewith which is illustrated in sectional view in Fig. 18.

Returning now to the specific structure of the stemming tube assembly 351 (Figs. 19 and 20), which assembly is vertically displaceable centrally of the peeling head 35 and of the various drive gears and pulleys actuating the peeling head: A stemming tube mounting collar 213 is fixed in a stemming tube collar bore 214 formed in the lower spider member 476 by means of the locking bolt 478. Within the mounting collar 213 there is fixedly secured a cylindrical stemming tube guide 216 in which the stemming tube head assembly, generally denominated 370, is slidably positioned. The stemming tube sector assembly 371, which comprises the entire lower portion of the entire stemming tube assembly 351, is slidably disposed in the sector assembly bore 217, formed within the mounting collar 213. Hence, the cylindrical stemming tube guide bore 216 supports and guides the stemming tube head assembly 370, while the sector assembly bore 217 functions similarly for the stemming tube sector assembly 371.

The stemming tube head assembly 370 is joined to the stemming tube sector assembly 371 by means of a cylindrical connecting shaft 372, which is removably attached to the lower sector assembly 371 by means of a connecting bushing 374 rigidly secured to the connecting tube 372. The connecting bushing 374 is externally threaded at 375 to engage with threads 376 formed internally of the cylindrical rack bearing member 377, which comprises the outer housing of the sector assembly 371. The connecting shaft 372 is fixedly secured to the head assembly 370 by means of a bushing 379. The bushing 379 is bored to fit tightly around the connecting shaft 372, and may be fixed thereto by means such as a fillet weld. A similar fillet weld 381 might be used, for example, in fixing the connecting bushing 374 to the connecting shaft 372. An annular shoulder 382 forms a part of bushing 379, and is of such diameter as to slide freely within the guide member 216. Threads 384 are formed externally about a reduced diameter portion 385 of bushing 379 about which may be secured an internally threaded connecting sleeve 386 into the upper end of which may be threadably inserted a top bushing 387. The outer diameter of the connecting sleeve 386 is the same as that of the shoulder 382, and the top bushing 387 also has a shoulder 389 of similar diameter. A reduced diameter externally threaded shank 390 is formed on the top bushing beneath shoulder 389 for attachment to the internally threaded connecting sleeve 386. The cylindrical connecting shaft 372 extends through both bushings of the head assembly. Internal threads 391 (Fig. 20) are formed at its upper end for the insertion of the externally threaded shank 392 of the cylindrical coupling member 394, which is of proper diameter at its upper end for the insertion of the stemming tube 220, which is fixedly secured thereto. When it is necessary to remove one of the stemming tubes 220 for sharpening or replacement, the tube 220 and coupling member 394 are unscrewed as a unit from the internally threaded connecting shaft 372.

About the upper portion of the connecting tube 372 there is slidably disposed a cylindrical collar supporting tube 395, which is also slidable within the bore 396 through the top bushing 387. Threads 397 are formed internally in the upper end of the collar supporting tube 395 to receive a threaded shank 397 downwardly extending from the bore engaging collar 366.

The bore formed in the collar 366 permits the latter to move slidably up and down relative to the stemming tube 220 whenever permitted by the friction locking assembly 367. The connection between the pear engaging collar 366 and the friction locking assembly is as follows: About the lower end of the collar supporting tube 395 is fixed an annular attachment bushing 420, to which is secured by means of screws 421 a long rectangular rigid strip 422 which will hereafter be called a ribbon 422. Ribbon 422 passes freely through a channel 424 cut out of the lower bushing 379 in the head assembly 370 and seats slidably in a recess 425 (Fig. 18) cut into the sector assembly 371. Slightly below the center sector assembly 371 the ribbon 422 passes through friction locking assembly 367, which normally holds the ribbon 422 locked against the recess 425, and hence fixes the position of the stemming tube 220 relative to the entire stemming tube assembly 351, regardless of the position of that assembly within the cylindrical stemming tube guide member 216, which, as has been set out, has been controlled by the toothed sector 352 in cooperation with the rack 357.

When the stemming tube 220 is inserted into the pear and the pear engaging collar 366 is about to engage the squared bottom 369 of the pear, the friction locking assembly must release the ribbon 422. When the ribbon is released, sufficient friction exists between the collar supporting tube 395 and the surrounding members of the head assembly to carry the collar 366 up with the stemming tube 220 as it penetrates the pear, and to cause the collar 366 to remain in contact with the pear for a short instant until the friction locking assembly can operate, after which the collar 366 and the stem 220 move as a unit with the stemming tube until the friction locking assembly 367 is released again later in the cycle of operations.

The operation of the friction locking assembly 367 will be described with particular reference to the sectional view shown in Fig. 18. The locking assembly 367 consists basically of a brake shoe 426 bearing against the ribbon 422 and mechanism to hold the brake shoe against the ribbon, in turn, against its recess 425, and to withdraw it therefrom when desired.

A locking assembly body member 427 is secured to the cylindrical rack bearing member 377 by means of bolts 429 threadably engaged with tapped bores 430 formed in the cylindrical member 377. The body member 427 encompasses less than half the circumference of the cylindrical member 377 and the bolts 429 are so positioned that there is no interference with the engagement of the rack 537 with the stemming tube positioning sector 352. The body member 427 extends outwardly from the stemming tube sector assembly and has a central bore 431 in which is slidably disposed a cylindrical piston 432. The cylindrical piston 432 is surrounded by a helical spring 434, which rides within a cylindrical spring collar 435, which is threaded externally and adjustably positioned axially of the bore 431 by its engagement with the threads 436 formed within an extension 437 of bore 431, which is an enlarged diameter extension of that bore. The outer end 439 of the cylindrical spring collar 435 is so shaped as to enable it to be readily screwed in and out of the bore threads 437, and hence controls the pressure exerted by the spring 434 against the head 440 of the piston 432, which in turn exerts pressure against the brake shoe 425 through shoe supporting member 441 mounted within the cylindrical piston 432 in which the brake shoe 426 is directly mounted. The outer end portion 439 of the cylindrical spring collar 435 is bored to permit the slidable movement therein of the cylindrical piston 432. The supporting member 441 has a supporting head 442 larger than the inner diameter of the piston 432 and recessed to receive the brake shoe 426. The brake shoe supporting head 442 is traversable to and from the ribbon 426 in a reduced diameter portion 444. The displacement of the brake shoe supporting head 442 away from the ribbon 422 is limited by the axial position of the cylindrical annular head 440 of piston 432 which in turn is under the pressure of the helical spring 434.

A supporting head shaft 445 is formed integrally with the supporting member 441 and extends axially of the cylindrical body portion 447 of the piston 432. The outer end of the piston body portion 447 is internally threaded at 449 to receive the threaded shank 450 of the adjusting nut 446 through which the supporting head shaft 445 is slidably journaled. The inner helical spring 451 is disposed about the shaft 445 bearing at one end against the supporting member 441 and at the other end against the adjusting nut shank 450. The inner helical spring 451 thus adds to the pressure on the brake shoe 426 and provides for ready adjustment of that pressure. A lock nut 452 is threadably disposed about the shank 450 and may be tightened against the end of the piston body portion 447 to secure the spring tension at any desired value.

The release of pressure on the ribbon 422 is accomplished by drawing the entire piston 432 outwardly against the tension in helical spring 434. When the pressure due to the spring 434, which is the main force tending to lock the ribbon in place, has been released, a slight controllable amount of pressure may still be exercised by the inner helical spring 451, although if the piston is withdrawn far enough the brake shoe 426 may be taken out of contact with the ribbon 422. The piston 432 is withdrawn at desired times during the operation of the machine by a yoke 453 fixed thereto by a set screw 454. The yoke is terminated at either end by suitably bored bosses 677, through which are disposed short roller shafts 679 secured in place by a lock nut 680, on which the cam rollers 681 are mounted. A portion 682 of the shaft 679 extends inwardly beyond the rollers 681 and is slidably engaged by a roller shaft slot 684 formed on the inner side of either side and parallel to the axis of body member bore 437. The roller shaft slides 684 insure that the yoke 453 will draw the brake shoe 426 away from the ribbon 422 in a path normal to the axis of the sector assembly 371. The rollers 681 (Fig. 19) normally engage the lower portion 685 of cam plates 686 which are mounted parallel to the stemming tube 220 by means of bolts 687 securing them at their upper ends to cam plate seats 689 formed on the stemming tube mounting collar 213. One of these cam plates 686 extends downwardly parallel to and on each side of the stemming tube to fit slidably against a cam plate seat 689 formed on each side of the body member 427. The cam plates 686 are connected at their lower ends by a yoke 690, which is fastened at either end to one of cam plates 686 by means of a bolt 691. The yoke 690 extends around the stemming tube sector assembly slidably, and helps to maintain the proper alignment of the cam plates 686 as the stemming tube moves up and down relative thereto.

When the stemming tube assembly 351 is drawn downwardly by the sector 352, the cam rollers 681 are drawn outwardly by their passage over an outwardly inclined portion 692 of the cam plates 687, and are thereafter held in retracted position by the outer cam plate surface 694 throughout the remainder of the upward travels of the stemming tube. This condition prevails while the pear engaging collar 366 is being released properly to its proper position against the bottom of the pear at the point of transfer from the feed turret to the main turret as shown in Fig. 72. This action takes place between points 5 and 7 of the stemming tube cam chart, Fig. 78, and also occurs during the preliminary stemming tube clearing action, which occurs between points 1 and 4 of the chart.

Within the stemming tube 220 and the connecting shaft 372 there is slidably disposed a coring stem clearing tube 695 (Fig. 19) which is terminated at its upper end by a centrally bored ejecting plug 696 and at its lower end is fixed to an ejecting tube plug 697. An upwardly extending externally threaded collar 699 is formed integrally with the ejecting tube plug 697, and about the collar 699 is attached an internally threaded guide sleeve 1001 which is freely slidable within the cylindrical lock bearing member 377. A long helical spring 1002 fits within the guide sleeve 1001 against the screw collar 699 at its lower end and extends upwardly around the stem clearing tube 695 to engage against the connecting bushing 374. Thus the stem clearing tube 695 may be moved upwardly within the stemming tube to force out the stem fibers but is returned after this action by the spring 1002. A slot 1004 is cut vertically through a cylindrical member 377 near the lower end thereof through which extends a hollow roller shaft 1005. Roller shaft 1005 is threadedly connected to the ejecting tube plug 697 and the roller 361 is freely rotatable about the shaft on a bushing 1006.

It will thus be seen that the action of roller 361 controls the clearing of the stemming tube 220 so that when the roller 361 is forced upwardly relative to the stemming tube assembly by the auxiliary cam 362 during the portion of the travel between numerals 3 and 4 of the cam track chart, Fig. 78, the stem is cleared by the clearing tube while the full upward travel of the roller 361 is permitted due to the fact that the friction rolls assembly is held in an unlocked position by the outer cam plate surface 694, and hence the ribbon 422 is free to move upwardly when the shaft 1005 engages thereagainst.

After the clearing operation, the stemming tube is washed by water jets from the centrally bored ejecting plug 696 and from additional washing apertures 1007 formed about the upper end of the clearing tube 695. The water is fed into the clearing tube 695 through water bores 1009 and 1010 formed in the plug 697 and the shaft 1005 respectively, and is furnished through a connection fitting 1011 joining the upper shaft 1005 to a flexible hose 1012 connected to the water system of the machine which is described elsewhere.

With the stemming tube clearing operation completed, the machine is now ready to release the pear engaging collar so that it may seat properly against the lower end of the pear, regardless of size, during the insertion of the stemming tube. To accomplish this result it is necessary to allow the stemming tube collar 366 to engage the squared pear end 369, as the stemming tube 220 is inserted with sufficient force to insure good contact but not sufficient to damage the pear meat, and once contact has been made with the pear, the supporting collar 366 must be locked in position relative to the stemming tube 220 in order that the pear may be properly supported during subsequent operations. The stemming tube collar 366 is hence mounted within the stemming tube assembly with a freely sliding feed but its position may be fixed relative to the assembly through the action of the friction locking assembly 367, which functions at the proper times under the control of cam members to be described hereafter.

Between points 5 and 7 on the stemming tube cam chart, Fig. 78, the entire stemming tube assembly 351 is raised by the sector 352, unlocking the friction assembly 367 and releasing the pear engaging collar 366 relative to the stemming tube. As the upward traverse continues to the point shown in Fig. 72, the stemming tube 220 is inserted to the desired height; the collar 365 engages the squared off end of the pear and remains in that position while the entire stemming tube assembly is lowered slightly by sector 352 as indicated on the cam chart between points 7 and 8 to provide clearance for the mandrel 55 and the fingers of the ring 54 while they are briefly out of engagement with the pear. The stemming tube assembly is then drawn downwardly by the sector 352 to permit the friction locking assembly 367 to fix the position of the collar 366 and thus hold the pear against vertical displacement while the impaling knives 405 and 406 are forced into the upper portion of the pear by the impaling cam 752ª, through means described elsewhere. This action occurs during the passage from point 5 to point 6 on the chart of the impaling blade cam 752ª, Fig. 78, after the stemming tube is dropped from point 9 to point 10 on chart of the stemming tube cam 360.

The pear is now securely held from the top and from the bottom, and ready to be peeled by the peeling head cutters 182 and 310 which are supported around the stemming tube on peeling head 35.

Consider next the construction of the individual peeling heads 35. Six of the peeling head units 35 are mounted on the peeling head supporting plate 150 of the main turret 4 and are driven with respect thereto by the belt 32 (Fig. 6) from motor 11 and by engagement with two gears, an upper ring gear 151 and a lower ring gear 152, which are fixed to the main turret supporting column 154 (Fig. 4) and which cause rotation of the peeling head mechanism as the latter units are driven thereabout by rotation of the main turret 4. Each peeling head assembly 35 consists of a base plate 156 (Fig. 19) revolvably mounted on a cylindrical gear casing 157 which makes a smooth rotating fit within a bore 159 in the plate 150. The lower portion 158 of the cylindrical gear casing 157 encloses two annular ball races, an upper race 160 and a lower race 161 which are fitted about a tubular peeling head drive gear 162 by means of a positioning collar 163, secured thereto by means of suitable bolts 164. About the lower end of the tubular gear 162 is fixed a pulley 34 engaged by the belt 32, from motor pulley 14. Rotation of the peeling head drive pulley 14 drives the peeling head driven pulley 34 to rotate the tubular gear shaft 162 which at its upper end has formed integrally thereabout a gear 165ª. Gear 165ª engages four symmetrically spaced pinions 166, each of which is keyed to a cutter head drive shaft 167 which is supported in a bearing 168 fixed within a universal joint housing 170 which is secured to the base plate 156 by means of bolts 155. The housing 170 has formed thereon an upwardly extending housing sleeve 171 the inner surface of which sleeve is flared outwardly at 172 to permit movement of a universal joint 174 attached to the drive shaft 167. The universal joint 174 is upwardly connected to a second cutter drive shaft 175 which terminates in a threaded spindle 176 to which may be attached by means of a lower bushing 177 and an upper bushing 179 a lower cutter head unit 182, as shown in Fig. 19.

The cutter head unit 182 is preferably formed separately and is removable by unscrewing a nut 181 to permit resharpening the lower peeling blades 306. The angular axial relation of the second cutter drive shaft 175 to the lower cutter drive shaft 167 is determined by means of rollers 184 rotatably mounted on a cylindrical sleeve 185 held about the second cutter drive shaft 175 by a yoke 327, shown in detail in Figs. 26 to 28. The yoke 327 is pivotally connected to the universal joint housing 170 by means of split bosses having bolts 329 disposed therethrough to lock the shafts 328 in position. The yoke 327 has legs 330 bored to receive the shafts 328 and connected up to a central cross member 331, and to upper cross member 332. The central cross member 331 is bored to permit the free passage of the second cutter drive shaft 175 therethrough. The upper cross member has a centrally bored boss 334 in which is fixed the sleeve 185 within which the shaft 175 rotates. The sleeve 185 is secured in the boss 334 by the clamping screw 333.

On each of the yoke legs 330 there is formed a spring seat 335 within which are seated springs 336 which urge the roller 184 toward the center of the peeling head unit 35. The opposite end of each of the springs 336 is adjustably secured within the tubular spring seats 337 fixed in suitable bores 338 formed in bosses 339 in the outer housing 340 of the peeling head unit 35.

The spring seats 335 are internally threaded at 341 to receive a threaded adjusting screw 342 which controls the tension of springs 336.

The outer housing 340 has apertures 344 formed therein through which the yoke mechanisms may be adjusted without removing the entire shell. During the operation apertures 344 are covered by a cork gasket 345 and a closure plate 346. The roller 184 is forced centrally of the peeling head unit by the springs 336 as far as permitted by the upper plate cam 200 or the lower plate cam 201, depending on whether the roller 184 is being used in conjunction with the lower cutting head unit 182 or with the upper cutting head unit 310. The only difference between the arrangement for using the drive shafts 175 with the upper cutter head 310 instead of the lower cutter head 182, is found in the fact that different shapes of upper and lower bushings 1247 and 1248 are used to connect the upper cutting head unit 310 to the threaded spindle 176, the guide members 1249 being located beneath the cutter head unit 310 instead of above the unit as in the case of the lower guide members 304; and in the latter case the roller 184 is set about the sleeve 185 with its spacing sleeve 187 turned downwardly, so that the roller may engage the upper cam 200, while when using the upper cutting head 310 the roller 184 is mounted with its spacing sleeve 187 upwardly, as shown in Fig. 20, so that the roller 184 may engage the roller cam 201. The upper and lower cams 200 and 201 are identical in shape and are fastened together as a unit at right angles to each other about a tubular cam drive 202, described below.

About the upper end of the cutter drive shaft 175 I position a housing member 1241 supported about the shaft 175 by a bearing 1242 fixed on a reduced diameter bearing seat 1244 formed on the shaft 175. At its lower end, housing member 1241 is fixed to a flexible hood 1245 in turn fitted about sleeve 190 fixed in the upper surface 191 of the cutter head housing 340.

The sleeve 190 is oblong in shape and allows the cutter head and the upper drive shaft 175 to move toward and away from the central axis of the cutter head as controlled by the engagement of roller 184 with an upper cam 200 or a lower cam 201 mounted on a tubular cam drive member 202. The drive member 202 (Fig. 19) is rotatably mounted centrally of the cutter head unit base 156 and is driven by a ring gear 204 which engages the lower stationary ring gear 152 and is driven thereby as the entire main turret revolves about the main turret supporting column 154.

The upper stationary ring gear 151 secured to the main turret supporting column 154 engages a ring gear 207 formed on the lower portion of the inner base plate member 157 and as the turret rotates, the inner base plate 157 is caused to rotate relative to the main turret by the action of these rollers. At the same time the cutter heads 182 are rotated at high speed relative to the cutter head unit 35 by means of the tubular drive sleeve 165ᵃ driven by the belt 32, and the cutter pairs engage the upper and lower portions of the fruit alternatively under control of the cams 200 and 201 driven through the tubular drive sleeve 202 by the intersection of ring gear 204 and lower stationary ring gear 152. Within the rotating tubular drive shaft 202 there is disposed a tubular stemming tube housing 216, which is secured by a mounting member 213 to a lower main turret plate 476 fixed to the upper plate 150 and revolving therewith as a unit with the entire main turret 4. Stemming tube housing 216 revolves with the main turret 4, but does not rotate therewith.

Further details of the peeling head are shown in Figures 22 to 25 inclusive. In Figure 22 I have shown one of the lower peeling units 182, which is driven by the second peeling head drive shaft 175 and is supported also by the housing member 1244. To member 1244 is fixed a bracket 300 by means of a clamping screw 301, which bracket carries rods 302 extending upwardly beyond the cutter 182 parallel to the axis thereof and having fixed thereto a guide member bar 304. The bracket 300 extends diametrically on both sides of the cutter 182 and the guide member 304 has at one end an arcuate adjusting slot 305 for connection to the rod 303 so that the spacing between the guide bar 304 and the axis of the cutter may be controlled. The function of guide member or bar 304 is to engage the surface of the fruit and to control thereby the depth of cut. By adjusting the guide bar 304 any depth of cut may be secured. The spring members 336 press the cutter heads 182 against the fruit as far as permitted by the guide bar and irregularities in the surface of the fruit are followed by the guide bar 304 so that the cutting blades will remove a desired thickness of peel from the fruit. Cutter heads 182 are cast preferably of some metal which is resistant to the acids contained in the fruit juice, such as bronze, aluminum, or monel metal, for example. The cutter blades 306 are made of thin strips of steel capable of taking a very sharp edge and are secured by screws 307 to the cast cutter head. Whenever it is necessary to resharpen the cutter blades 306, they may be removed quickly by unscrewing the screws 307. In casting the heads 182, grooves 309 are provided down which the peels and the juice may travel to prevent clogging the cutter.

In Figures 24 and 25 I have shown a top cutter 310 which is shaped to peel the large end of the pear. The cutter 310 is cast in the same fashion as is the cutter 182, grooves 309 being similarly provided for the removal of juice and peel. Similar types of cutter blades 311 are secured to the upper head screws 307. In this case, however, the guide bar 312 is mounted below the cutter head 310 since the surface relative to which the cutter is to be guided lies beneath the cutter head itself. Bracket 314 supports the guide bar 312 and is secured to the housing member 315 by means of a set screw 317. The bracket member 314 is fastened to the guide bar 312 by means of screws 317 at its opposed ends, one screw 317 passes through an arcuate slot 319 formed in one end of guide bar 312.

Referring now to Figures 42 to 54, I have shown the clamping unit for transferring the pear from the stemming tube 220 over the splitting blade 400 to the coring plate 628 as comprising a supporting slide 902, a center cam slide 904, cam supporting arms 905 fixed to a center cam slide 904. To the cam supporting arms 905 are secured cams 906 having roller-engaging surfaces 907, which will be described in detail hereafter, and which are fixed to cam seats 909 formed on supporting arms 905 by means of attachment screws 908.

The center cam slide 904 is vertically slidable in the supporting slide 902, and its action is controlled by a clamping cam roller 985, riding in a clamping cam track 899 (Fig. 29) formed in the periphery of the cam plate 754. As the center slide 904 is vertically displaced by the action of the cam track 899, the cam supporting arms 905 are drawn up or down therewith and the cams 906 are thereby caused to open or to permit the closure of clamping fingers 916, which are attached to the supporting slide 902 as described below.

Referring now to Figures 42 to 45, the clamping arm supporting bracket 910 constitutes the main supporting unit by means of which the clamping fingers 916 are secured to the supporting slide 902. Supporting slide 902 is vertically movable on the guides 737 fixed within the main turret by bolts 738 threadedly engaging the guide supporting arms 707 terminating the bracket member 706 (Figs. 30 and 31). The entire slide assembly is free to move up and down on guides 737 under control of the clamps cam roller 971 riding in the clamps cam track 898 formed in the cam plate 754 shown on Figure 29. It will thus appear that the entire clamping unit may be vertically traversed by the clamps cam while the clamping cam 906 controls the action of the clamping fingers 916 independently of the position of the main supporting slide 902.

Returning now to the structure provided for the support of the clamping fingers 916, an outer clamp supporting arm 911 is disposed on either side of the clamping arm supporting bracket 910, while a pair of inner clamping supporting arms 912 are supported pivotally on the clamping arm supporting brackets 910 between the outer supporting arms 911. A horizontal clamp supporting member 914 is pivotally attached to each adjacent pair of outer and inner supporting arms 911 and 912, and is connected thereby to arcuate supporting arm 915 to which clamping fingers 916 are pivotally secured. The inner and outer clamp supporting arms 911 and 912 are of equal length, and hence the horizontal clamp supporting member 914 moves parallel to the clamping arm support bracket 910 when it is operated by the engagement of the cam 906 with the cam roller 917 rotatably mounted on a cam roller shaft 918. The cam roller shaft 918 has a retaining head 919 which holds the roller to the shaft. A threaded shank 920 extends through a suitable bore 922 formed in the clamp supporting member 914 and a nut 921 is fitted thereon to keep the roller 917 in position.

When the cam 906 engages the roller 917 and displaces the cam supporting member 914, the latter moves relative to the outer and inner clamp supporting arms 911 and 912 respectively, by virtue of an outer clamp supporting arm pivot pin 923, which is journaled in and fixed to the outer clamp supporting arm 911 by means of a set screw 924. The pivot pin 923 is journaled in the horizontal supporting arm 914 and is freely rotatable therein. The inner clamp supporting arm 912 is pivotally connected to the horizontal clamp supporting member 914 by means of a pivot pin 925, which is journaled therein and is fixed in position by means of a set screw 926. Pin 925 is freely rotatable in the horizontal clamp supporting member 914.

Clamp aligning arms 927 are formed integrally with the horizontal clamp supporting member 914 and extend horizontally outward therefrom. A clamp aligning spring 928, which may conveniently be a flat steel ribbon, is secured to the clamp aligning arms 927 by means of spring retain studs 929 extending terminally from the clamp aligning arms 927. An aligning surface 930 is formed centrally of the arcuate clamp supporting arms 915 and on the opposite side thereof from the clamps 916. The aligning surface 930 engages the aligning spring 928 whenever the arcuate arms rotate about the spindle 931 by means of which they are pivotally connected to the horizontal supporting member 914. The tension in the spring 928 is sufficient to return the arcuate arms to their normal position, which is that in which the aligning surface 930 rests flat against the aligning spring 928.

At each end of the arcuate arms 915 there are journaled clamping finger pivot pins 932 fixed thereto by set screws 933 (Fig. 46). The clamping fingers 916 are free to move pivotally about the pins 932 so that they may freely align themselves with the contours of the fruit. Bores 934 are provided with the pivot pins 932 and auxiliary pivot pin bores 935 are also provided in which the clamping fingers may be alternatively mounted when there is considerable variation in the size of the fruit being processed. The bores 934 and the auxiliary bores 935 are formed in an arcuate arm end section 936 on which is formed a stop member 937 limiting the rotation outwardly of the clamping fingers. In the rear, recesses 939 are formed in the arcuate arm 915 to permit its pivotal rotation without interference with the aligning spring supporting arms 927. In the clamping fingers, bores 941 are provided to receive the pivot pins 932. The fruit engaging face of each of the clamping fingers 916 has a rounded blossom end engaging portion 942 and a stem end engaging portion 943, the two portions being curved to approximate the curvature of the surface of a pear. A pivot pin 944 is provided for the support of each outer clamping supporting arm 911, which pin is journaled fixedly in a split journal formed integrally with the clamping arm support bracket 910. A bolt 946 is threadably inserted in a bore extending through split portions of the journal 945 and is tightened up to secure the pivot pin 944. A spring anchor plate 948 is secured to the upper end of a pivot pin 944 and has fixed therein a downwardly extending anchor stud 949 against which engages a center spring 950 helically disposed about the pivot pin 944 and engaging at its lower end an anchor stud 951 fixed in the outer clamp supporting arm 911. The spring 950 is adjusted to urge the clamping fingers centrally of their supporting bracket, and hence it is the stress in the springs 950 which causes the clamping fingers 916 to grip the pears.

In Figure 43 I have shown the clamping fingers urged toward their extreme central position on either side of the splitting plate 400 which is shown in the position it normally occupies relative to the clamping fingers when a pear is being drawn over the splitting plate 400 by the clamping fingers. They would, of course, spread outwardly to the pear from the position shown in Figure 43, and when the cams 906 operate against the cam rollers 917 the fingers are withdrawn to a position in which the supporting arms 911 and 912 are disposed as shown in dotted lines in Figure 45. The inner clamp supporting arms 912 are pivotally secured to the supporting bracket 910 by pivot pins 952 journaled in inner clamping arm pivot pin receiving bores 954 which are shown in Figure 48. The bores 954 are formed in suitable bosses 955 forming a part of the support bracket 910.

Bracket supporting bolts 956 (Fig. 50) are disposed through the central body portion 957 of the clamp supporting bracket 910 and secure the latter to the main supporting slide 902. Vertically elongated slots 958 are formed in the lower connection section 964 of the main supporting slide 902 so that the position of the main bracket 910 may be adjusted relative to the slide 902. A recessed slot 959 is also formed in the lower connecting section 964 to receive the head of the bolt 956 and a bolt head plate 960 is provided through which the bolt may pass, and by means of which the bolt head may be secured against the recessed slot 959.

Considering now the detailed structure of the main supporting slide 902 (Fig. 47). This slide comprisese two I-shaped slide legs having outer and inner vertical channels 962 and 963 formed therein. A lower connecting section 964 joins these legs 961 at their lower ends while an upper connecting web 964 extends therebetween on the side of the legs opposite that to which the supporting bracket 910 is connected, and midway between the lower connecting section and the upper end of the legs. On the same side of the legs as that on which the main supporting bracket 910 is attached, a center slide retaining plate 966 is secured by means of studs 967. An oil groove 969 is formed centrally of the upper connecting web 965 and extends vertically throughout the central portion of that connecting web 965. At the lower end of the oil groove a threaded bore 975 is provided which is arranged to receive a lubrication fitting not shown, through which the slide interior can be lubricated. A channel 970 is cut into the upper web 965 to receive slidably the center cam slide 904 which slides in the channel 970 and is retained by the slide retaining plate 966. The entire unit attached to the main supporting slide 902 is controlled in its vertical position by a clamps cam roller 971 mounted on a shaft 972 extending through the upper connecting web 965 and the retaining plate 966, and secured in position by a nut 974. The clamps cam roller shaft 972 also extends through the center cam slide 904, a slot 981 (Fig. 52) being provided for that purpose and to permit the center cam slide to be displaced vertically independently of the main slide 902. The clamps cam roller 971, as has been said, rides in the clamps cam track 898 and in the cam plate 754, and hence the configuration of the clamps cam track 898 controls the position of the entire unit associated with the main supporting slide 902. At the same time the position of the cams 906, which control the opening and closing of the clamping fingers, is controlled independently by the engagement of a clamping cam roller 985 with a clamping cam track 899 formed in the cam plate 754 above the clamps cam track 898.

The cams 906 are secured to the cam supporting arms 905, as has been described above, and are outwardly terminated by the cam seats 909 against which the cams 906 are fixed by screws 908. The cam supporting arms 905 are thus secured to the center slide 904 with a bolt 982 disposed therethrough near the lower end thereof. The engaging surfaces 907 of the cams 906 extend diagonally with relation to the vertical path in which the center slide 904 travels; hence when they engage the cam rollers 917 and are forced downwardly thereagainst, the cam rollers are compelled to move outwardly drawing the clamping fingers 916 and all the supporting members associated therewith outwardly with them. The center slide 904 is forced to travel in its groove 970 in the upper web channel and its alignment is additionally maintained by a yoke 980 fixed to the upper end of the center slide 904 by means of bolts 980a. The clamp cam roller 985 is rotatably secured to the upper unit of center slide 904 by means of a stub shaft 986 disposed therethrough and secured in position by a nut 987. Guide flanges 984 extend outwardly from opposite sides of the yoke 980 and are slidably fitted into the inner channels 963 of the main slide legs 961.

Summarizing the action of the clamping unit and referring now to the cam chart shown in Figure 78, while the pear is being peeled the clamps cam roller 971 occupies position 1 on the clamps cam track 898, the profile view of which is given by the line denominated "clamps cam" in the cam chart Figure 78. From this position the entire clamp assembly is drawn downwardly to reach the lowest point 2 of the cam track when the peeling operation is completed. The transition between points 1 and 2 on the clamps cam track is the same as the transition between Figures 74 and 75 which illustrate the relative positions of the stemming tube 220, the impaling blade 404 and the clamps 916 with reference to the coring head unit 612. From position 2 to position 3 on the clamps cam track 898 the clamps 916 are held in position while they are actuated to grip the pear from the cam 899. Subsequently the pear is drawn over the splitting blade 400 by the action of the cam roller in rising from point 3 to 4 of the clamps cam track. This movement raises the pear into proper alignment on the coring plate 628 for the coring to take place, and the clamping fingers remain at this level until the pear has been released and they are again drawn downward from point 1 to repeat the cycle with another pear. The action of the clamping cam 899, the outline of which is indicated as "clamping cam" in Figure 78, begins at point 1 when the clamping roller 985 is drawn down simultaneously with the clamping fingers to point 2, which traversal is sufficient to cause the cams 906 to spread the clamping fingers 916 wide to fit around the pear about to be picked up. At point 3 the clamping cam track begins to rise and at point 4 the center slide 904 has been drawn upwardly relative to the main slide 960 sufficiently to release the cams 906 from the cam rollers 917, thus permitting the springs 950 to urge the clamping fingers 916 into firm engagement with the peeled pear. At point 5, which corresponds to point 3 of the clamps cam track, the clamping cam roller is drawn upwardly at the same rate as the main slide to point 6, which corresponds to point 4 of the clamps cam track. As rotation of the turret continues, the clamping cams are held out of engagement with the rollers 917, and hence the pear is firmly grasped until reaching point 7, which corresponds with Figure 76; after the conclusion of the coring operation from point 7 to 8 the clamping cam track drops, causing the cams 906 to re-engage the cam rollers 917 and spread the clamping fingers 916 apart. At point 8 the fingers have been released as shown in Figure 77, so that the split pear halves are free to drop from the coring plate 628 into the discharge chute 1270.

It will be noticed that the vertical displacement of the clamping cam 899 necessary to effect a release of the clamping fingers from the pear is very slight compared to the displacement necessary to raise the pear from its position during peeling to its position during coring, and in consequence the vertical displacement between points 3 and 4 and between points 7 and 8 of the clamping cam track is slight compared with that between points 3 and 4 of the clamps cam track 898 which produces the displacement of the pear from the stemming tube 220 to the coring position.

Turning now to consideration of the unit for coring and trimming the calyx end of the pear. Details are shown in Figures 55 to 64, inclusive of the coring and trimming unit, and Figures 29 and 31 show the manner in which the units are driven. A pair of reciprocating blades 663 and 664 is used for coring and another pair 644, 644 for trimming the calyx, and the reciprocating motion is obtained from a coring cam plate 602 as explained elsewhere.

The outer housing member 600 of the main turret 4 is fixedly secured to the main turret supporting column 154. Immediately beneath the top 601 of housing 600 is fixed a coring cam plate 602 having a cam track 604 formed therein. A top view of this cam track 604 is shown in dotted outline in Figure 31.

The coring heads are driven by the engagement of cam rollers 719 (Fig. 29) with the coring cam track 604 which causes a sector 717 on which the cam roller 719 is rotatably mounted to transmit reciprocating motion to the coring head assembly 612 through a coring head drive pinion 615 fixed on the coring head intermediate drive shaft 614, which is connected by the link 620 to the drive shaft 621 within the coring unit.

It has been explained elsewhere that the entire coring unit 612 is supported by rods 610 secured in the top plate 712 with the bracket 706. The top plate 712 of the bracket 706 thus holds the coring unit in vertical alignment with the splitting blade 400 and the stemming tube 220.

The coring head support rods 610 extend at their lower ends through bushings 611 (Fig. 57) formed integrally with the gear case 625 of the coring unit 612.

Cam track 604 is shaped to produce reciprocating movement of the toothed sector twice during each complete rotation of the main turret. The coring head intermediate drive shaft 614 is connected by a detachable linkage 620 (Fig. 55) and a set screw 623 to the coring head drive shaft 621, which is fixed to a wide toothed drive gear 622 and a lower drive gear 624 of slightly different diameter. These gears are all journaled within a coring head gear casing 625 closed at the bottom by a coring head closure plate 626 which also acts as the bottom journal for the gear 624 fastened to drive shaft 621 and for the driven gears. Bolts 627 secure the closure plate 626 to the casing 625. The closure plate also acts as a direct support for the cut-out coring plate 628 which is fixed thereto by bolts 629, and which plate 628 in turn supports the bottom journal 630 for the coring blade shafts 649 and 650.

Within casing 625 and in mesh with lower drive gear 624 is disposed a driven calyx trimming knife gear 632, having a hollow cylindrical shaft 634 formed integrally therewith and extending below a journal 635 formed as a downward extension of the closure plate 626. To the lower end of cylindrical shaft 634 is secured by means of a set screw 637 a trimming knife yoke 636.

Bores 639 are formed vertically through the yoke 636 to receive trimming knife studs 640 and set screws 641 are provided in the yoke 636 to secure the studs 640 in desired position. Studs 640 are offset outwardly at 642 to enable trimming blades 644, attached thereto, to extend completely over the calyx end of the pear in the portion thereof not peeled by the upper peeling head knives 310. The cut-out portion 645 in the upper splitting plate 628 is shaped to give ample clearance for the knives 644 as they rotate back and forth about the tubular shaft 634.

The wide toothed drive gear 622 is engaged by two driven gears, an upper driven coring gear 646 and a lower driven coring gear 647, mounted on parallel shafts 649 and 650 (Fig. 57) respectively. These gears are provided with arcuate slots 651 and 652, respectively (Figs. 57 and 58), so that the shaft for each gear may pass through the other gear. This permits the shafts to be mounted very close together and be driven at the same time by the wide gear 622 in the same direction. The slots extend through an arc sufficient to permit full 180-degree rotation of each gear, 646 and 647. As has been explained above, the drive produces a reciprocating rotary movement of the shafts 649 and 650, so that it is necessary for the slots to extend somewhat beyond 180 degrees to allow for ease of assembly and adjustment.

Figure 57:
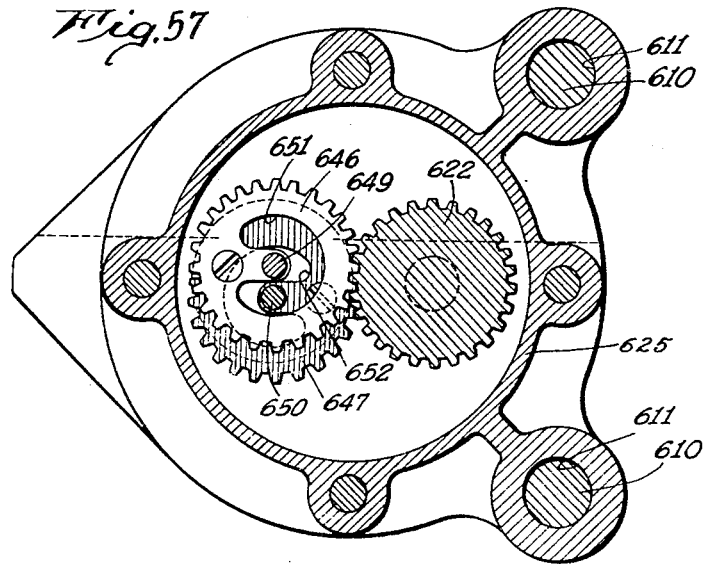
Figure 57 is a top sectional view taken along line 57—57 of Figure 55.

In Figure 57 I have shown a top sectional view of the coring head drive unit taken along line 57—57 of Figure 55, illustrating these relationships between the wide gear 622 and the driven gears 646 and 647, and showing how the arcuate slot 651 permits the gear 646 to rotate about its shaft 649 without interference with the other shaft 650.

Figure 58:
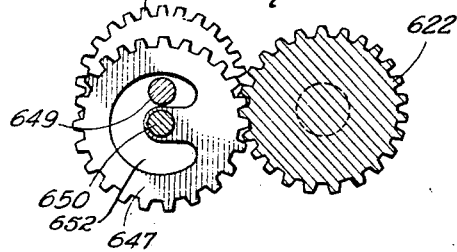
Figure 58 is a schematic top view taken along line 58—58 of Figure 55.

In Figure 58, I have shown a schematic top sectional view of the gearing only, taken on plane 58—58 of Figure 55, and showing how the lower driven gear 647 rotates without obstruction by the shaft 649 of the upper gear. Beneath driven gear 647 may be seen the driven trimming knife gear 632.

Figure 59:
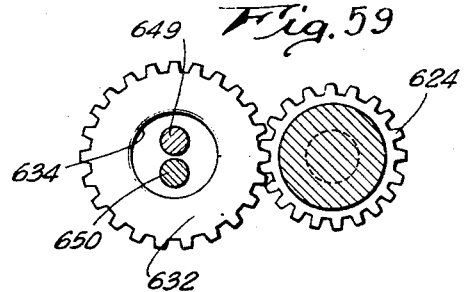
Figure 59 is a sectional top view taken along line 59—59 of Figure 55.

In Figure 59, I have shown a top sectional view taken in plane 59—59 of Figure 55 to show the lower drive gear 624 in mesh with the driven trimming knife gear 632, and showing the shafts 649 and 650 within the tubular trimming knife shaft 634.

Figure 60:
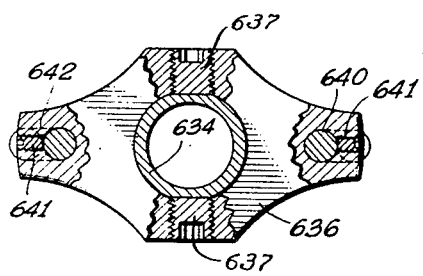
Figure 60 is a sectional view taken along line 60—60 of Figure 55.

In Figure 60, I have shown the yoke 636 in section along plane 60—60 of Figure 55, showing how the yoke 636 is secured to the hollow drive shaft 634 by the set screws 637, and illustrating the offset 642 of the trimming knife studs 640. The set screws 641 are shown which secure the studs 640 in place.

Figure 61:
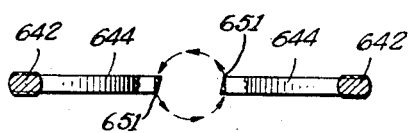
Figure 61 is a sectional view taken along line 61—61 of Figure 55.

In Figure 61, I have shown the calyx trimming blades 644 attached to offset portions 642 of the studs 640, not shown, and have partially broken away the blades to show the oppositely directed trimming edges 651.

Figure 62 shows a sectional view taken in the plane 62—62 of Figure 55, of the lower portion of the coring plate 628. The surface of plate 628 is serrated on both sides by a series of parallel vertical grooves 655 against which the pear halves are held by clamping fingers, described elsewhere, and which help maintain the proper alignment of the pear during the trimming and coring. Figure 62 also shows the bottom journal 630 by which the drive shafts 649 and 650 are journaled at their lower ends. Referring back to Figure 56, it will be seen that below yoke 636 the drive shafts 649 and 650 are reduced in diameter to form coring blade attachment sections 656 and 657 of shafts 649 and 650 respectively. The bottom journal member 630 is cylindrical in form and is slotted at 660 to fit over the transverse segment 661 of the coring plate 628, through which a screw 662 is disposed to fix the position of the journal 630 relative thereto.

In the upper portion of the groove 660 there is disposed a center journal supporting plate 665 which is secured within the journal 630 by means of a screw 666 from which the center journal supporting plate 665 there extends upwardly on supporting shaft 667 on which is formed a center journal support plate 668. In the upper portion of the bottom journal 630 are formed bores 669 and 670, in which are journaled the lower ends of the reduced diameter shaft members 649 and 650. The reduced sections 656 and 657 of the shafts 649 and 650 are journaled in the central journal member generally denominated as 671 to hold them in alignment under the twisted stresses present during the coring operation. The central journal member 671 is shown sectionally in Figure 63 and comprises two journal plates 672 and 674 in which the reduced shaft sections 656 and 657 are respectively journaled.

The journal plates 672 and 674 are recessed to fit about the center journal supporting plate 667a and are secured thereabout by screws 675.

Immediately above journal 630, the coring blades 663 and 664 are attached to shaft sections 656 and 657 respectively. These coring blades are substantially elliptical in shape, and are slightly offset from the shaft, and as they are rotated by the drive shafts 649 and 650 and about the center journal 671, which is of the same shape as the cutting blades but somewhat smaller, the sharpened cutting edges 676 cut out a section of the pear containing the seed pod.

The action of these coring blades 663 and 664 on the fruit is shown schematically in the Figures 65 to 70 inclusive. Figure 65 shows the cutting edges 676 just starting the cut. Figure 67 shows a complete cut made by one blade 663, which has been returned to the starting position, the blade 664 being omitted for clarity.

Figure 68 shows the cut made by blade 664, which has also been returned to its initial position. The direction of the cutting action is indicated by the arrows in Figure 65. Figure 69 shows the outline of the completed coring cut with the blades omitted for the sake of clarity. Figure 70 is the sectional view of the fruit taken on line 70—70 of Figure 69, which shows the shape of the completely processed fruit in outline. Figure 66 is a view corresponding roughly to that of Figure 65, but showing in section the center journal member 671. The space between the halves of the pear as represented in Figures 65 to 69, inclusive, is illustrative of the splitting of the pear by the blade 400 and during the coring this space is occupied by the coring plate 628.

It will be seen from the above discussion that I have invented a pear preparing machine which eliminates the necessity for hand labor and which provides a superior product. When dealing with uniformly-shaped pears the depth of cutting can be held at a uniform value and wastage and peeling and coring eliminated. When handling fruit of good quality but non-standard shape my machine will trim the pears to standard shape and thus enable a higher price to be secured since the fruit will be graded as of a higher quality. It will be obvious that variations in detail will occur to those skilled in the art, but such variations are deemed to fall within the scope of the appended claims.

I claim:

1. A pear treating machine comprising a feed turret arranged to receive pears individually and transfer them to a main turret for stemming, peeling, coring and halving, a rotating spider in said transfer unit which comprises a feed ring arranged to receive the stem end of the pear, a mandrel for engagement with the calyx end of the pear, a locking plate arranged to engage a large area of said calyx, means for applying said mandrel and said locking plate to said pear at predetermined points, and means for securing said locking plate fixedly in the position of engagement.

2. In a pear preparing machine having a main turret mechanism disposed therein for stemming, peeling, splitting and coring pears individually and a feed turret arranged to transfer pears, one at a time, into said main turret and comprising a plurality of individual pear holding units including clamping fingers for the reception of the stem end of a pear, a mandrel for engagement with the calyx end of the pear and a locking plate adapted to fit over a substantial area of the calyx end of the pear, means for moving said mandrel into engagement with said pear and freely positionable means associated with said locking plate operable to fix said plate rigidly in position against said pear regardless of size.

3. In a pear preparing machine having a main turret mechanism for stemming, peeling, splitting, and coring a pear, a feed turret, a plurality of transfer units formed thereon, means associated with each of said transfer units for receiving a pear and for supporting it at a transfer point within said main turret while said main turret assumes control over the pear, a pair of clamping fingers arranged to receive the stem end of a pear and to release said pear after said assumption of control by the main turret, a mandrel and a locking plate engaging the calyx end of said pear and means for moving said mandrel into engagement with the calyx of said pear, comprising a transfer unit frame, mandrel supporting arms pivotally mounted therein, resilient means tending to force said mandrel downwardly, a locking cam plate fixed to said arms, a locking cam roller pivotally mounted in said frame and lockingly engaging said cam prior to the insertion of a pear into said clamping fingers, and a releasing cam arranged to withdraw said locking roller from said locking position at a predetermined point after the insertion of a pear in said clamping fingers.

4. In a pear preparation machine having a feed turret and a main turret, transfer mechanism mounted on said feed turret, clamping fingers arranged to receive the stem of a pear, a mandrel arranged to engage the calyx of the pear, a mandrel supporting frame, a pair of legs pivotally mounted thereon, a mandrel supporting block fixed to said legs, resilient means for urging said mandrel normally downward, means for controlling the position of said mandrel including a locking cam fixed to one of said arms, a locking surface formed on said cam, a cam locking roller shaft pivotally supported in said frame, a cam locking roller rotatably mounted on said arm, a controlling cam engaging roller mounted on said arm operable by engagement with a camming surface mounted in fixed position relative to said feed turret, and a release cam associated with said clamping fingers arranged to unlock said mandrel and traverse it upwardly during opening of said clamping fingers.

5. In combination with a pear preparing machine, means for holding a pear securely comprising a pair of clamping arms adapted to receive the pear stemmed downwardly, a mandrel arranged to engage the calyx of the pear, and a locking plate arranged to engage a substantial area of the calyx end of the pear and having locking means associated therewith comprising a locking plate supporting bracket extending from said mandrel, a supporting member pivotally secured to said bracket, a locking plate rigidly secured to said member, resilient means urging said locking plate axially of said mandrel, a locking groove formed through said bracket, an eccentric roller pivotally mounted in said locking slot, a cam arm fixed to said eccentric roller, a locking slide pivotally secured to said locking plate and extending slidably through said bracket and arranged to hold said locking slide rigidly in certain rotational positions and to permit free sliding positions in other rotational positions, and releasing means for unlocking said slides.

6. In a continuous method of preparing pears for canning, the steps of positioning a pear in a fruit circuit by feeding the neck end of a pear into a holder, engaging the opposite end of the pear at the calyx to determine a reference axis through the pear corresponding substantially with the stem of the pear and holding the pear so positioned, transferring the pear into a continuously moving operating cycle, passing a stemming tube during transfer along the reference axis so determined, and then peeling the pear while supported on the stemming tube, and then splitting and coring the pear while guidingly supporting the pear on the core axis formed by the stemming tube along the said reference axis.

7. In a pear preparation machine, the combination of a continuously operating feed means and a continuously operating peeling turret, means in the feed turret for establishing a reference axis through the stem axis of the pear, an impaling tube carried by the operating turret, means in the feed tube for presenting the pear with its stem axis in alignment with the axis of the stemming tube, means for actuating the stemming tube to impale the pear to transfer the pear to the peeling turret, an impaling member carried by the feed turret and having a blade, means for actuating the blade impaling means to impale the pear from the end opposite the stemming tube, said blade impaling means being operable to hold the pear from rotation on the stemming tube, and means for actuating the blade and stemming tube in unison to present the same for peeling, and peeling means operative to peel the pear while it is so held and during movement of the pear around the peeling turret.

8. In a pear preparation machine, the combination of a feed device and a continuously operating turret means in the feed device for establishing a vertical axis through the pear, means in the operating turret for impaling the pear along the stem axis whereby the pear is transferred to the operating turret, means in the operating turret for gripping the pear to move the same with reference to the impaling means, the said impaling means being operative to remove a stem fibre-containing cylinder around the stem axis of the pear, coring and seeding means having guide members adapted to enter the stem axis core cavity formed by the impaling means to guide the pear as it is moved with reference to said means by said gripping means, and means for actuating the gripping means.

9. In a pear preparation machine, the combination of a continuously operating feed turret, a continuously moving operating turret, means for driving the said turrets in timed relation, means carried by the feed turret to receive a pear and to determine a reference axis therethrough substantially coincident with the stem axis of the pear, said means including a calyx-engaging center, means in the operating turret for impaling the pear along the stem axis to a stop whereby the position of the seed cavity within the pear is determined with relation to the position of stop, and means for gripping the pear to transfer the same from the impaling means, a coring plate to which the pear is transferred in definite relation to the position of such stop to position the seed pod of the pear on said coring plate with reference to seed pod-removing knives carried by the coring plate, and means for operating the seed pod-removing knives to cut the seed pod from the pear.

10. In a pear preparation machine, the combination of a ring, a center, means for yieldably urging the center to position within the calyx of a pear, a stemming tube adapted to be impaled in the pear through the ring, means for limiting movement of the center during the impaling operation, means for actuating the stemming tube in the direction toward the center to move the pear and the center, whereby the impaling of the pear with the stemming tube moves the center to its limit position, means for opening the feed ring, stemming tube actuating means for actuating the stemming tube to impale the same in the pear, said means being operable to move the pear after the stemming tube has been impaled through the pear a predetermined distance to move the pear from contact with the center, and means for actuating the stemming tube to move the pear out of the open centering ring.

11. In a pear preparing machine having a main turret and a feed turret, the combination of a transfer means including means adapted to receive the neck of a pear, a mandrel adapted to engage within the pear calyx, a locking plate adapted to contact the calyx end of the pear to hold the pear in position determined by the pear receiving means and the mandrel, means operable in timed relation with the pear receiving means for moving said mandrel out of the pear calyx, and means for releasing said locking plate.

12. In a pear preparing machine having a main turret and a feed turret, the combination of a fruit transfer means including a feed ring adapted to receive the neck of a pear, a mandrel adapted to engage the pear within its calyx, means for causing relative movement of the feed ring and the mandrel to position the mandrel in said calyx as the pear is moved within the feed ring to position the calyx of the pear in alignment with the mandrel, a stemming tube in the main turret, means for continuously rotating the turrets in timed relation and to position the pear as supported by the feed ring in position to align the longitudinal axis of the pear with the axis of the stemming tube, means for moving the stemming tube to impale the pear through the stem end, means for moving the mandrel to position to release the calyx of the pear, means for moving the feed ring relative to the pear to release the pair whereby the pear may pass from control of the feed ring and mandrel in the feed turret to a position of control on the stemming tube in the main turret and during continuous operation of the said turrets.

GUY A. DUNN.

REFERENCES CITED

The following references are of record in the file of this patent:

UNITED STATES PATENTS

| Number | Name | Date |
|---|---|---|
| 207,201 | Dick | Aug. 13, 1878 |
| 1,605,532 | Duncan | Nov. 2, 1926 |
| 1,654,091 | Peiler | Dec. 27, 1927 |
| 1,758,928 | Burns | May 20, 1930 |
| 1,829,129 | Dillon | Oct. 27, 1931 |
| 1,837,335 | Reinstein et al. | Dec. 22, 1931 |
| 2,056,413 | Thompson | Oct. 9, 1936 |
| 2,076,938 | Chandler | Apr. 13, 1937 |
| 2,082,352 | Neumair | June 1, 1937 |
| 2,085,225 | Lucks | June 29, 1937 |
| 2,121,097 | Polk et al. | June 21, 1938 |
| 2,121,098 | Polk et al. | June 21, 1938 |
| 2,139,704 | Thompson | Dec. 13, 1938 |
| 2,161,807 | Ewald | June 13, 1939 |
| 2,179,529 | Thompson | Nov. 14, 1939 |
| 2,210,908 | Ewald | Aug. 13, 1940 |
| 2,229,168 | Carroll et al. | Jan. 21, 1941 |
| 2,335,620 | Thompson | Nov. 30, 1943 |